(12) United States Patent
Kubara et al.

(10) Patent No.: US 7,845,799 B2
(45) Date of Patent: Dec. 7, 2010

(54) THREE-DIMENSIONAL IMAGE COMMUNICATION TERMINAL AND PROJECTION-TYPE THREE-DIMENSIONAL IMAGE DISPLAY APPARATUS

(75) Inventors: Takashi Kubara, Fukuoka (JP); Natsushi Ono, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/827,279

(22) Filed: Jun. 30, 2010

(65) Prior Publication Data

US 2010/0265465 A1    Oct. 21, 2010

Related U.S. Application Data

(62) Division of application No. 11/375,139, filed on Mar. 15, 2006, now Pat. No. 7,775,666.

(30) Foreign Application Priority Data

| Mar. 16, 2005 | (JP) | 2005-074614 |
| Mar. 22, 2005 | (JP) | 2005-080963 |
| Mar. 31, 2005 | (JP) | 2005-102200 |
| May 26, 2005 | (JP) | 2005-153491 |

(51) Int. Cl.
   *G03B 21/14* (2006.01)

(52) U.S. Cl. .............................. 353/7; 353/10; 352/61; 359/475; 359/458; 359/478

(58) Field of Classification Search ................. 353/7, 353/10, 79; 359/463, 472, 478, 458; 349/15; 348/51, 54, 59; 352/60, 61, 63
See application file for complete search history.

(56) References Cited

U.S. PATENT DOCUMENTS

| 6,271,896 | B2 | 8/2001 | Moseley et al. |
| 7,150,531 | B2 | 12/2006 | Toeppen |
| 7,400,447 | B2 | 7/2008 | Sudo et al. |
| 7,446,733 | B1 | 11/2008 | Hirimai |
| 2003/0067460 | A1 | 4/2003 | Tomono |

FOREIGN PATENT DOCUMENTS

JP    2001-275134    10/2001

*Primary Examiner*—William C Dowling
(74) *Attorney, Agent, or Firm*—Greenblum & Bernstein P.L.C.

(57) ABSTRACT

A projection-type three-dimensional image display apparatus includes a projector, a screen and an image former. The projector projects a plurality of element images containing parallax information to a two-dimensional plane. An image is formed on the screen, of a light transmittance that is electrically controlled by the projector. An image former forms a three-dimensional image having a vertical parallax and a horizontal parallax in a space in front of the screen from the projection image.

15 Claims, 48 Drawing Sheets

LINEAR OBJECT IN FRONT OF LENS IS REPRODUCED
ON IP IMAGE DISPLAY PLANE ON THE BACK OF FOCAL POINT

LINEAR OBJECT ON THE BACK OF LENS IS REPRODUCED
ON IP IMAGE DISPLAY PLANE ON THE BACK OF FOCAL POINT

THREE-DIMENSIONAL IMAGE COMMUNICATION TERMINAL AND PROJECTION-TYPE THREE-DIMENSIONAL IMAGE DISPLAY APPARATUS

CROSS-REFERENCE TO RELATED APPLICATION

This application is a divisional of U.S. patent application Ser. No. 11/375,139, filed Mar. 15, 2006, which claims priority to Japanese Application Nos. 2005-074614, filed Mar. 16, 2005, 2005-080963, filed Mar. 22, 2005, 2005-102200, filed Mar. 31, 2005 and 2005-153491, filed May 26, 2005, the contents of which are expressly incorporated by reference herein in their entirety.

FIELD OF THE INVENTION

The present invention relates to a three-dimensional image display apparatus capable of three-dimensionally displaying an image, and more particularly, to a projection-type three-dimensional image display apparatus capable of three-dimensionally displaying an image with an excellent realistic feeling, which is widely used in the fields of image technology, amusement, entertainment, Internet, information, multimedia, communication, advertisement and promotion, medicine, art, education, design support, simulation, virtual reality, and the like.

BACKGROUND INFORMATION

Conventionally, as means for displaying a three-dimensional image based on information on the three-dimensional image and allowing an observer to recognize the three-dimensional image, there were known a naked-eye stereoscopic paralleling method in which a right image of two images having a binocular parallax is viewed with a right eye and a left image is viewed with a left eye, a stereoscope method in which an image is viewed using a pair of spectacles fitted with a liquid shutter or using different lenses for the right eye and the left eye, an anaglyph method in which a binocular parallax image having different colors of red and blue is viewed with red-blue spectacles. However, wearing special spectacles or training an observer is required for the observer to view a three-dimensional image using the above-mentioned methods.

In recent years, with development of a liquid crystal technology, liquid crystal monitors capable of displaying an image without using special spectacles were introduced to the market. Most of the liquid crystal monitors are three-dimensional liquid crystal display apparatuses of an image splitter type without spectacles, that is, three-dimensional image display apparatuses of a so-called parallax barrier type or a lenticular lens type having only a horizontal parallax.

In the three-dimensional image display apparatuses of a parallax barrier type or a lenticular lens type, the appearance of solidity is created by spatially forming optical image paths so that a right-eye image is viewed at a right-eye position and a left-eye image is viewed at a left-eye position. Accordingly, since the optical image path is spatially and periodically formed at the right-eye position and the left-eye position, the appearance of solidity is deteriorated when the optical image paths depart from the fixed positions. In addition, since images having a horizontal parallax are formed in principle, the appearance of solidity is deteriorated when the right-eye position and the left-eye position depart from the horizontal direction. Therefore, when it is intended to carry out stereoscopic views while maintaining the appearance of solidity of a three-dimensional video for a long time, it is necessary to fix the right-eye position and the left-eye position to predetermined positions in space, respectively.

As for the horizontal dislocation of the right-eye position and the left-eye position, there has been suggested a method of specifying positions of an observer's eyes or a position of the observer's face with a sensor and controlling and correcting the optical image path in accordance with the dislocation of the specified position. However, in this case, there is a problem that the apparatus increases in size and thus markers should be attached to the observer so as to sense the positions of the eyes or the position of the face.

By advancing the integral photography suggested by M. G. Lipmann in 1908 in order to solve the above-mentioned problems, there was recently suggested a three-dimensional image display method using a two-dimensional display panel such as a liquid crystal panel and a pin-hole or fly-eye lens array instead of a film (for example, see Japanese Unexamined Patent Application Publication No. 2001-275134).

In the integral photography suggested by M. G. Lipmann, a film is disposed at a focal position of a fly-eye convex lens array and images of the fly-eye convex lenses are recorded on the surface of the film. At the time of reproducing the recorded images, the images of the fly-eye convex lenses recorded on the film are reproduced into a stereoscopic image by the use of the same fly-eye convex lens array as photographing the stereoscopic image.

In order to smoothly display a three-dimensional image with a high resolution by the use of the integral photography, it is necessary to dispose different parallax images in the pinholes or lenses having a small diameter. Here, the two-dimensional resolution of the appearance depends upon the lens diameter of the pinhole or lens array. However, since the image information on the three-dimensional image of the appearance also relates to a density of the image formed in the depth direction, the image information on the three-dimensional image of the appearance does not depend upon only the lens diameter of the two-dimensional pinhole or lens array. However, when a human being views a three-dimensional image and the profile of the lens is clear, decrease in resolution occurs due to recognition of the size of the profile.

In the integral photography method or the ray reproducing method, since a convex lens array or a pinhole array made of glass or resin is used as means for forming a two-dimensional image including parallax images in a space, the profile of the lens is clear, thereby decreasing the two-dimensional resolution. The integral photography method was embodied using a lenticular lens array, but the two-dimensional resolution was decreased due to vertical stripe profiles of the lenticular lenses.

When a three-dimensional image is displayed using the fly-eye lens array, the lenticular lens array, or the pinhole array, crosstalk occurs in the neighboring lenses or pinholes at the time of forming an image corresponding to display data to be displayed in a two-dimensional display unit. Accordingly, there was an attempt to reduce the crosstalk by making it difficult to form the image corresponding to the display data in the geometrically neighboring lenses by the use of lenses with a short focal length. In order to embody the short focal length with an optical system having a simple structure, it is advantageous to reduce the radius of curvature of the lenses, but it is very difficult to efficiently manufacture a lens array having a small radius of curvature. In addition, there was an attempt to optically isolate the lenses one by one by the use of a light blocking mask, but there is a problem that the reproduced three-dimensional image becomes dark and the reproduction of the three-dimensional image is hindered due to the profile of the light blocking mask.

SUMMARY OF THE INVENTION

The present invention is contrived to solve the above-mentioned problems. An object of the present invention is to provide a three-dimensional image display apparatus which can reproduce a three-dimensional image having an appearance of solidity with a simple configuration.

According to an aspect of the present invention for accomplishing the above-mentioned object, there is provided a three-dimensional image display apparatus comprising: a display unit for displaying two-dimensional element images having a plurality of viewing-point images containing information on a parallax and an image at the time of reproducing a three-dimensional image; and a lens for forming the three-dimensional image at a predetermined spatial position from the element images displayed by the display unit, wherein the lens diffracts the element images and forms the three-dimensional image by the use of a diffraction effect when the element images are emitted from the display unit. According to this aspect of the present invention, it is possible to enhance an appearance resolution of an image displayed three-dimensionally and to enhance image quality, thereby reproducing a three-dimensional image having an appearance of solidity.

DETAILED DESCRIPTION

Hereinafter, embodiments of the present invention will be described with reference to FIGS. 1 to 48.

First Embodiment

Figure 1:
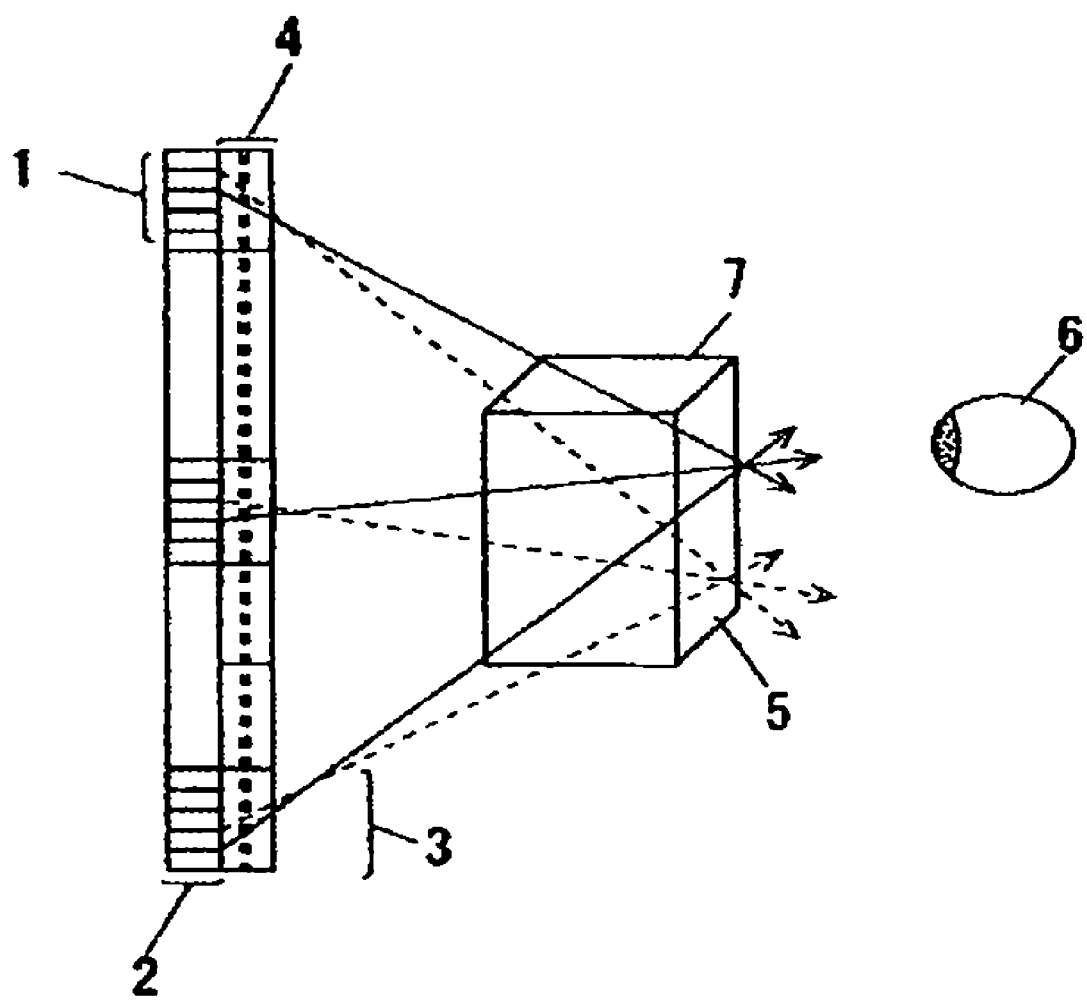
FIG. 1 is a diagram illustrating a configuration of a three-dimensional image display apparatus according to a first embodiment of the present invention.

A three-dimensional image display apparatus according to a first embodiment of the present invention will be now described with reference to FIGS. 1 to 3. FIG. 1 is a diagram illustrating a configuration of the three-dimensional image display apparatus according to the first embodiment of the invention. In FIG. 1, a reference numeral 1 denotes a horizontal and vertical parallax image displayed by the three-dimensional image display apparatus, a reference numeral 2 denotes a display device for displaying the horizontal and vertical parallax image 1, a reference numeral 3 denotes a lens for forming parallax images of the horizontal and vertical parallax image 1 in a space, and a reference numeral 3 denotes a lens array in which the lenses 3 are collected in a plane shape.

The three-dimensional image display apparatus including the horizontal and vertical parallax images 1, the display device 2, and the lens array 4 having a plurality of lenses 3 displays a three-dimensional image by the use of the integral photography. The horizontal and vertical parallax image 1 is an element image serving as a reproduction element and is displayed as a three-dimensional image through the reproduction by the three-dimensional image display apparatus. The horizontal and vertical parallax image 1 includes image information on color, luster, texture, shape, and the like of an object at the time of reproduction as a three-dimensional image or information on color, luster, texture, shape, and the like of an object which are varied depending upon the position of a viewing line to an image.

The three-dimensional image display apparatus projects the horizontal and vertical parallax image 1 to an image forming point 5 in space. The horizontal and vertical parallax image 1 projected to the image forming point 5 by the three-dimensional image display apparatus is incident on an observer's eyes 6 and becomes a three-dimensional image including a plurality of horizontal and vertical parallaxes. Specifically, the respective parallax images of the horizontal and vertical parallax image 1 displayed on the display device 2 of the three-dimensional image display apparatus are formed at the image forming point in space by the use of a diffraction effect by the lens 3.

The horizontal and vertical parallax image 1 is an image serving as a base of forming the three-dimensional solid image 7. The horizontal and vertical parallax image 1 is recorded in advance by disposing a film at a focal position of the lenses 3 and recording an image on the surface of the film every lens 3. The display device 2 is a display device for displaying the horizontal and vertical parallax image 1 and includes, for example, a liquid crystal panel or the like.

The integral photography method is now described in detail. FIG. 2 is a diagram illustrating a principle of the integral photography method. The integral photography is a method of reproducing a three dimensional image, which was suggested by M. G. Lipmann in 1908.

In the integral photography method, a film is disposed at a focal position of a convex lens array having a fly eye shape and an image is recorded on the surface of the film every convex lens. At the time of reproducing the recorded images, the image recorded on the film for each convex lens having a fly eye shape is reproduced as a three-dimensional solid image by the use of the same convex lens array having a fly eye shape as photographing the image.

Figure 2:
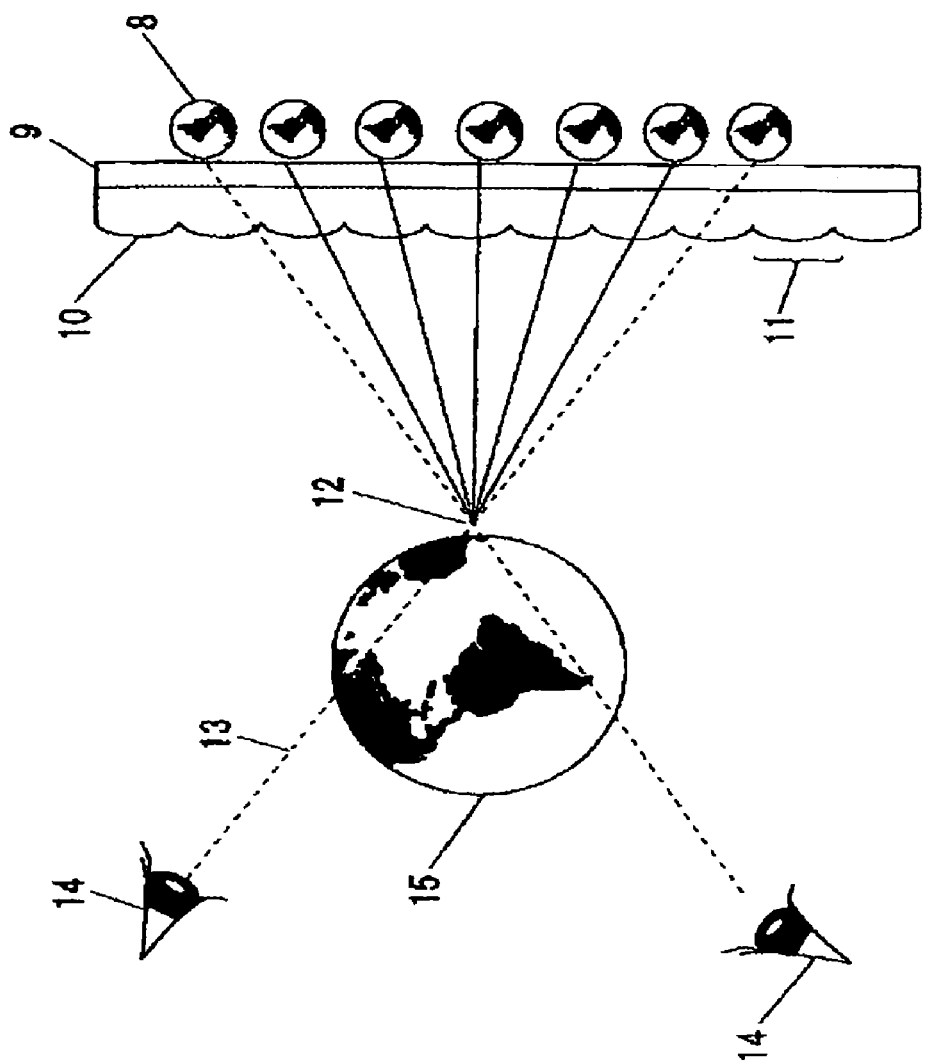
FIG. 2 is a diagram illustrating a principle of an integral photography method.

As shown in FIG. 2, when reproduction element images 8 are displayed on the display device 9 for displaying the reproduction element images 8 to correspond to the convex lenses 11 of the convex lens array 10 having a fly eye shape, the reproduction element images 8 are formed at an image forming point 12 corresponding to a pixel position on the surface of the original image through the respective convex lenses 11. Accordingly, by allowing rays 13 created from the image forming point 12 to be actually incident on the observer's eyes 14, a three-dimensional solid image 15 providing a feeling of solidity to the observer is reproduced.

Since the image forming point 12 exists in space, the observer can stably view a three-dimensional solid image having an appearance of solidity even when an angle at which the three-dimensional image display apparatus is disposed or an angle at which the observer views the three-dimensional solid image 15 is changed, or even when the positions of the eyes are moved. In the first embodiment, a zone plate which is a kind of lens employing a diffraction effect is used instead of the convex lens array 10 having a fly eye lens.

The zone plate used in the three-dimensional image display apparatus according to the first embodiment is now described. FIG. 3 is a diagram illustrating a concept of the zone plate of the three-dimensional image display apparatus according to the first embodiment.

Figure 3:
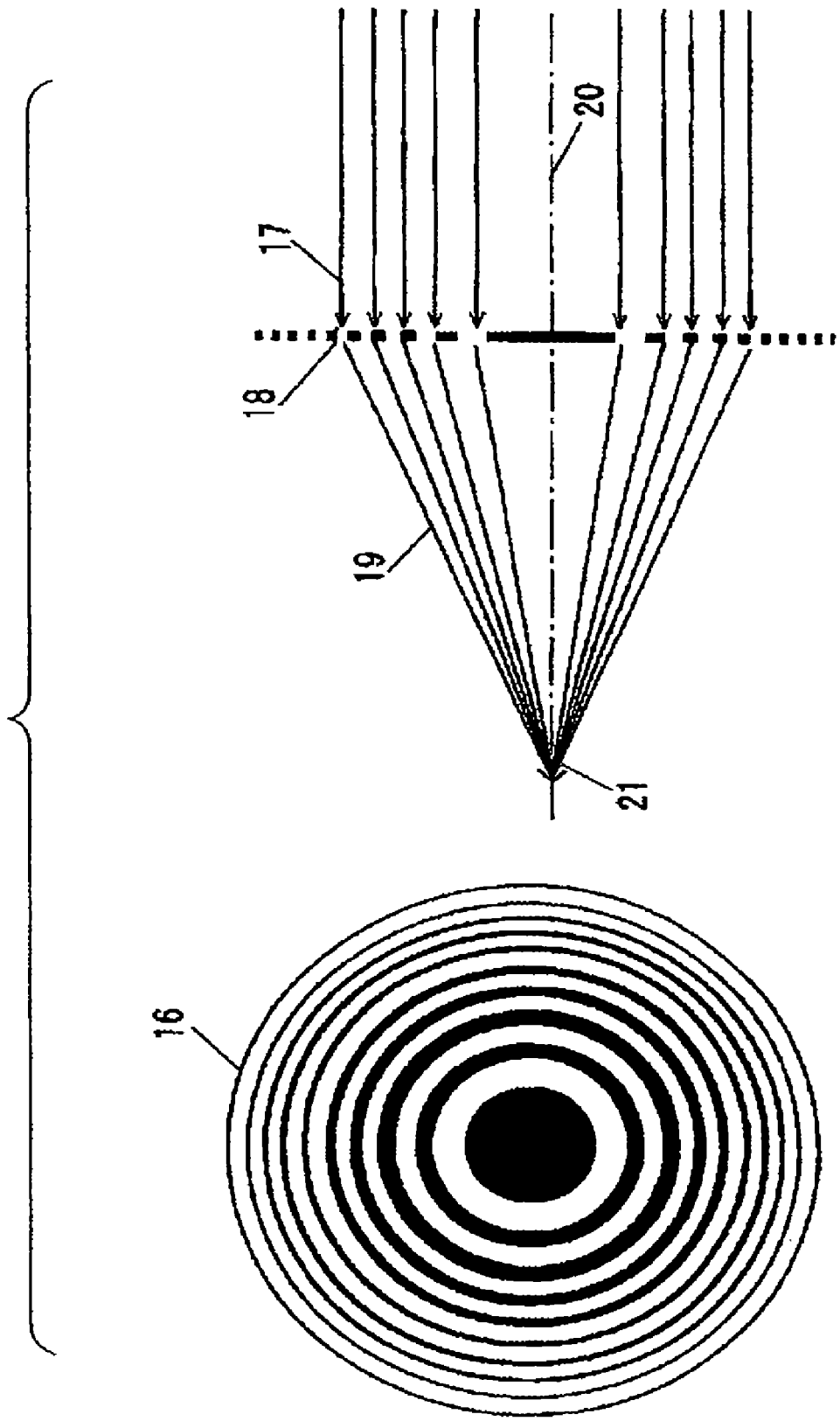
FIG. 3 is a diagram illustrating a concept of a zone plate provided in the three-dimensional image display apparatus according to the first embodiment.

In FIG. 3, a reference numeral 16 denotes an entire shape of the zone plate. The zone plate 16 is an optical device which can form an image by bending the traveling direction of rays by the use of diffraction of light and collecting the rays on a point.

In the zone plate 16, transparent rings and opaque rings which form concentric circles on a substrate are alternately disposed. The diameter of each ring is proportional to a square root of a natural number counted from the center. For example, the radius r of a ring constituting the zone plate 16 can be calculated from $r=\sqrt{n\lambda f}$, where f is a focal length, $\lambda$ is a wavelength of incident light, and n is a natural number.

In the zone plate 16, shapes of rings obtained through predetermined calculation are printed in advance on a photograph or a photosensitive resin. When parallel light 17 is incident in the direction perpendicular to the printed surface of the zone plate 16, the incident light 17 is diffracted by diffraction portions 18 of the zone plate 16 and outgoing light 19 of which the traveling direction is bent is emitted therefrom. The outgoing light 19 forms an image on a focal length 21 in an optical axis 20 passing through the center of the ring patterns of the zone plate 16. In this way, the zone plate 16 serves as a lens.

Details of the zone plate 16 are now described with reference to FIG. 1. The diameter of the lens 3 employing the zone plate 16 is about 1 mm and the resolution of a liquid crystal panel as the display device 2 for displaying the horizontal and vertical parallax image 1 is about 200 dpi.

In this case, the reproduction element image 8 of the lens employing one zone plate 16 is a 10×10 pixel image and a smooth three-dimensional solid image of which the number of horizontal and vertical parallaxes is 10 eye-shots can be reproduced. In order to obtain a smooth three-dimensional solid image, the reproduction element images 8 with a resolution of, for example, 200 to 700 dpi can be reproduced by the use of the lens array 4 employing the zone plates 16 with a diameter of 1 mm or less. The means (display device 2) for displaying the horizontal and vertical parallax image 1 is not limited to the liquid crystal panel, but may employ a plasma display panel, an organic EL panel, or the like.

According to the first embodiment, since the reproduction element images 8 are reproduced by the use of the lens array 4 employing the zone plate 16, an observer can little recognize the profiles of the lenses, thereby easily reducing the crosstalk by the use of lenses with a short focal length. Accordingly, the three-dimensional image display apparatus can enhance the appearance resolution of a three-dimensional image with a simple configuration and thus can enhance the image quality. Accordingly, the three-dimensional image display apparatus can reproduce an image having an appearance of solidity.

Second Embodiment

Figure 4:
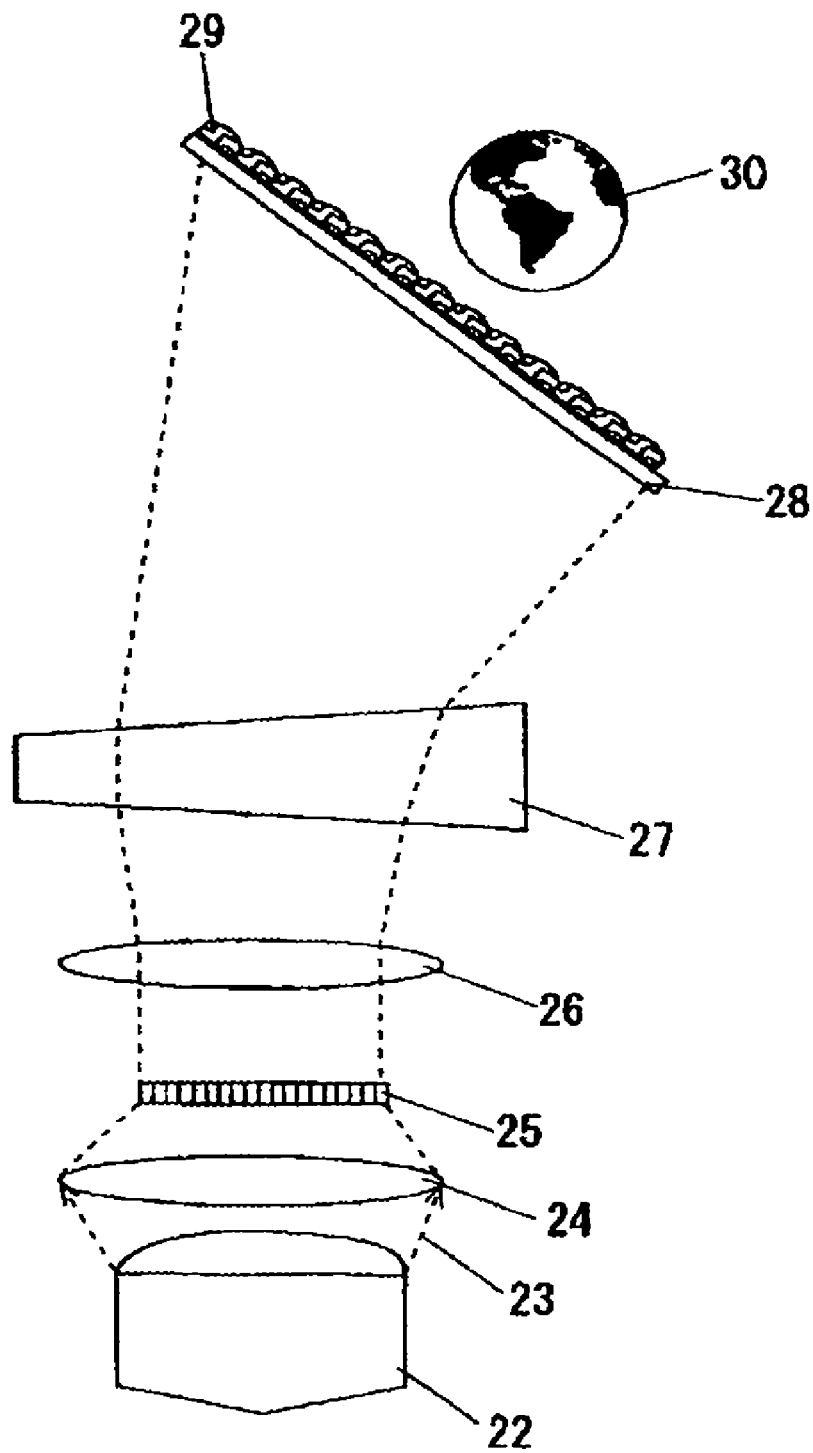
FIG. 4 is a diagram illustrating a configuration of a three-dimensional image display apparatus according to a second embodiment of the present invention.

Next, a projection-type three-dimensional image display apparatus according to a second embodiment of the present invention will be described with reference to FIGS. 4 and 5. FIG. 4 is a diagram illustrating a configuration of the three-dimensional image display apparatus according to the second embodiment of the present invention. In FIG. 4, a reference numeral 22 denotes a light source, a reference numeral 23 denotes light emitted from the light source 22, a reference numeral 24 denotes a condenser lens, a reference numeral 25 denotes a projection device, a reference numeral 26 denotes a projection lens, a reference numeral 27 denotes a prism, a reference numeral 28 denotes an image forming screen, a reference numeral 29 denotes a binary optical element employing a diffraction effect, and a reference numeral 30 denotes a three-dimensional solid image.

The light source 22 is a device for emitting the light 23 and includes, for example, a white light emitting diode (LED). The condenser lens 24 collects the light 23 emitted from the light source 22.

The projection device 25 is projection means for controlling the shape of a projection image and receives the light collected by the condenser lens 24. The projection device 25 modulates the received light into a projection image (a modulated pattern formed on a reflecting surface of the projection device 25) and adds image information thereto. The projection device 25 includes, for example, transmissive liquid crystal.

The projection lens 26 receives the light modulated by the projection device 25 and outputs the received light to the prism 27. The prism 27 changes a projection angle of the light output from the projection lens 26 and projects the light to the image forming screen 28.

The image forming screen 28 forms a projection image by the use of the light projected from the prism 27. The image forming screen 28 includes, for example, a hologram diffusion plate. The binary optical element 29 is means for controlling the light to form an image in a space by the use of the diffraction effect of light and serves to form a three-dimensional solid image 30 in the space on the basis of the projection image formed on the image forming screen 28.

Next, a procedure in which the three-dimensional image display apparatus forms the projection image will be described. In FIG. 4, the light 23 emitted from the light source 22 is collected by the condenser lens 24 and is input to the projection device 25. The projection device 25 modulates the light input from the condenser lens 24 into the projection image and adds the image information thereto. Accordingly, the projection device 25 controls the shape of the projection image.

The light modulated by the projection device 25 passes through the projection lens 26 and a projection angle of the light is changed by the prism 27. The light of which the projection angle is changed by the prism 27 is projected to the image forming screen 28, thereby forming the projection image.

Since the projection image formed on the image forming screen 28 is a ray-traced image by the integral photography method, it is possible to form the three-dimensional solid image 30 in a space through the use of the binary optical elements 29 as the means for forming an image in a space by the use of the diffraction effect of light.

In the second embodiment, the binary optical element is used as the means for forming the element images having the image information in a space by using the diffraction effect of light. The binary optical elements 29 are two-dimensionally arranged in a plane parallel to the plane in which the image forming screen 28 forms the projection image, and serve as a lens array.

The binary optical element used in the three-dimensional image display apparatus according to the second embodiment is now described in detail. FIG. 5 is a diagram illustrating a concept of the binary optical element disposed in the three-dimensional image display apparatus according to the second embodiment.

Figure 5:
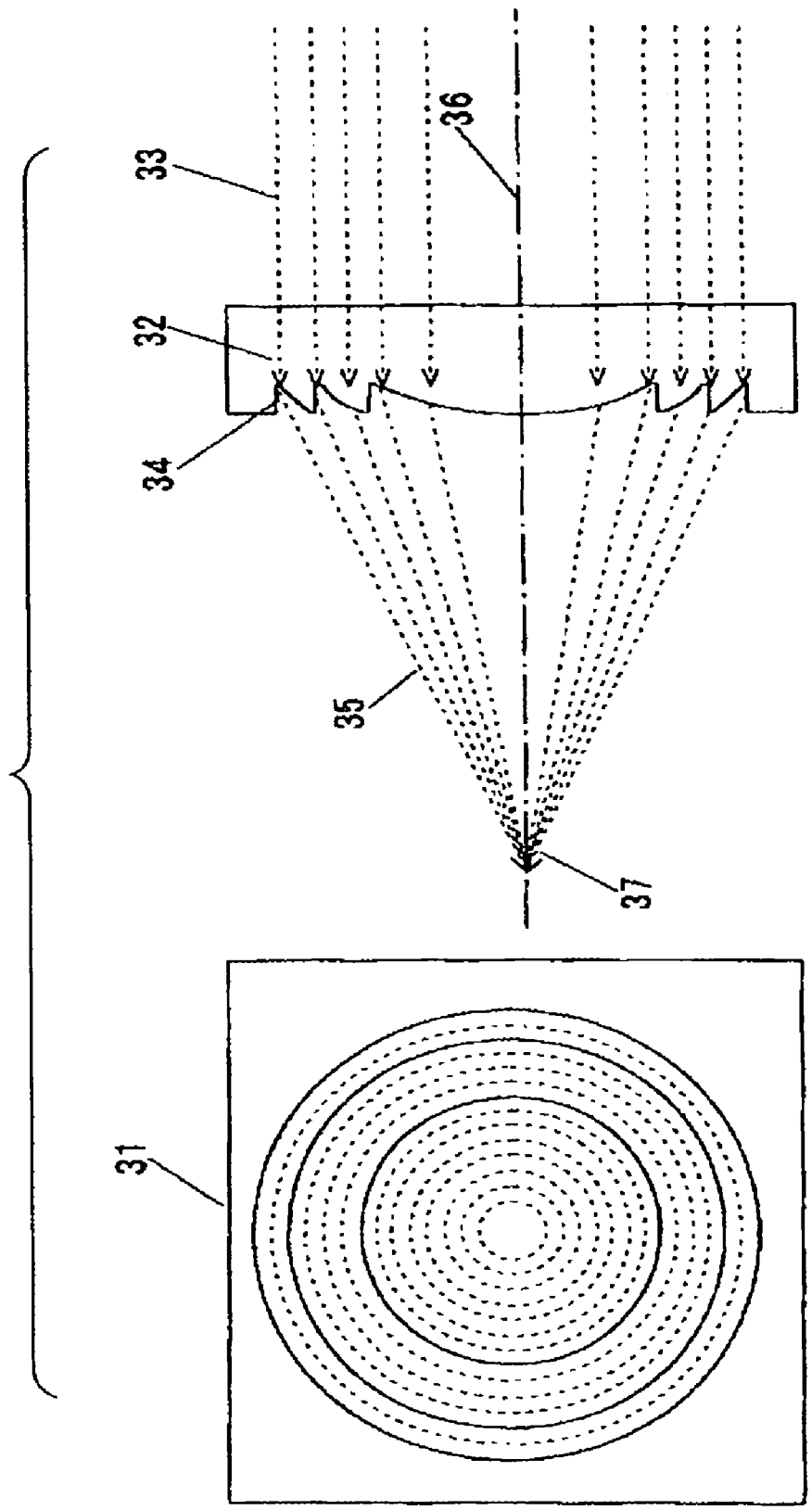
FIG. 5 is a diagram illustrating a concept of a binary optical element provided in the three-dimensional image display apparatus according to the second embodiment.

In FIG. 5, a reference numeral 31 denotes the whole shape of a binary optical element. The binary optical element 31 is formed by approximating a diffraction optical element having a blaze-shaped section such as a Fresnel lens to a step shape of an element sectional portion 32.

In the binary optical element 31 having the element sectional portion 32, a diffraction grating having a micro shape is formed on the surface of a transparent substrate. The binary optical element 31 forms an image by bending the traveling direction of light to collect the light on a point by the use of the diffraction effect of light.

When parallel light 33 is incident on the surface of the binary optical element 31 in the direction perpendicular to the backside of the element sectional portion 32, the incident light 33 is diffracted by diffraction portions 34 of the binary optical element 31 and outgoing light 35 of which the traveling direction is bent is output from the binary optical element 31.

The outgoing light 35 output from the binary optical element 31 forms an image at a focal point 37 in an optical axis 36 passing through the center of pattern of the binary optical element 31. Accordingly, the binary optical element 31 serves as a lens.

The diameter of the binary optical element 31 according to the present invention is about 1.5 mm and the resolution of the projection image projected to and formed on the image forming screen 28 is about 200 dpi. In this case, the reproduction element image of each binary optical element 31 is a 10×10 pixel image and a smooth three-dimensional solid image of which the number of horizontal and vertical parallaxes is 10 eye-shots can be reproduced. In order to obtain the smooth three-dimensional solid image, the reproduction element image with a resolution of, for example, 200 to 700 dpi can be effectively reproduced by the use of the binary optical element 31 with a diameter of 1.5 mm or less.

Although the three-dimensional image display apparatus according to the second embodiment includes the white LED as the light source 22, the light source 22 is not limited to the white LED, but may include an LED of various colors, an organic EL device, a halogen lamp, or the like.

In addition, although the three-dimensional image display apparatus according to the second embodiment includes the hologram diffusion plate as the image forming screen 28, the image forming screen 28 is not limited to the hologram diffusion plate, but may include an emboss type diffusion plate or a hologram screen.

According to the second embodiment, since the three-dimensional image is formed by the use of the binary optical element 29 employing the binary optical element 31, an observer can little recognize the profiles of the lenses, thereby easily reducing the crosstalk by the use of lenses with a short focal length. Accordingly, the three-dimensional image display apparatus can enhance the appearance resolution of the three-dimensional image with a simple configuration and thus can enhance the image quality. As a result, the three-dimensional image display apparatus can reproduce an image having an appearance of solidity.

Third Embodiment

Figure 6:
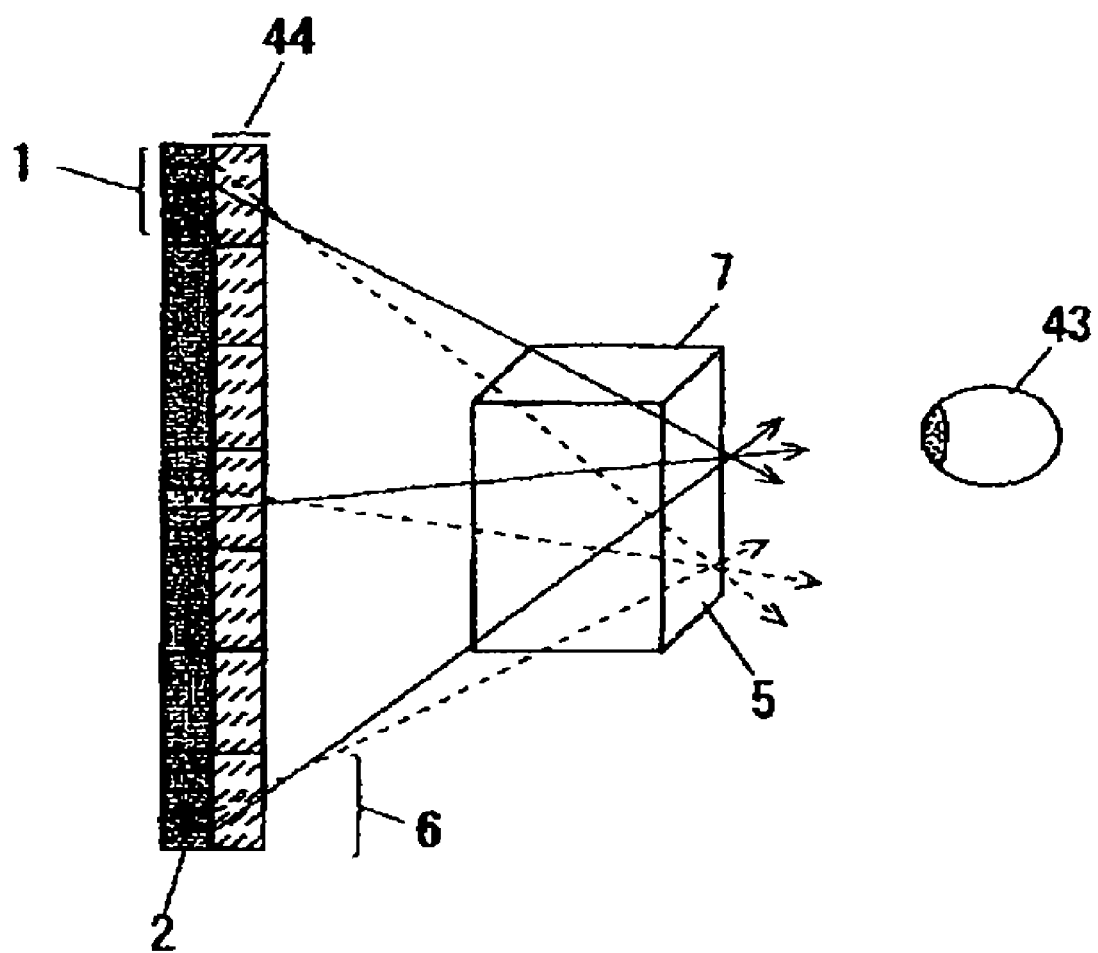
FIG. 6 is a diagram illustrating a configuration of a three-dimensional image display apparatus according to a third embodiment of the present invention.

A three-dimensional image display apparatus according to a third embodiment of the present invention will be now described with reference to FIGS. 6 and 7. FIG. 6 is a diagram illustrating a configuration of the three-dimensional image display apparatus according to the third embodiment of the present invention. In FIG. 6, a reference numeral 1 denotes a horizontal and vertical parallax image displayed by the three-dimensional image display apparatus, a reference numeral 2 denotes a display device for displaying the horizontal and vertical parallax image 1, a reference numeral 6 denotes a lens for forming parallax images of the horizontal and vertical parallax image 1 in a space, and a reference numeral 44 denotes a lens array in which the lenses 6 are collected in a plane shape.

The three-dimensional image display apparatus including the horizontal and vertical parallax images 1, the display device 2, and the lens array 44 having a plurality of lenses 6 displays a three-dimensional image by the use of the integral photography method.

The three-dimensional image display apparatus projects the horizontal and vertical parallax image 1 to an image forming point 5 in a space. The horizontal and vertical parallax image 1 projected to the image forming point 5 by the three-dimensional image display apparatus is incident on an observer's eyes 43 and becomes a three-dimensional solid image 7 including a plurality of horizontal and vertical parallaxes. Specifically, the respective parallax images of the horizontal and vertical parallax image 1 displayed on the display device 2 of the three-dimensional image display apparatus are formed at the image forming point 5 in a space by the use of the diffraction effect of light by the lens 6.

The horizontal and vertical parallax image 1 is an image serving as a base of forming the three-dimensional solid image 7. The horizontal and vertical parallax image 1 is recorded in advance by disposing a film at a focal position of the lenses 6 and recording an image on the surface of the film every lens 6 by the use of the diffraction effect of light.

The display device 2 is a device for displaying the horizontal and vertical parallax image 1 and includes, for example, a liquid crystal panel or the like. In the third embodiment, the lens array 44 includes, for example, holographic lenses.

The holographic lens used in the three-dimensional image display apparatus according to the third embodiment is now described. FIG. 7 is a diagram illustrating a concept of the holographic lens used in the three-dimensional image display apparatus according to the third embodiment.

Figure 7:
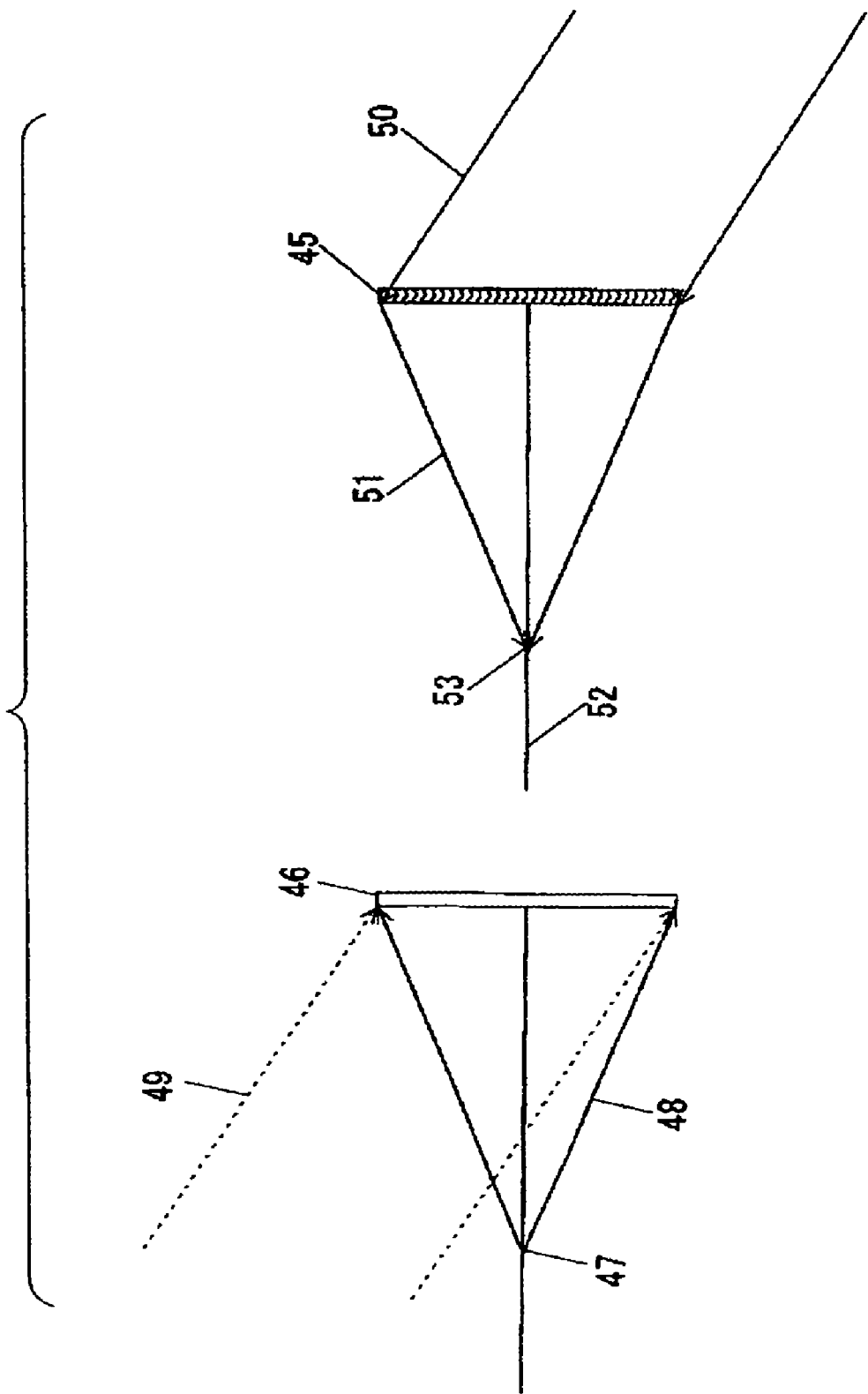
FIG. 7 is a diagram illustrating a concept of a holographic lens provided in the three-dimensional image display apparatus according to the third embodiment.

In FIG. 7, a reference numeral 45 denotes the whole shape of the holographic lens. The holographic lens 45 is a diffraction optical element in which a hologram is formed in photosensitive gelatin such as photopolymer or silver halide gelatin.

The holographic lens 45 is constructed on a substrate 46 made of photopolymer or silver halide gelatin. By creating a spherical wave from a focal position of the substrate 46 by the use of a point light source 47 and inputting parallel light 49 to the substrate 46 in the direction opposite to the direction of the incident light for reproducing an image to expose the substrate 46, a diffraction grating is formed due to variation in refraction index therein. The diffraction grating can bend the traveling direction of light by the use of the diffraction effect of light, thereby collecting the light on a point to form an image.

When predetermined parallel light 50 is incident on the holographic lens 45, the incident light 50 is diffracted by the diffraction grating of the holographic lens 45 and outgoing light 51 of which the traveling direction is bent is output from the holographic lens 45.

The outgoing light 51 from the holographic lens 45 forms an image at a focal point 53 in the optical axis 52 passing through the center of the holographic lens 45. Accordingly, the holographic lens 45 serves as a lens.

Details of the holographic lens 45 are now described with reference to FIG. 6. The diameter of the holographic lens 45 according to the present invention is about 1 mm and the resolution of a liquid crystal panel as the display device 2 for displaying the horizontal and vertical parallax image 1 is about 200 dpi. In this case, the horizontal and vertical parallax image of each holographic lens 45 is a 10×10 pixel image and a smooth three-dimensional solid image 7 of which the number of horizontal and vertical parallaxes is 10 eye-shots can be reproduced. In order to obtain a smooth three-dimensional solid image 7, the horizontal and vertical parallax image 1 with a resolution of, for example, 200 to 700 dpi can be reproduced by the use of the holographic lens 45 with a diameter of 1 mm or less.

Although the three-dimensional image display apparatus according to the third embodiment includes the holographic lens 45, the present invention is not limited to the holographic lens 45, but the three-dimensional image display apparatus may include a kinoform.

According to the third embodiment, since the horizontal and vertical parallax image 1 is reproduced by the use of the lens army 44 employing the holographic lens 45, an observer can little recognize the profiles of the lenses, thereby easily reducing the crosstalk by the use of lenses with a short focal length. Accordingly, the three-dimensional image display apparatus can enhance the appearance resolution of a three-dimensional image with a simple configuration and thus can enhance the image quality. As a result, the three-dimensional image display apparatus can reproduce an image having an appearance of solidity.

In fourth to eleventh embodiments to be described below, technologies for more conveniently displaying a three-dimensional image in the three-dimensional image display apparatus and the projection-type three-dimensional image display apparatus according to the first to third embodiments of the present invention are described. The three-dimensional image display apparatus and the projection-type three-dimensional image display apparatus according to the present invention can be used as a three-dimensional display apparatus and a solid image reproducing apparatus suitable in the fields of image technology, amusement, entertainment, Internet, information, multimedia, communication, advertisement and promotion, medicine, art, education, design support, simulation, virtual reality, and the like.

Hereinafter, exemplary embodiments of the projection-type three-dimensional image display apparatus according to the present invention will be described in detail with reference to the drawings. The present invention is not limited to the following technologies, but may be modified in various forms without departing from the gist of the present invention.

Fourth Embodiment

Figure 8:
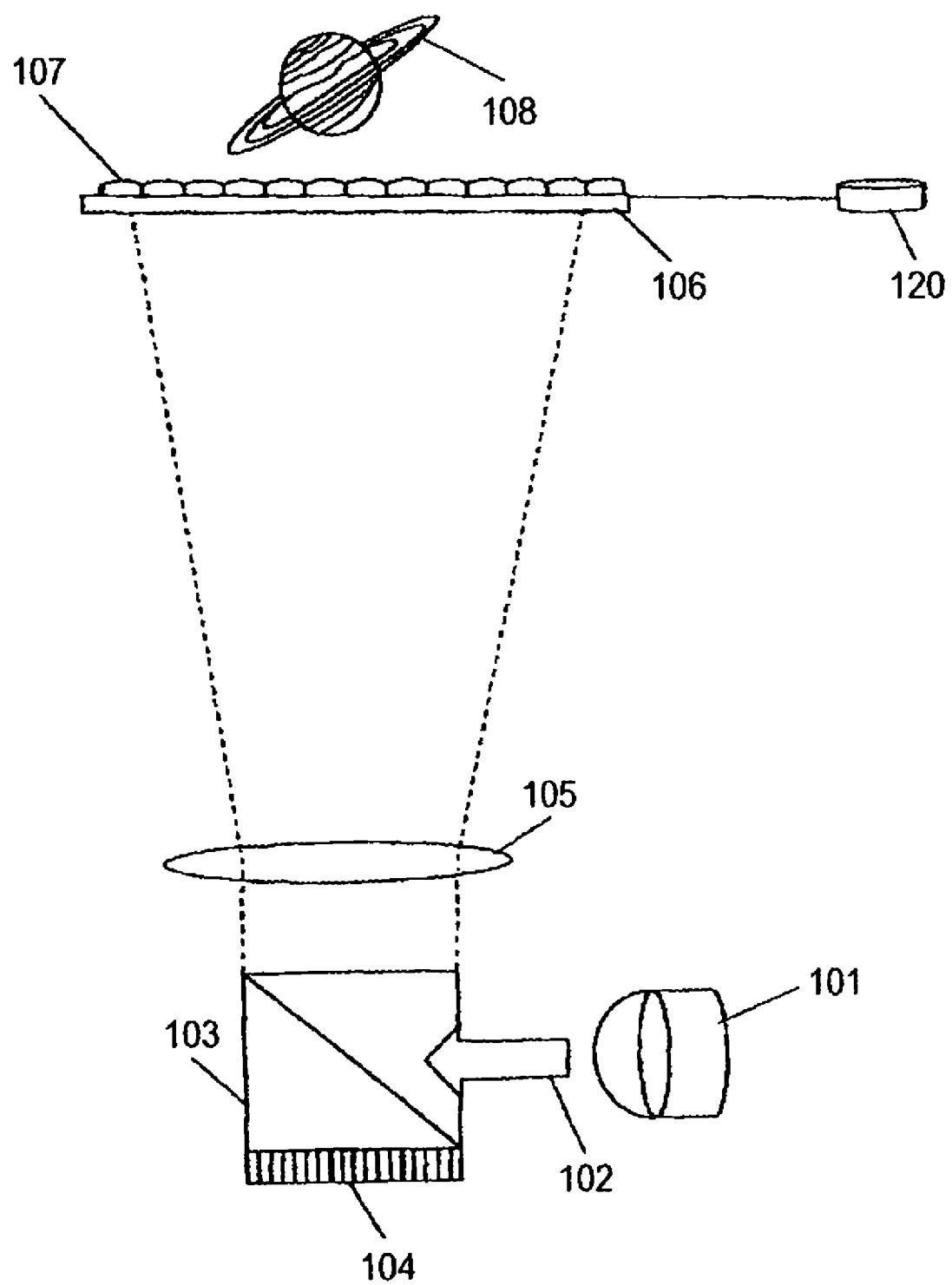
FIG. 8 is a diagram schematically illustrating a configuration of a projection-type three-dimensional image display apparatus according to a fourth embodiment of the present invention.

A projection-type three-dimensional image display apparatus according to the present invention will be described with reference to FIGS. 8 to 11. FIG. 8 is a diagram schematically illustrating a configuration of the projection-type three-dimensional image display apparatus according to a fourth embodiment of the present invention. As shown in FIG. 8, the projection-type three-dimensional image display apparatus according to the fourth embodiment includes a light source 101, a polarized beam splitter 103 disposed in the traveling direction of light emitted from the light source 101, a projection device 104 disposed on the backside of the polarized beam splitter 103, a projection lens 105 disposed in front of the polarized beam splitter 103, an image forming screen 106 disposed in front of the projection lens 105, a convex lens array 107 disposed on the front main surface of the image forming screen 106, and a light sensor 120 connected to the image forming screen 106. In FIG. 8, the side on which a three-dimensional image 8 is formed is a front side and the opposite side is a back side.

In the projection-type three-dimensional image display apparatus according to the fourth embodiment, the light 102 emitted from the light source 101 in FIG. 8 is incident on the polarized beam splitter 103, and only S-wave light is reflected by the boundary of the polarized beam splitter 3 and is incident on the projection device 104 as projection means for controlling the shape of a projection image. An example of the projection device 104 can include D-ILA (Direct Drive Image Light Amplifier) made by Victor Company of Japan Limited.

An example of the projection means can include a transmissive liquid crystal display device, a reflective liquid crystal display device, a digital mirror device, an organic EL element array, and a spatial light modulator (SLM). Specifically, a reflective liquid crystal projection device with vertical alignment can be used as the reflective liquid crystal display device. By using the projection device having excellent front brightness, uniformity of a screen, and resolution as described above, a plurality of element images having parallax information can be excellently projected to a two-dimensional plane, thereby embodying a three-dimensional image reproducing apparatus with high quality.

The S-wave light incident on the projection device 104 is modulated in accordance with projection image information by the projection device 104 and image information is added thereto. At this time, since non-modulated S-wave light is reflected and is returned to the light source 101 through the opposite path of the incident path, the light is not emitted but displays black. On the other hand, the modulated S-wave light is converted into light including a P-wave component depending upon the degree of modulation and is projected to the image forming screen 106 through the polarized beam splitter 103 and the projection lens 105, thereby forming a projection image. Here, in the fourth embodiment, since the formed projection image is a ray-traced image by the integral photography method, the projection image can form the three-dimensional image 108 in an opposite space of the projection lens through the convex lens array 107.

In the projection-type three-dimensional image display apparatus according to the fourth embodiment, a pinhole array or a hologram lens array can be used instead of the convex lens array 111 having a fly eye shape. In this case, it is possible to satisfactorily form a three-dimensional reproduction image having a vertical parallax and a horizontal parallax in a space in front of the front surface of the image forming screen 106, thereby embodying the three-dimensional image display apparatus with high quality.

In the projection-type three-dimensional image display apparatus according to the fourth embodiment shown in FIG. 8, a halogen lamp is used as the light source 101. In addition to the halogen lamp, LEDs of various colors or an organic EL device may be used as the light source 101. Specifically, the white LED is most suitably used instead of the halogen lamp. By using them as the light source 101, it is possible to project projection light with high brightness, thereby displaying a three-dimensional image with high image quality.

In the projection-type three-dimensional image display apparatus according to the fourth embodiment, a liquid crystal screen is employed as the image forming screen 106 of which transmittance can be electrically controlled. Accordingly, since it is possible to satisfactorily form the projection image and to easily and satisfactorily control the light transmittance of the screen, a three-dimensional image reproducing apparatus with high quality can be embodied.

Figure 9:
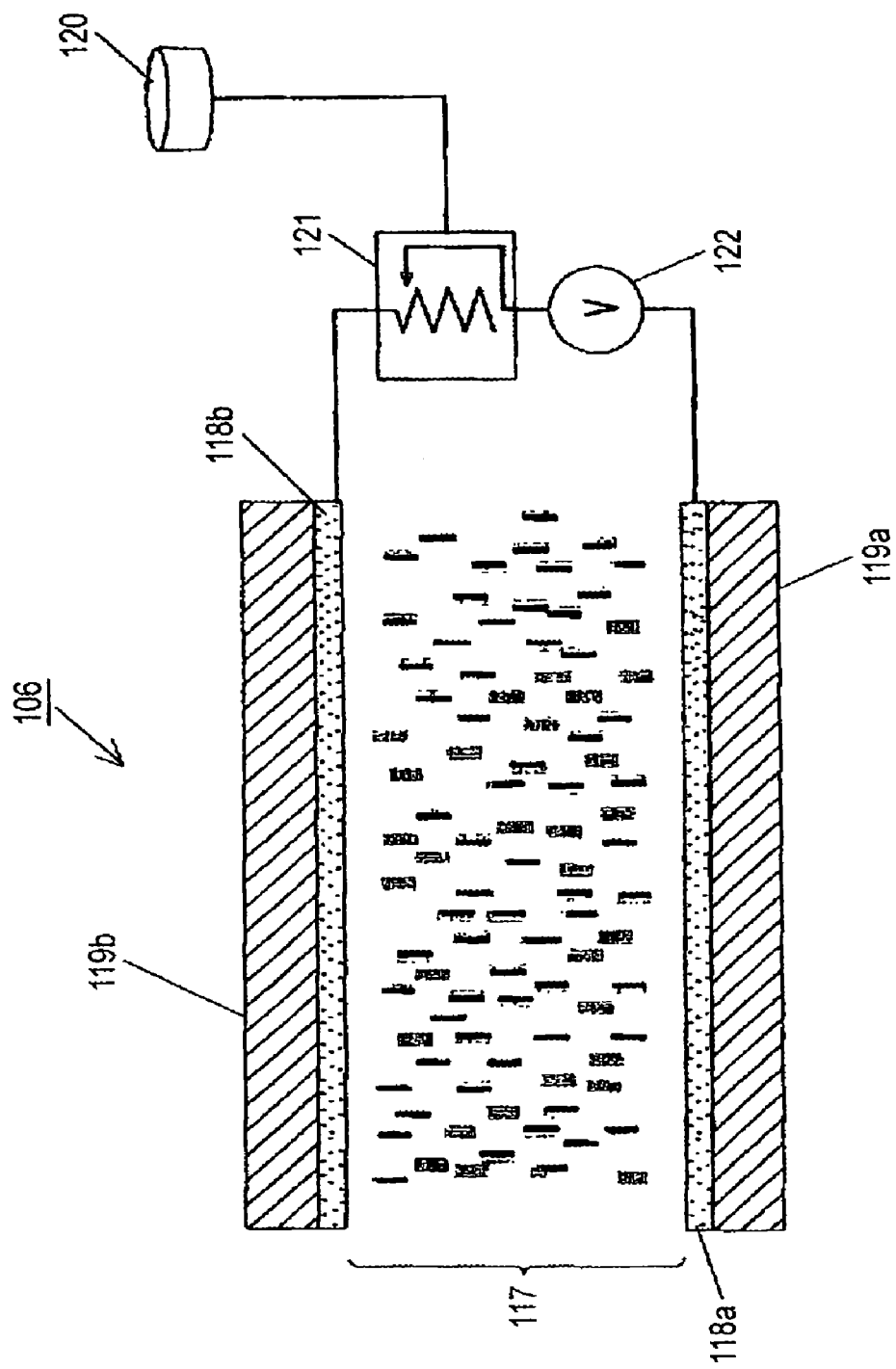
FIG. 9 is a diagram illustrating a configuration of a screen of which transmittance can be electrically controlled.

FIG. 9 is a diagram illustrating a configuration of the screen of which transmittance can be electrically controlled. In the liquid crystal screen, a liquid crystal layer 117 is interposed between two sheets of transparent resin substrates 119a and 119b of which the front surfaces are coated with transparent electrodes 118a and 118b made of ITO or the like. An applied voltage controller 121 for controlling a voltage applied between the transparent electrode 118a and the transparent electrode 118b is connected to the transparent electrodes 118a and 118b. The light sensor 120 for detecting the brightness of an environment in which the projection-type three-dimensional image display apparatus is placed is connected to the applied voltage controller 121.

When the element images as viewing-point images having parallax information are projected onto the screen to display a three-dimensional image, the light sensor 120 of the projection-type three-dimensional image display apparatus detects the brightness of the environment in which the projection-type three-dimensional image display apparatus is placed. The applied voltage controller 121 of the projection-type three-dimensional image display apparatus controls the transmittance of the screen to change the applied voltage 122 on the basis of the brightness of the external environment detected by the light sensor 120 and controls the contrast of the element images as the viewing-point images having the parallax information to obtain the optimum contrast. Accordingly, since the contrast of the element images having the parallax information can be adjusted to the optimum status, it is possible to embody a three-dimensional image reproducing apparatus with high quality.

Figure 10A:
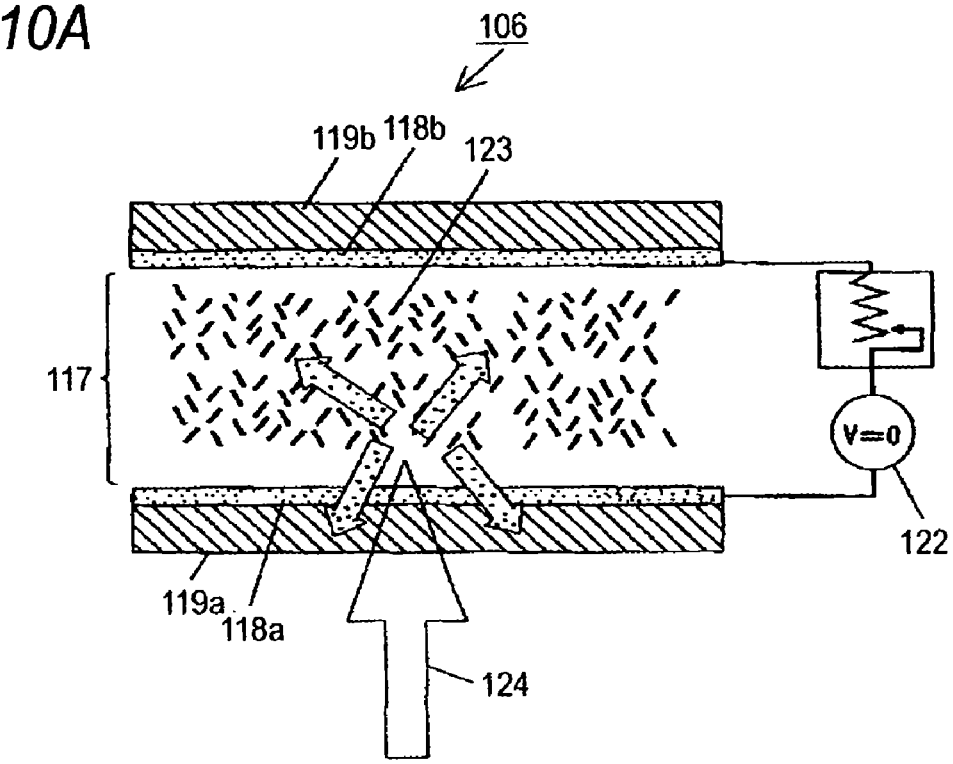
FIG. 10A is a diagram illustrating operations of the screen of which transmittance can be electrically controlled and FIG. 10B is a diagram illustrating operations of the screen of which transmittance can be electrically controlled.
Figure 10B:
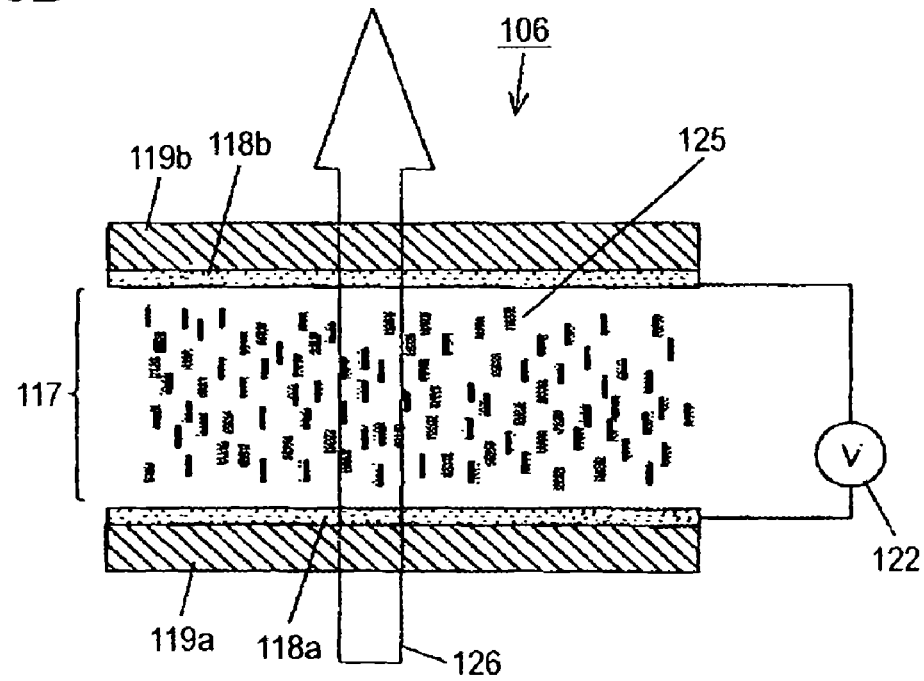

As shown in FIG. 10A, when no voltage is applied between the transparent electrode 118a and the transparent electrode 118b, the incident light 124 is scattered by liquid crystal polymers (random liquid crystal polymers 123) randomly existing in the liquid crystal layer 117 and is not transmitted through the image forming screen 106. On the other hand, when a predetermined voltage is applied between the transparent electrode 118a and the transparent electrode 118b, as shown in FIG. 10B, the liquid crystal polymers in the liquid crystal layer 117 are aligned into aligned liquid crystal polymers 125. Accordingly, the transmittance is enhanced to make the liquid crystal layer 117 transparent. As a result, the incident light 126 becomes a transmitted light passing through the image forming screen 106. The transmittance is controlled in the range of voltage applied to the liquid crystal layer 117 through the transparent electrodes 118a and 118b. For example, when the element images of the viewing-point image having the parallax information is not projected, the existence of the image forming screen 106 is made to be invisible by enhancing the transmittance of the image forming screen 106 to the maximum transmission status to make the image forming screen 106 transparent.

A compound film of polymers and liquid crystal can be used as the image forming screen 106 of which the transmittance can be electrically controlled. The compound film of polymers and liquid crystal serves to control transmission and scattering by impregnating a porous member with the liquid crystal, changing the refraction index of the liquid crystal depending upon the application of an electric field, and adjusting the matching and mismatching with the refraction index of the porous member. This method is very useful because it is possible to overcome disadvantages of the conventional liquid crystal in principle without using a polarizing film.

Since the transparent screen at the time of application of a voltage serves as a screen at the time of application of no voltage, it is possible to control the transmission status by the use of the voltage and to keep constant the contrast varying depending on the environmental brightness to stabilize the image quality. The screen can be manufactured by the use of nematic liquid crystal which is capsulated out of polyvinyl alcohol, liquid crystal including various latexes, or a method of dispersing and hardening liquid crystal in epoxy resin. A method of manufacturing PLCC using photo-curable vinyl compound is also known. This method has excellent productivity.

In the projection-type three-dimensional image display apparatus according to the fourth embodiment, the diameter of the convex lens 112 is about 1.5 mm and the resolution of the projection image projected to and formed on the image forming screen 106 is about 200 dpi. In this case, the reproduction element image 109 of each lens is a 10×10 pixel image and a smooth three-dimensional solid image of which the number of horizontal and vertical parallaxes is 10 eye-shots can be reproduced. When the resolution of the formed projection image is less than or equal to 200 dpi, it is difficult to obtain a smooth solid reproduced image. In order to obtain a three-dimensional solid image as smooth as possible, the reproduction element image 109 with a resolution of 200 to 700 dpi can be effectively reproduced by the use of a lens with a diameter of 1.5 mm or less.

In the projection-type three-dimensional image display apparatus according to the fourth embodiment, since the convex lens array 107 is integrally formed on the front main surface of the image forming screen 106, it is possible to embody a projection-type three-dimensional image display apparatus with a small size, a saved space, and low price.

According to the fourth embodiment described above, it is possible to embody a projection-type three-dimensional image display apparatus which can be recognized as an empty space when no image is projected, which can provide a realistic sensation like a solid space when a three-dimensional image is projected, and which can enhance the resolution and image quality of a three-dimensional image displayed in a space, thereby enhancing the appearance of solidity.

In addition, by providing means for changing the transmittance of the screen in response to the environmental brightness, it is possible to prevent deterioration in resolution and quality of a three-dimensional image displayed in a space and thus to provide a feeling of solidity. Accordingly, it is possible to embody a projection-type three-dimensional image display apparatus capable of providing a realistic sensation like a solid space. As a result, it is possible to provide a projection-type three-dimensional image display apparatus capable of accomplishing quality such as high resolution, high image quality, and high feeling of solidity, which could not be accomplished by the convention liquid crystal panel or plasma display panel, with a simple structure and low cost by the use of a simple optical system including the spatial light modulator and the image forming screen of which the transmittance can be electrically controlled.

Fifth Embodiment

Figure 11:
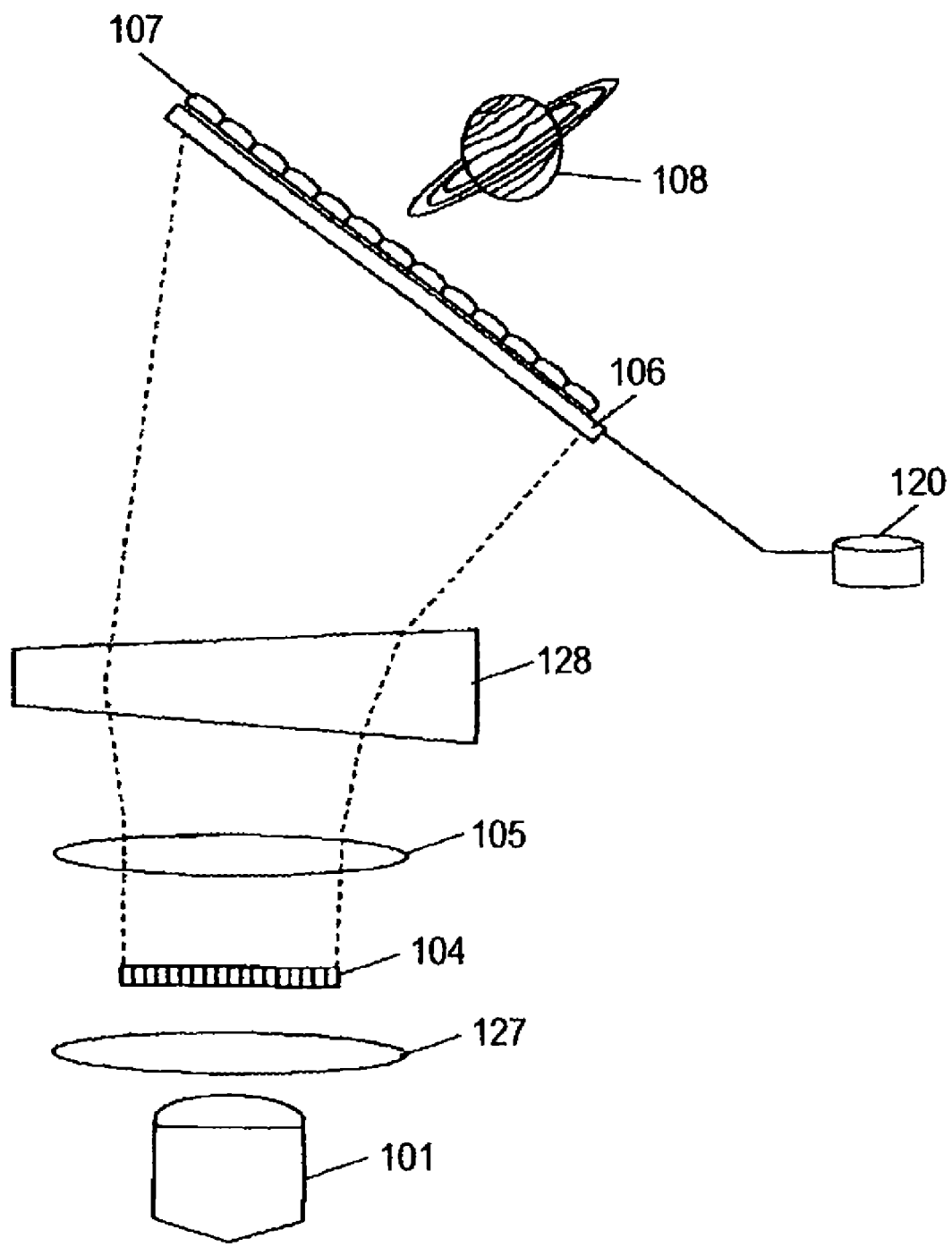
FIG. 11 is a diagram schematically illustrating a configuration of a projection-type three-dimensional image display apparatus according to a fifth embodiment of the present invention.

FIG. 11 is a diagram schematically illustrating a configuration of a projection-type three-dimensional image display apparatus according to a fifth embodiment of the present invention. As shown in FIG. 11, the projection-type three-dimensional image display apparatus according to the fifth embodiment includes a light source 101, a condenser lens 127 disposed in front of the light source 101, a projection device 104 disposed in front of the condenser lens 127, a projection lens 105 disposed in front of the projection device 104, a prism 128 disposed in front of the projection lens 105, an image forming screen 106 disposed in front of the prism 128 to form a predetermined angel about the prism 128, a convex lens array 107 disposed on the front main surface of the image forming screen 106, and a light sensor 120 connected to the image forming screen 106. In FIG. 11, the side on which a three-dimensional image 108 is formed is a front side and the opposite side is a back side.

In the projection-type three-dimensional image display apparatus according to the fifth embodiment, the light 102 emitted from the light source 101 in FIG. 11 is collected by the condenser lens 127 and is incident on the projection device 104 as the projection means for controlling the shape of a projection image. An example of the projection device 104 can include a transmissive liquid crystal panel.

The light incident on the projection device 104 is modulated in accordance with projection image information by the projection device 104 and image information is added thereto. The light modulated by the projection device 104 passes through the projection lens 105, and a projection angle of the light is changed by the prism 128 and is projected to the image forming screen 106, thereby forming a projection image. Here, in the projection-type three-dimensional image display apparatus according to the fifth embodiment, since the formed projection image is a ray-traced image formed by the integral photography method, the projection image can form a three-dimensional image 108 in a space through the convex lens array 107. In addition, in the projection-type three-dimensional image display apparatus according to the fifth embodiment, since a projection plane is changed through the prism 128, it is possible to enhance the degree of freedom in design of the projection-type three-dimensional image display apparatus.

In the projection-type three-dimensional image display apparatus according to the fifth embodiment shown in FIG. 11, a white LED is used as the light source 101. In addition to the white LED, LEDs of various colors, an organic EL device, or a halogen lamp may be used as the light source 101. In addition, in the projection-type three-dimensional image display apparatus according to the fifth embodiment shown in FIG. 11, a liquid crystal screen is employed as the image forming screen 106 of which transmittance can be electrically controlled.

In the fifth embodiment, similarly to the fourth embodiment, when the element images of the viewing-point image having the parallax information is not projected, the existence of the image forming screen 106 is made to be invisible by enhancing the transmittance of the image forming screen 106 to the maximum transmission status to make the image forming screen transparent. When the element images of the viewing-point image having the parallax information is projected to form a three-dimensional solid image, the contrast of the element images of the viewing-point image having the parallax information is made to the optimum status by controlling the transmittance of the image forming screen 106 with change of the applied voltage depending upon the environmental brightness. As described with reference to the fourth embodiment, the transmittance can be controlled by the use of the light sensor 120, or may be controlled by the use of an additional manual variable resistor.

The diameter of the convex lens 112 according to the present invention is about 1.5 mm similarly to the fourth embodiment and the resolution of the projection image projected to and formed on the image forming screen 106 is about 200 dpi. In this case, the reproduction element image 109 of each lens is a 10×10 pixel image and a smooth three-dimensional solid image of which the number of horizontal and vertical parallaxes is 10 eye-shots can be reproduced. When the resolution of the formed projection image is less than or equal to 200 dpi, it is difficult to obtain a smooth reproduced solid image. Although a trade-off against data processing time, in order to obtain a three-dimensional solid image as smooth as possible, the reproduction element image 109 with a resolution of 200 to 700 dpi can be effectively reproduced by the use of a lens with a diameter of 1.5 mm or less.

As a result, similarly to the fourth embodiment, it is possible to embody a projection-type three-dimensional image display apparatus which can be recognized as an empty space when no image is projected, which can provide a realistic sensation like a solid space when a three-dimensional image is projected, and which can enhance the resolution and image quality of a three-dimensional image displayed in a space, thereby enhancing the appearance of solidity.

Sixth Embodiment

A three-dimensional image communication terminal according to a sixth embodiment of the present invention includes the projection-type three-dimensional image reproduction apparatus according to the second to fifth embodiments of the present invention built therein.

Figure 12:
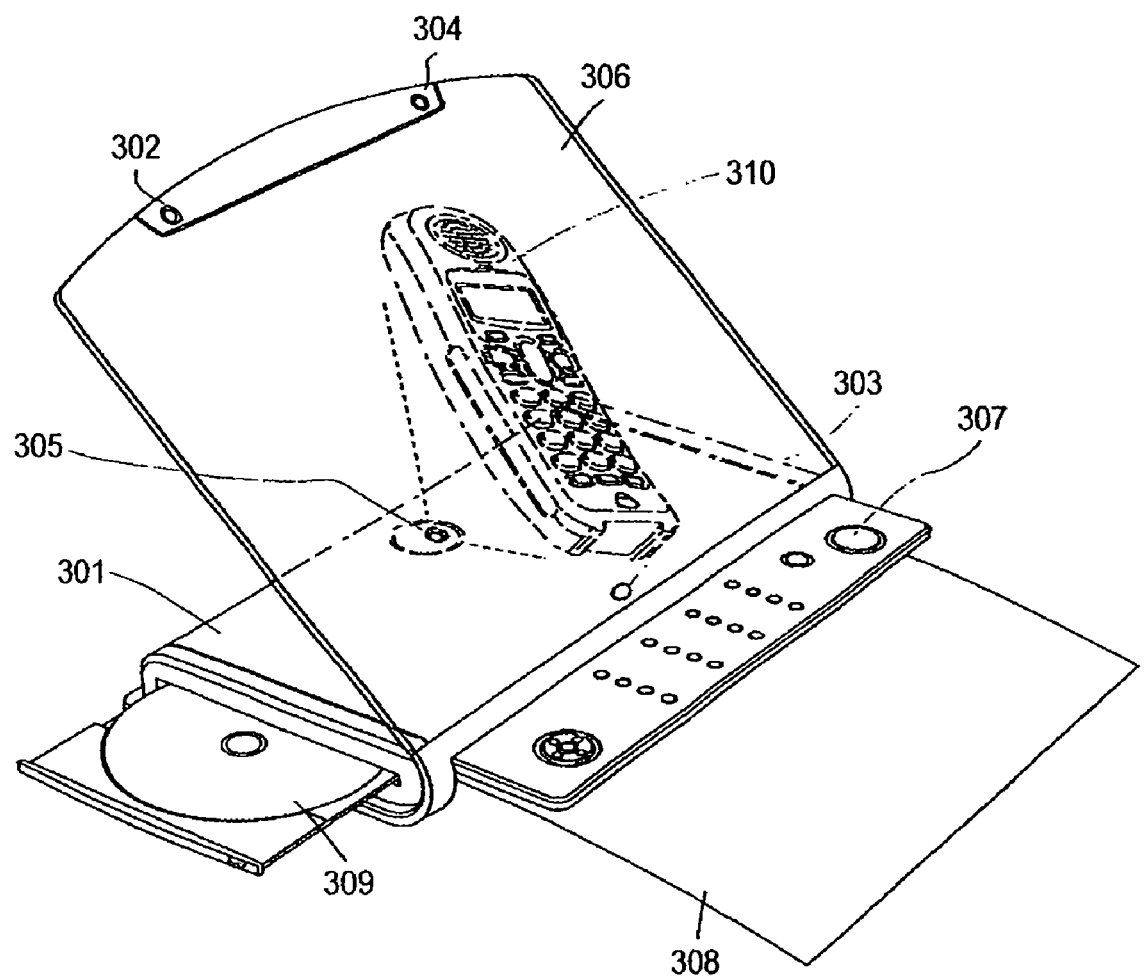
FIG. 12 is a diagram illustrating an appearance of a projection-type three-dimensional image display apparatus according to a sixth embodiment of the present invention.

In FIG. 12, a reference numeral 301 denotes a case of the three-dimensional image communication terminal. In the case 301, for example, three cameras 302, 303, and 304 as an input unit for inputting a three-dimensional image can be mounted on a display unit 306. Directional image information as viewing a three-dimensional image in various directions can be obtained by the use of three cameras 302, 303, and 304.

CCD cameras or CMOS cameras may be used as the above-mentioned cameras, which have preferably the number of pixels of about 1,000,000 to 2,000,000. In order to express metallic luster or material texture of an object such as glass, cloth, leather, and plant as the three-dimensional object, the amount of information with the number of pixels less than 1,000,000 is too small and the amount of information with the number of pixels greater than or equal to 1,000,000 is sufficient. The number of pixels less than or equal to 2,000,000 can prevent the amount of data to be transmitted by a communication terminal from increasing too large.

Of course, when it is not necessary for a communication terminal to transmit three-dimensional image information or when it is possible to transmit a large amount of data due to a high-rate transmission path or the like, it is not necessary to limit the number of pixels to 2,000,000 pixels or less.

The directional image information is two-dimensional bit map information including parallax information in the vertical direction and the horizontal direction of the photographed three-dimensional object. The two-dimensional bit map information is obtained by processing the directional images in three directions photographed by the three cameras and interpolating images between the three images.

By carrying out display of an image by the use of the integral photography method described in the embodiments of the present invention using the two-dimensional bit map information, it is possible to obtain a solid image of the photographed object. The installation positions of cameras and the number of cameras can be arbitrarily selected, but it is preferable that the number of cameras is three or more and the cameras are disposed around the display unit 306 to be distributed horizontally and vertically.

This is because the horizontal parallax information and the vertical parallax information can be added to the photographed image by disposing the cameras around the display unit 306 to be distributed vertically and horizontally.

When the number of cameras is three, it is preferable that two cameras 302 are disposed at both horizontal sides in the upper portion of the display unit 306 and the other camera 303 is disposed at the center in the lower portion of the display unit 306 below the two cameras.

In this arrangement, the amount of horizontal parallax information is sufficient and the amount of vertical parallax information is slightly small.

However, since human eyes are sensitive to the horizontal information but not sensitive to the vertical information, the information on a three-dimensional object can be more efficiently delivered with a small amount of information.

A reference numeral 305 denotes a three-dimensional image projection unit. The three-dimensional image projection unit 305 projects the two-dimensional bit map information including the obtained information on the three-dimensional object to the display unit 306.

The methods according to the second to fifth embodiments are used as a principle for the projection. Accordingly, the three-dimensional image projection unit 305 and the display unit 306 are based on the principles according to the second to fifth embodiments.

Therefore, in the display unit 306, the light projected from the three-dimensional image projection unit 305 as the image forming screen is formed as a projection image. The display unit 306 includes, for example, a hologram diffusion plate. The binary optical elements 29 are attached to the display unit 306 and are means for controlling light to form an image in a space by the use of the diffraction effect of light. The binary optical elements serve to form the projection image formed in the display unit 306 as a three-dimensional solid image 310 in a space.

In addition, the display unit 306 employs a liquid crystal screen so as to electrically control the transmittance thereof. When the element images of the viewing-point image having the parallax information are not projected, the existence of the display unit 306 is made to be invisible by enhancing the transmittance of the display unit 306 to the maximum transmission status to make the display unit transparent. When the element images of the viewing-point image having the parallax information is projected to form a three-dimensional solid image, the contrast of the element images of the viewing-point image having the parallax information is made to the optimum status by controlling the transmittance of the display unit 306 with change of the applied voltage depending upon the environmental brightness. As described with reference to the fourth embodiment, the transmittance can be controlled by the use of the light sensor 120, or may be controlled by the use of an additional manual variable resistor.

A reference numeral 307 denotes a manipulation unit. A user can start communication with a counter party or display or photograph a three-dimensional object by manipulating the manipulation unit 307. A reference numeral 308 is a scanner/printer. The scanner/printer 308 can display the three-dimensional object in the display unit 306 by reading the three-dimensional image information (such as the two-dimensional bit map information including the parallax information) and can serve as a conventional facsimile to print image information from the counter party.

A reference numeral 309 denotes a disk drive. By mounting a disk having the three-dimensional image information on the disk drive 309 and manipulating the manipulation unit 307 for display, it is possible to three-dimensionally display a solid object in the display unit 306.

A reference numeral 310 denotes an image of the three-dimensional object displayed in the display unit 306. The displayed image of the three-dimensional object may result from the three-dimensional image information transmitted through the communication with the counter party, a three-dimensional image photographed by the cameras 302, 303, and 304, the three-dimensional image information read by the scanner/printer 308 as described above, or the three-dimensional image information output from the disk having the three-dimensional image information mounted on the disk drive 309.

Now, other embodiments of the present invention will be described.

In the following embodiments, the axis direction perpendicular to the fly-eye lens is defined as a Z axis direction or a viewing-line direction, the side apart from an observer with respect to a predetermined object (for example, the fly-eye lens) is defined as a back side or an opposite side, and the side close to the observer is defined as a front side. However, the directions in the apparatus are not limited to the above-mentioned directions.

Seventh Embodiment

Figure 13:
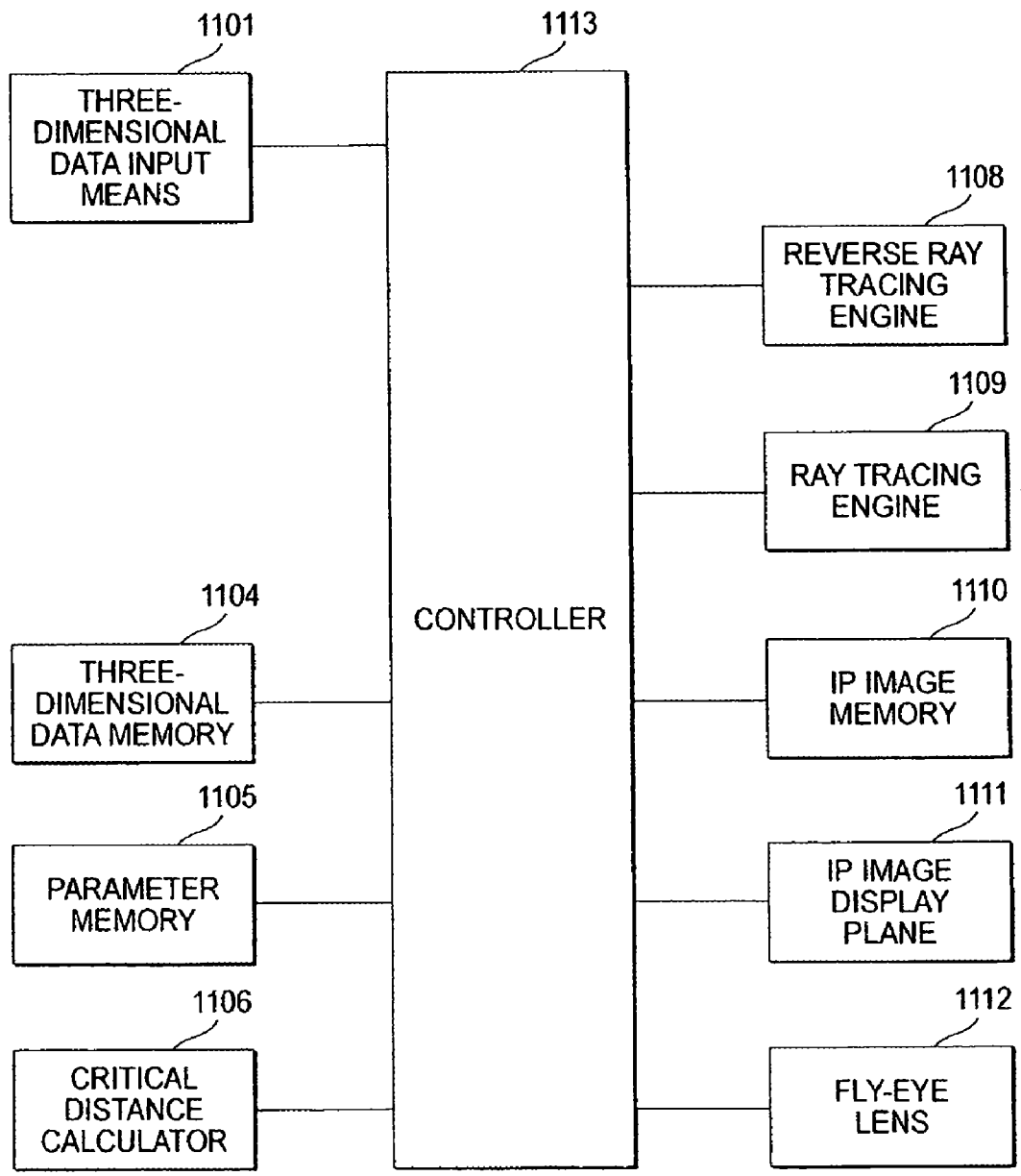
FIG. 13 is a functional block diagram illustrating an IP image forming apparatus according to a seventh embodiment of the present invention.

FIG. 13 is a functional block diagram illustrating an IP image forming apparatus according to a seventh embodiment of the present invention. In FIG. 13, a reference numeral 1101 denotes three-dimensional data input means, a reference numeral 1104 denotes a three-dimensional data memory as three-dimensional data memory means, a reference numeral 1105 denotes a parameter memory, a reference numeral 1106 denotes a critical distance calculator, a reference numeral 1108 denotes a reverse ray tracing engine, a reference numeral 1109 denotes a ray tracing engine, a reference numeral 1110 denotes an IP image memory as IP image memory means, a reference numeral 1111 denotes an IP image display plane, a reference numeral 1112 denotes a fly-eye lens, and a reference numeral 1113 denotes a controller.

The three-dimensional data input means 1101 receives three-dimensional data of a voxel cube, that is, X, Y, and Z coordinates and color information of the voxel cube, from an external device or storage medium. The three-dimensional data memory 1104 temporarily stores the three-dimensional data, that is, the X, Y, and Z coordinates and the color information of the voxel cube.

The parameter memory 1105 stores parameters necessary for rendering the three-dimensional data. Examples of the parameters are as follows.

Diameter of the fly-eye lens 1112
Distance between the main point of the fly-eye lens 1112 and the IP image display plane 1111
Geometrical arrangement of the fly-eye lens 1112
Density of the voxel cube (length of a side of the voxel cube)
Pixel size of an IP image (pixel size)

The critical distance calculator 1106 calculates Z coordinate values (hereinafter, referred to as a critical distance), in which the size of the voxel cube projected to the IP image display plane 1111 is equal to the pixel size on the IP image display plane 1111, on the basis of the X or Y coordinates of the voxel cube with reference to the parameter memory 1105.

The reverse ray tracing engine 1108 virtually traces a ray passing through the main point of the fly-eye lens from the voxel cube, obtains the pixel position where the ray intersects the IP image display plane 1111 through operation, and checks that the pixel on the IP image display plane 1111 corresponding to the voxel cube is a "pixel coated with the color of the voxel cube."

The ray tracing engine 1109 virtually traces rays passing through the main point of the fly-eye lens from the pixels constituting the IP image display plane, checks whether the rays intersect all the voxel cubes by operation, and checks that the pixel on the IP image display plane corresponding to the voxel cube is a "pixel coated with the color of the voxel cube" when the rays intersect all the voxel cubes. The IP image memory 1110 stores the rendering result. The IP image display plane 1111 displays an image on the basis of the data stored in the IP image memory. The controller 1113 controls all the units.

Figure 14:
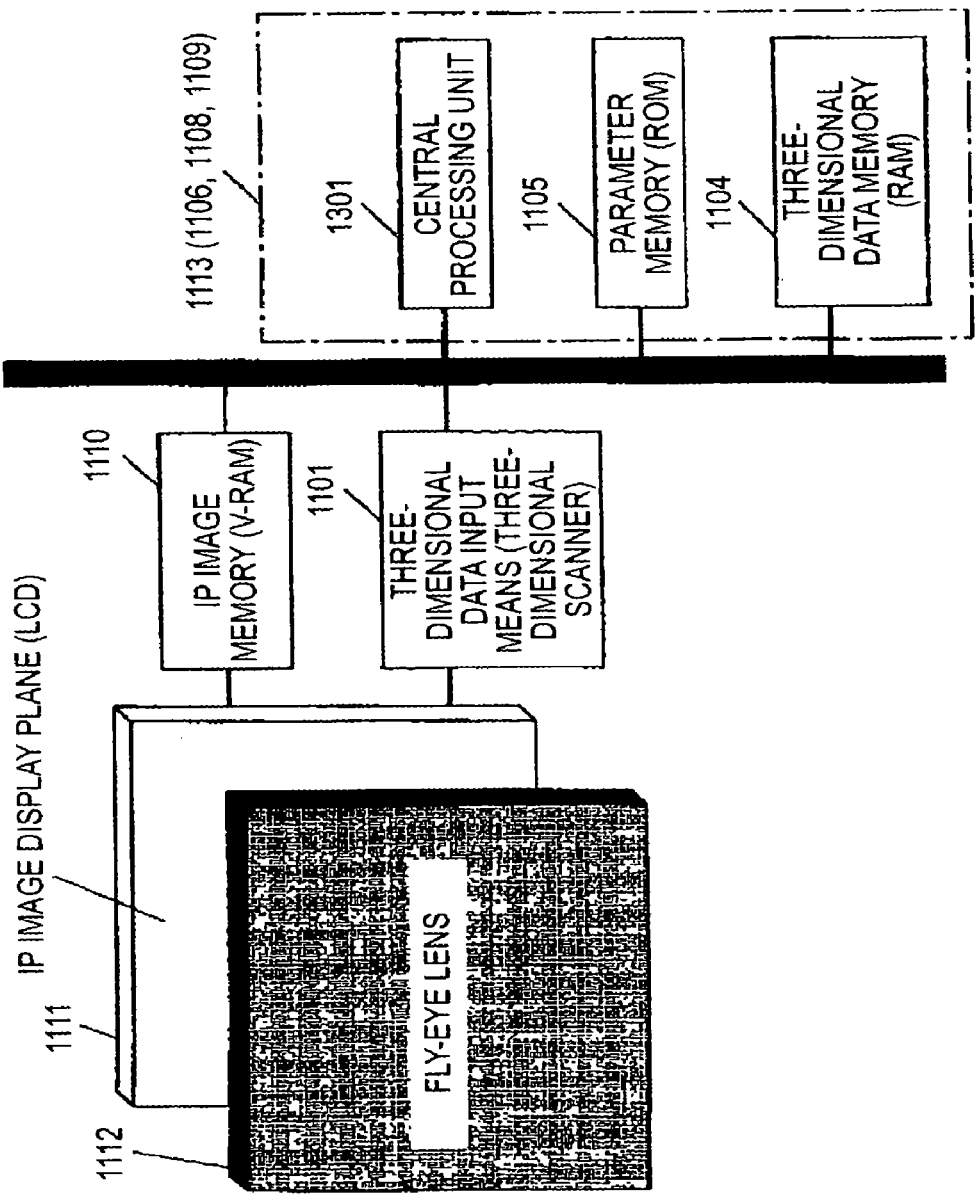
FIG. 14 is a block diagram illustrating the IP image forming apparatus according to the seventh embodiment of the present invention relatively to specific hardware elements.

FIG. 14 is a block diagram illustrating the IP image forming apparatus according to the seventh embodiment of the present invention relatively to specific hardware components. In FIG. 14, the three-dimensional data input means 1101 specifically includes a three-dimensional scanner. The three-dimensional data memory 1104 includes RAM. The parameter memory 1105 includes ROM. The IP image memory 1110 includes V-RAM. The IP image display plane 1111 includes an LCS (liquid crystal monitor). The critical distance calculator 1106, the reverse ray tracing engine 1108, the ray tracing engine 1109, and the controller 1113 are constructed so that a central processing unit (CPU) 1301 executes a program stored in the parameter memory 1105 while referring to a variety of data stored in the parameter memory 1105 or referring to or changing data stored in the three-dimensional data memory 1104.

Figure 15:
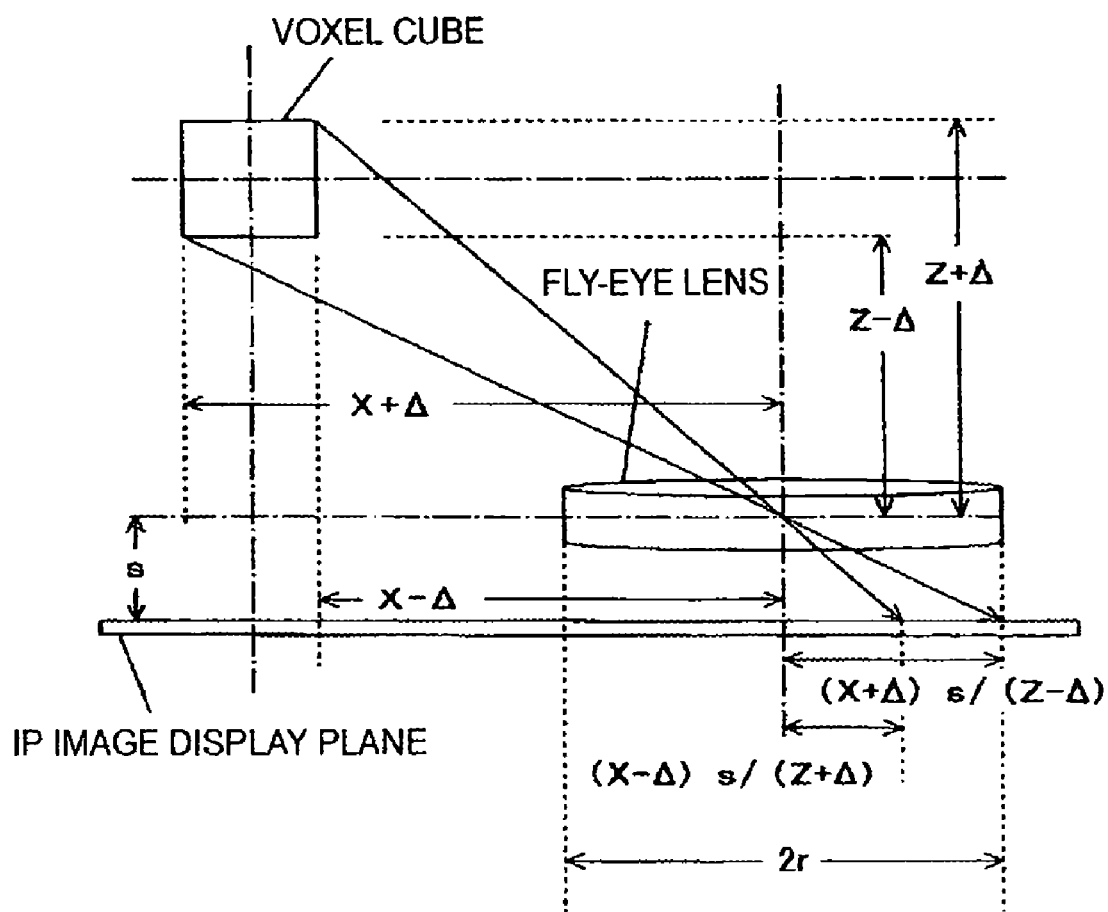
FIG. 15 is a diagram illustrating a geometrical relation between a voxel cube and an image of the voxel cube formed on an IP image display plane according to the seventh embodiment of the present invention.
Figure 16:
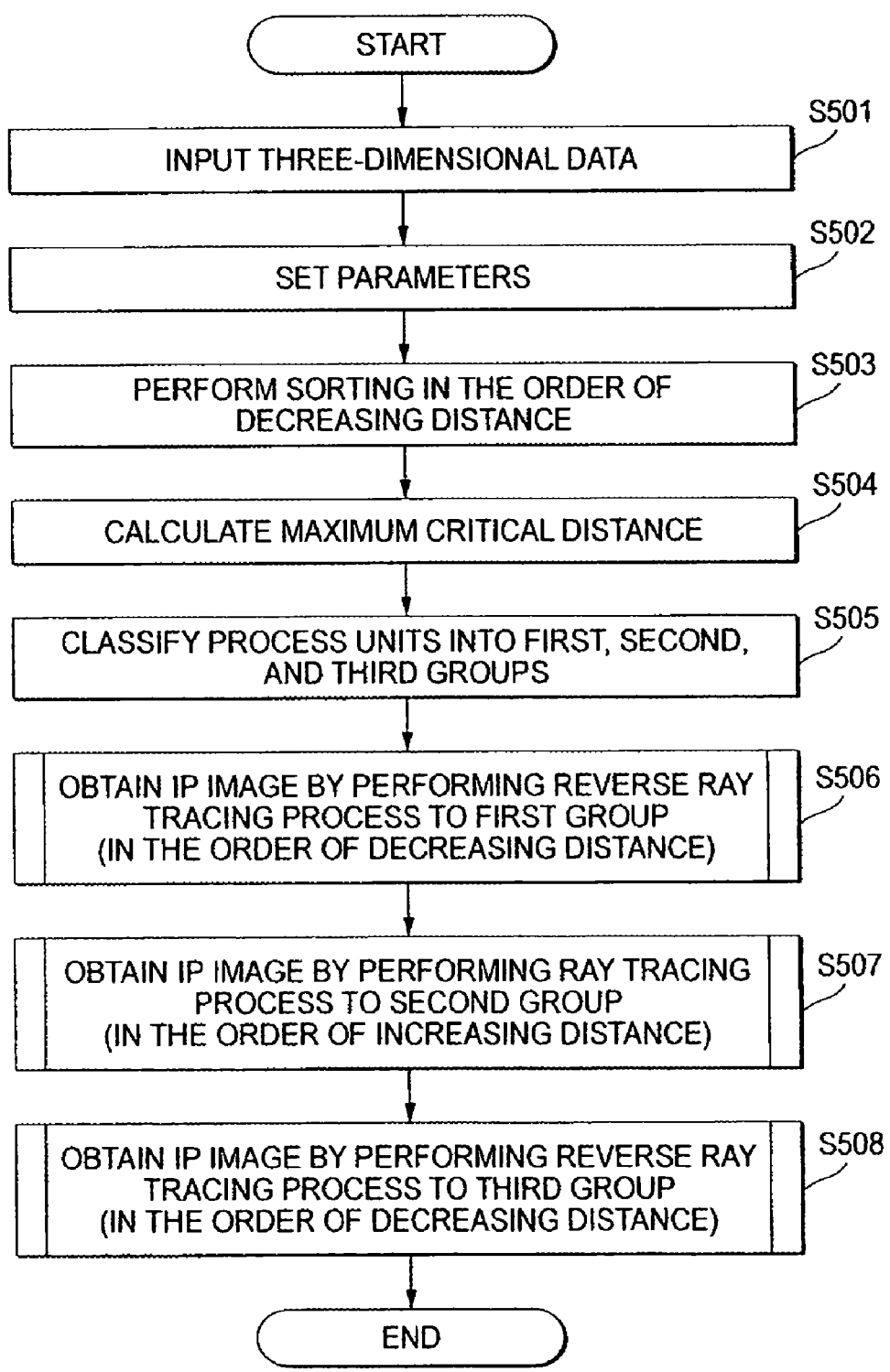
FIG. 16 is a flowchart schematically illustrating entire operations of the IP image forming apparatus according to the seventh embodiment of the present invention.

Here, the geometrical positional relation between the voxel cubes and the fly-eye lens 1112 is equal to the positional relation shown in FIG. 15, which illustrates the geometrical relation between a voxel cube and an image of the voxel cube formed on the IP image display plane according to the seventh embodiment of the present invention. At this time, the size d of the IP image corresponding to the voxel cube is as follows:

$$d=(X+\Delta)\times s/(Z-\Delta)-(X+\Delta)\times s/(Z+\Delta) \quad \text{(Expression 1)}$$

where a length of one side of the voxel cube=$2\Delta$, a diameter of the lens 1112=$2r$, a distance in the Z direction from the main point of the lens 1112 to the center of the voxel cube=$Z$, a distance in the X direction from the main point of the lens 1112 to the center of the voxel cube=$X$, and a distance between the main point of the lens 1112 and the IP image display plane=$s$.

The following expression is obtained from Expression 1:

$$d=2\times s\times\Delta\times(X+Z)/(Z2-\Delta2) \quad \text{(Expression 2)}$$

Therefore, when an image size (pixel size) on the IP image display plane is $\epsilon$, it can be seen that the voxel cube satisfying $\epsilon\geq d$ is determined by the coordinates of X and Z.

The following expression is obtained from Expression 2 using $d=\epsilon$ and $Z\geq 0$.

$$Z=\{s\times\Delta+(s2\times\Delta2+d2\times\Delta2+2\times d\times s\times\Delta\times X)0.5\}/d \quad \text{(Expression 3)}$$

Here, when the value of X is determined, it can be seen that the value of Z is obtained.

Since the values of X coordinate of the voxel cubes are discrete, it can be seen that Z (X)=critical distance (X) satisfying $\epsilon\geq d$ can be tabled by tabling the value of Z for each value of X. By considering that Expression 2 is a decreasing function in $Z\geq 0$ and comparing the critical distance of a voxel cube obtained from the table with the coordinate values of Z, it can be seen whether the size of the corresponding IP image is greater than the pixel size. That is, when the Z coordinate value is greater than the critical distance, the size of the IP image is smaller than the pixel size.

Although the two dimensions of X and Z have been described here, the imaging size in the Y direction can be determined in the three dimensions by the same calculation. Here, the description thereof is omitted.

By considering that the lens 1112 captures the voxel cube at the minimum incident angle when d is greatest, the following expression is established.

$$r=(X+\Delta)\times s/(Z-\Delta) \quad \text{(Expression 4)}$$

By erasing X from Expression 1 and Expression 4, d is obtained as follows.

$$d(\max)=2\times\Delta\times(s+r)/(Z+\Delta) \quad \text{(Expression 5)}$$

Therefore, when the Z coordinate value of the voxel cube satisfies the following conditional expression:

$$\epsilon\geq d(\max),$$

it can be guaranteed the IP images of the neighboring voxel cubes are not discontinuous. Therefore, the following expression is obtained from Expression 5 using $\epsilon=d(\max)$:

$$Z\geq\epsilon\times\Delta/(\Delta\times s+\Delta\times r-\epsilon)=\text{maximum critical distance}$$

Accordingly, even when the voxel cubes are captured at the minimum incident angle, it can be guaranteed that the IP images are continuous. Therefore, when the Z coordinate value is greater than the maximum critical distance regardless of the coordinates of X (or Y), the corresponding IP image is greater than the pixel size $\epsilon$ (converses are not established). Since it cannot be said that the voxel cube is located to satisfy the minimum incident angle with respect to the lens 1112, the size of the IP image may be greater than $\epsilon$ even when the Z coordinate value is less than the maximum critical distance. For example, in the voxel cube located right above the main point of the lens 1112, even when the Z coordinate value is greater than the critical distance, the size of the corresponding image may be greater than $\epsilon$.

Operations of the IP image forming apparatus will be described on the basis of the above description. Entire operations are first schematically described with reference to the flowchart shown in FIG. 16 and then details of a rendering process are described with reference to FIGS. 17 and 19.

(Step S501)

The controller 1113 acquires three-dimensional data of an object through the three-dimensional data input means 1101. The input three-dimensional data includes X, Y, and Z coordinates of the voxel cubes into which the object is divided with a predetermined resolution and colors of the voxel cubes. The controller 1113 receives the three-dimensional data and the resolution of the object and writes the received three-dimensional data and the resolution to the three-dimensional data memory 1104.

(Step S502)

Next, the controller 1113 writes the resolution of the voxel cubes, that is, a "length of a side of a voxel cube (=2Δ)", a "predetermined distance between the main point of the fly-eye lens 1112 and the IP image display plane 1111 (=s)", a "diameter of the fly-eye lens 1112 (=2r)", and a "size of a pixel of the IP image display plane (=ε)" to the parameter memory 1105 with reference to the three-dimensional data memory 1104.

(Step S503)

The controller 1113 performs a sorting process in the descending order (the order of decreasing a distance from the observer) by using the Z coordinate values as a sort key with reference to the three-dimensional data memory 1104 and writes again the sorted data to the three-dimensional data memory 1104.

(Step S504)

The controller 1113 requests the critical distance calculator 1106 to calculate the maximum critical distance. Then, the critical distance calculator 1106 calculates the maximum critical distance from the above-mentioned expressions with reference to the parameter memory 1105 and additionally writes the calculated maximum critical distance to the parameter memory 1105.

(Step S505)

The controller 1113 divides the data stored in the three-dimensional data memory 1104 into three groups on the basis of the critical distance calculated in step S504 with reference to the parameter memory 1105: the data are divided into a group of voxel cubes (hereinafter, referred to as a first group) in which the Z coordinate value on the back side of the fly-eye lens 1112 as seen from the observer is greater than the maximum critical distance; a group of voxel cubes (hereinafter, referred to as a second group) in which the absolute value of the Z coordinate value in the vicinity of the fly-eye lens 1112 is smaller than the maximum critical distance; and a group of voxel cubes (hereinafter, referred to as a third group) in which the absolute value of the Z coordinate value on the front side of the fly-eye lens 1112 is greater than the maximum critical distance. Here, the back side of the fly-eye lens 1112 is plus in the Z coordinate. On the other hand, step S505 constitutes determination means for determining whether the coordinate value on a normal axis (Z axis) of the voxel cube is greater than the maximum critical distance. In addition, step S505 constitutes determination means for determining whether the IP image corresponding to the voxel cube is greater than the pixel on the IP image display plane.

That is, in the normal axis perpendicular to the fly-eye lens 1112 in which the opposite side of the viewing point is plus, when a position apart by a first maximum critical distance toward the opposite side of the viewing point from the fly-eye lens 1112 is assumed as a first boundary position and a position apart by a second maximum critical distance toward the viewing point from the fly-eye lens 1112 is assumed as a second boundary position, the first group has normal axis coordinate values greater than the first boundary position, the second group has normal coordinate values less than or equal to the first boundary position and greater than the second boundary position, and the third group has normal coordinate values less than or equal to the second boundary position. The data indicating the boundaries between the groups are additionally written to the three-dimensional data memory 1104.

(Step S506)

The controller 1113 requests the reverse ray tracing engine 1108 to perform a rendering process to the voxel cubes belonging to the first group and being stored in the three-dimensional data memory 1104. Details of the rendering process (reverse ray tracing process) will be described later. The rendering result is written to the IP image memory 1110.

(Step S507)

The controller 1113 requests the ray tracing engine 1109 to perform a rendering process to the voxel cubes belonging to the second group and being stored in the three-dimensional data memory 1104. Details of the rendering process (ray tracing process) will be described later. The rendering result is written to the IP image memory 1110.

(Step S508)

The controller 1113 requests the reverse ray tracing engine 1108 to perform a rendering process to the voxel cubes belonging to the third group and being stored in the three-dimensional data memory 1104. Details of the rendering process will be described later. The rendering result is written to the IP image memory 1110.

In this way, by displaying contents written to the IP image memory 1110 on the IP image display plane 1111 and observing the displayed image through the fly-eye lens 1112, the same object as the object input through the three-dimensional data input means 1101 is obtained as a three-dimensional image.

On the other hand, as described above, step S505 constitutes the determination means for determining whether the coordinate value on the normal axis (Z axis) of the voxel cube is greater than the maximum critical distance. When the coordinate value of the fly-eye lens 1112 is "0", the absolute value of the coordinate value of the voxel cube may be compared with the maximum critical distance, whether it is located in the front side or the back side of the fly-eye lens 1112. In this case, the data are divided into two groups. However, since the reverse ray tracing process performed in step S508 is similar to that described above, there is no problem.

Figure 17:
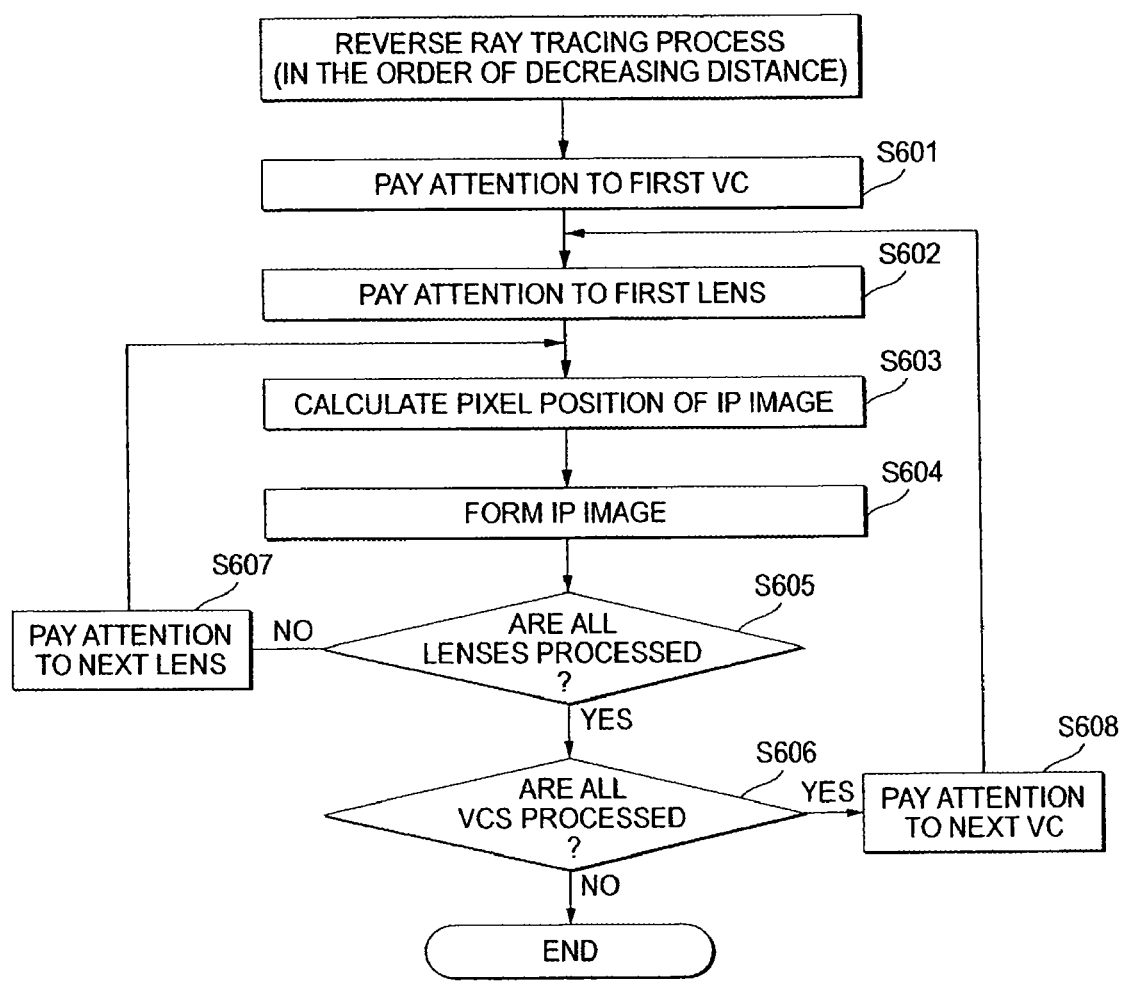
FIG. 17 is a flowchart illustrating an operation of obtaining an IP image by performing a reverse ray tracing process to voxel cubes sorted in the order of decreasing a distance from a viewing point according to the seventh embodiment of the present invention.
Figure 19:
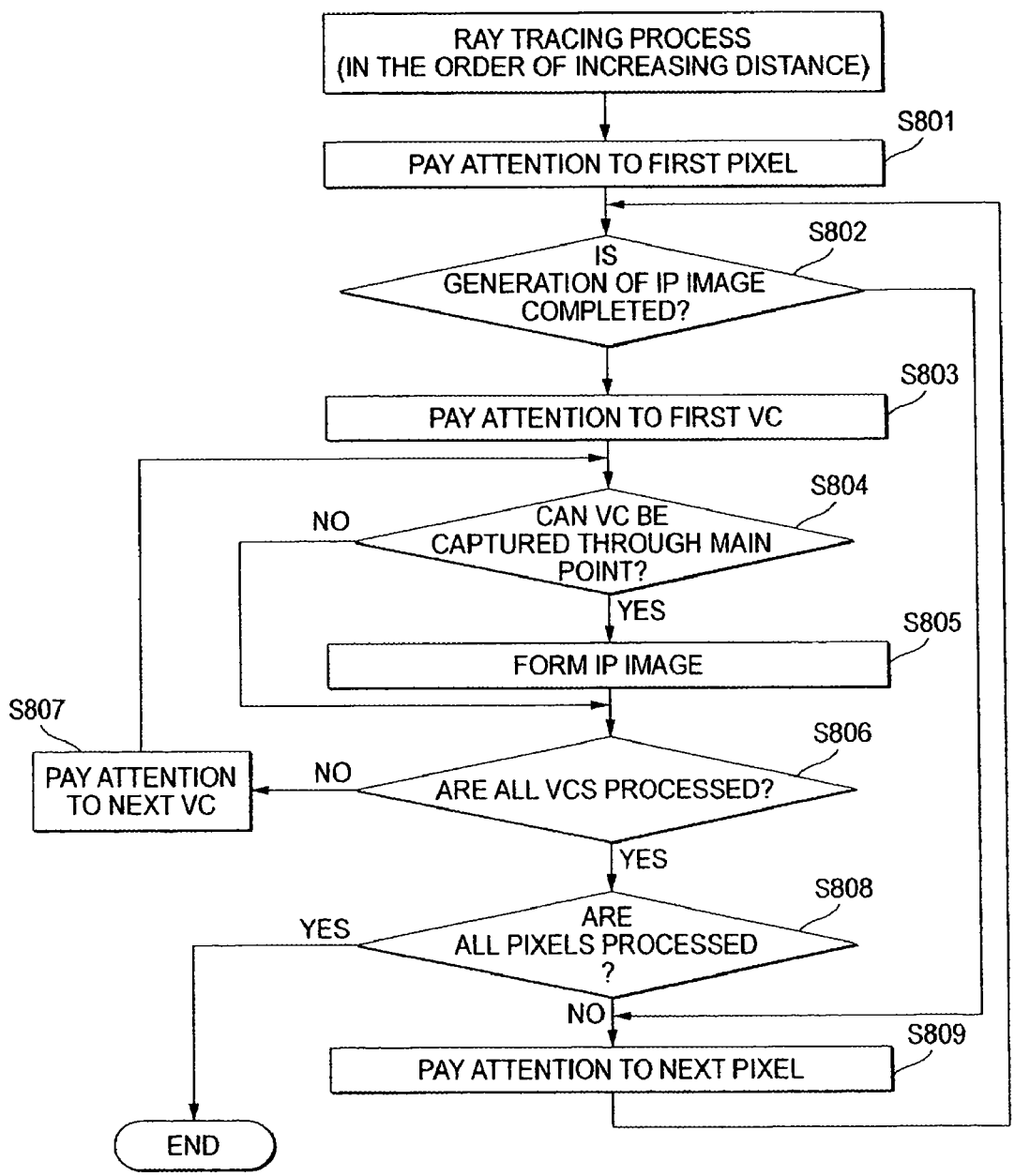
FIG. 19 is a flowchart illustrating an operation of obtaining an IP image by performing a ray tracing process to voxel cubes sorted in the order of increasing a distance from a viewing point according to the seventh embodiment of the present invention.

Next, details of the rendering processes are described with reference to the flowchart shown in FIGS. 17 and 19. The reverse ray tracing process in step S506 is first described with reference to the flowchart shown in FIG. 17.

(Step S601)

The reverse ray tracing engine 1108 pays attention to the first voxel cube (VC).

(Step S602)

The reverse ray tracing engine 1108 pays attention to the first lens.

(Step S603)

The reverse ray tracing engine 1108 calculates a pixel position of the IP image from the positional relation between the lens and the voxel cube under notice. That is, when a ray is irradiated from the voxel cube under notice to the main point of the lens under notice, it is calculated from the geometric positional relation which position of the IP image display plane the ray reaches (coordinates of a pixel are calculated).

(Step S604)

Figure 18:
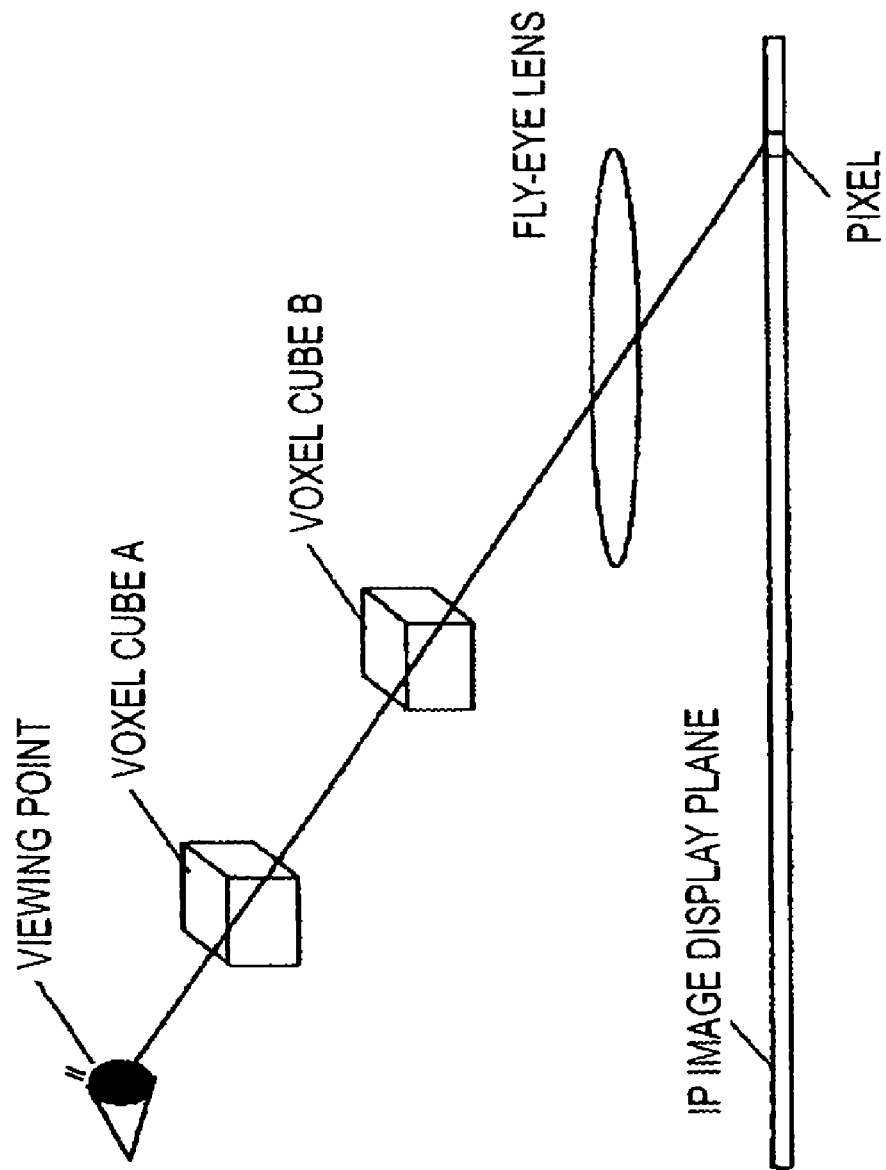
FIG. 18 is a diagram illustrating positional relations among a viewing line, a voxel cube, a fly-eye lens, and an IP image display plane according to the first embodiment of the present invention.

The reverse ray tracing engine 1108 writes the color information of the voxel cube to an address corresponding to the pixel position obtained in step S603, that is, the pixel position obtained from the IP image memory 1110. Here, when the color information is written, the color information of another voxel cube may be written in advance to the pixel position. FIG. 18 shows such a case. As shown in FIG. 18, when two voxel cubes exist on the line connecting the viewing point and the main point of the lens, the color information is written to the same pixel position on the IP image display plane. However, since the voxel cube data are sorted in the order of decreasing a distance from the Z axis, the color information can be overwritten to the pixel position even when the color information is previously written to the pixel position. This is because it can be guaranteed that the voxel cube having the smaller Z coordinate value is always located further in front of the viewing point. Accordingly, since the color information of the voxel cube existing in front of the viewing point is always overwritten, it is possible to prevent the phenomenon that "a thing which must not be visible is visible" when observing the three-dimensional image.

(Step S605)

The reverse ray tracing engine 1108 checks whether all the lenses are processed. When all the lenses are processed, step S606 is performed and otherwise step S607 is performed.

(Step S606)

The reverse ray tracing engine 1108 checks whether all the voxel cubes are processed. When all the voxel cubes are not processed, step S608 is performed and otherwise the procedure is ended.

(Step S607)

The reverse ray tracing engine 1108 changes the lens under notice to the next lens. Then, step S603 is performed.

(Step S608)

The reverse ray tracing engine 1108 changes the voxel cube under notice to the next voxel cube. Then, step S602 is performed.

In this way, the process of obtaining the IP images of all the voxel cubes is ended. In the seventh embodiment, the order of changing the lens under notice is not particularly mentioned, but, for example, a method of setting the primary scanning direction from the left-upper portion to the right-lower portion and setting the secondary scanning direction from the left to the right may be used. A method of performing the scanning in a zigzag manner from the upside to the downside or a method of giving a particular order to the respective lenses on the basis of a concept of interleave may also be used. All the methods described above do not depart from the gist of the present invention.

Next, a tracing process of step S507 is described with reference to the flowchart shown in FIG. 7.

(Step S801)

The ray tracing engine 1109 pays attention to the first pixel on the IP image display plane 1111.

(Step S802)

The ray tracing engine 1109 checks whether the pixel under notice is already processed. When the pixel under notice is processed, step S809 is performed and otherwise step S803 is performed.

(Step S803)

The ray tracing engine 1109 pays attention to the first voxel cube. Here, the "first" voxel cube means a voxel cube located at the most back side among the voxel cubes belonging to the second group. That is, the voxel cubes are processed from the front side to the back side.

(Step S804)

The ray tracing engine 1109 checks on the basis of the geometrical positional relation whether the voxel cube under notice can be captured by the use of a straight line extending from the coordinate position of the pixel under notice to the main point of the lens, that is, whether the "pixel under notice", the "main point of a lens (a lens right above the pixel under notice", and the "voxel cube under notice" exist in the same line. This method is an "intersection check method" used in the ray tracing process and a variety of methods are suggested. Here, details of the method are not described. When the voxel cube is captured by the use of the line passing through the main point, step S805 is performed and otherwise step S806 is performed.

(Step S805)

The ray tracing engine 1109 writes the color information of the voxel cube under notice and data indicating that "the color information is written" to the address corresponding to the pixel under notice in the IP image memory 1110. Here, the color information is expressed in 24 bits. The IP image memory 1110 allocates 32 bits to a pixel. The most significant bit indicates whether "the color information is written." The next 24 bits indicate the color information. Data indicating "no color information is written" to all the pixels are initially set in the IP image memory.

(Step S806)

The ray tracing engine 1109 checks whether all the given voxel cubes are processed. When all the voxel cubes are not processed, step S808 is performed and otherwise step S807 is performed.

(Step S807)

The ray tracing engine 1109 changes the voxel cube under notice to the next voxel cube. Here, the next voxel cube means a voxel cube by one before in the sorted order. That is, the voxel cubes are processed from the front side to the back side in the Z direction. Then, step S804 is performed.

(Step S808)

The ray tracing engine 1109 checks whether all the pixels on the IP image display plane 1111 are processed. When it is checked that all the pixels are not processed, step S809 is performed and otherwise the process is ended.

(Step S809)

The ray tracing engine 1109 changes the pixel under notice to the next pixel. Then, step S802 is performed.

As described above, in the IP image forming method according to the seventh embodiment, it is checked on the basis of the density of constituent elements (voxel cubes) of the three-dimensional object and the resolution of the IP image display plane whether the image of a voxel cube has a size greater than that of the pixel on the IP image display plane. The conventional ray tracing process is performed when the image size of the voxel cube is greater than the pixel size and the reverse ray tracing process is performed when the image size of the voxel cube is smaller than the pixel size, thereby forming an IP image. Accordingly, it is possible to form an IP image which fast reproduces an object apart from the lens and which accurately reproduces an object close to the lens "without any sparse image sparse."

In the IP image forming method according to the seventh embodiment, it is assumed that the fly-eye lens captures the voxel cube at the minimum incident angle and the Z coordinate value of the voxel cube of which the image size is equal to the pixel size on the IP image display plane is the maximum critical distance. When the Z coordinate value of the voxel cube is greater than the maximum critical distance, the IP image is formed by the use of the reverse ray tracing process and when the Z coordinate value of the voxel cube is smaller than the maximum critical distance, the IP image is formed by the use of the ray tracing process. Accordingly, it cam be determined with a very small number of operations whether the reverse ray tracing process should be used or the ray tracing process should be used, thereby enhancing the processing speed.

It is preferable that the ray tracing process and the reverse ray tracing process are used on the basis of the maximum critical distance. However, even by using the ray tracing process and the reverse ray tracing process on the basis of a value slightly greater than the maximum critical distance, it is possible to accomplish the enhancement in processing speed. When the value slightly greater than the maximum critical distance is used as a reference, the process using the ray tracing process is added, but it is a slight increase from the point of view of the entire processes. Accordingly, there is no practical problem.

In the IP image forming method according to the seventh embodiment, the voxel cubes are sorted using the Z coordinate value as a sort key, are classified into three groups of a group in which the Z coordinate value is greater than the maximum critical distance, a group in which the absolute value of the Z coordinate value is smaller than the maximum critical distance, and a group in which the absolute value of the Z coordinate value is greater than or equal to the maximum critical distance, and then are processed in the order of decreasing the distance from the observer. Accordingly, even when a plurality of voxel cubes projected to the same pixel position exists, the image of the voxel cube located at the front side in the viewing-line direction is automatically overwritten and left. Therefore, even when a plurality of voxel cubes is projected to the same position, the process of determining which should be left can be reduced, thereby enhancing the processing speed.

In the IP image forming method according to the seventh embodiment, the voxel cubes are sorted using the Z coordinate value as a sort key and are classified into three groups of a group in which the Z coordinate value is greater than the maximum critical distance, a group in which the absolute value of the Z coordinate value is smaller than the maximum critical distance, and a group in which the absolute value of the Z coordinate value is greater than or equal to the maximum critical distance. Then, the group in which the Z coordinate value is greater than the maximum critical distance is first processed in the order of decreasing the distance from the observer, the group in which the absolute value of the Z coordinate value is smaller than the maximum critical distance is processed in the order of increasing the distance from the observer, and the group in which the absolute value of the Z coordinate value is greater than or equal to the maximum critical distance is processed in the order of decreasing the distance from the observer. Accordingly, in the ray tracing process requiring time, it is possible to avoid the repeated performing of the ray tracing process from the same pixel position on the IP image display plane. As a result, since the ray tracing process requiring time is not performed than needed, it is possible to accomplish the enhancement in processing speed.

In the IP image forming method according to the seventh embodiment, since the IP images of the voxel cubes of which the Z coordinates are close to the fly-eye lens are obtained by the use of the ray tracing process, the images of the neighboring voxel cubes are formed to be continuous on the IP image display plane. Accordingly, it is possible to prevent the phenomenon that "the color of the three-dimensional image close to the lens is faded" or "the back side is shown."

Since the voxel cubes are processed from the front side but the pixels to which the color information is previously written are skipped, it is possible to overwrite the color information of the voxel cube located at the back side to the color information of the voxel cube located at the front side in the viewing line and to reduce the trouble of performing the intersection check.

In the seventh embodiment, the order of changing the pixel under notice is not particularly mentioned, but, for example, a method of setting the primary scanning direction from the left-upper portion to the right-lower portion and setting the secondary scanning direction from the left to the right may be used. A method of processing a pixel right below each lens and then changing the lens under notice may also be used. All the methods described above do not depart from the gist of the present invention.

Next, a reverse ray tracing process of step S508 is similar to the above-mentioned reverse ray tracing process (step S506) and thus description thereof is omitted.

Here, an object is decomposed and modeled into cubes (cubic voxels), but the gist of the present invention does not become different even when spheres or rectangular solids are used instead of the cubes.

Eighth Embodiment

Figure 20:
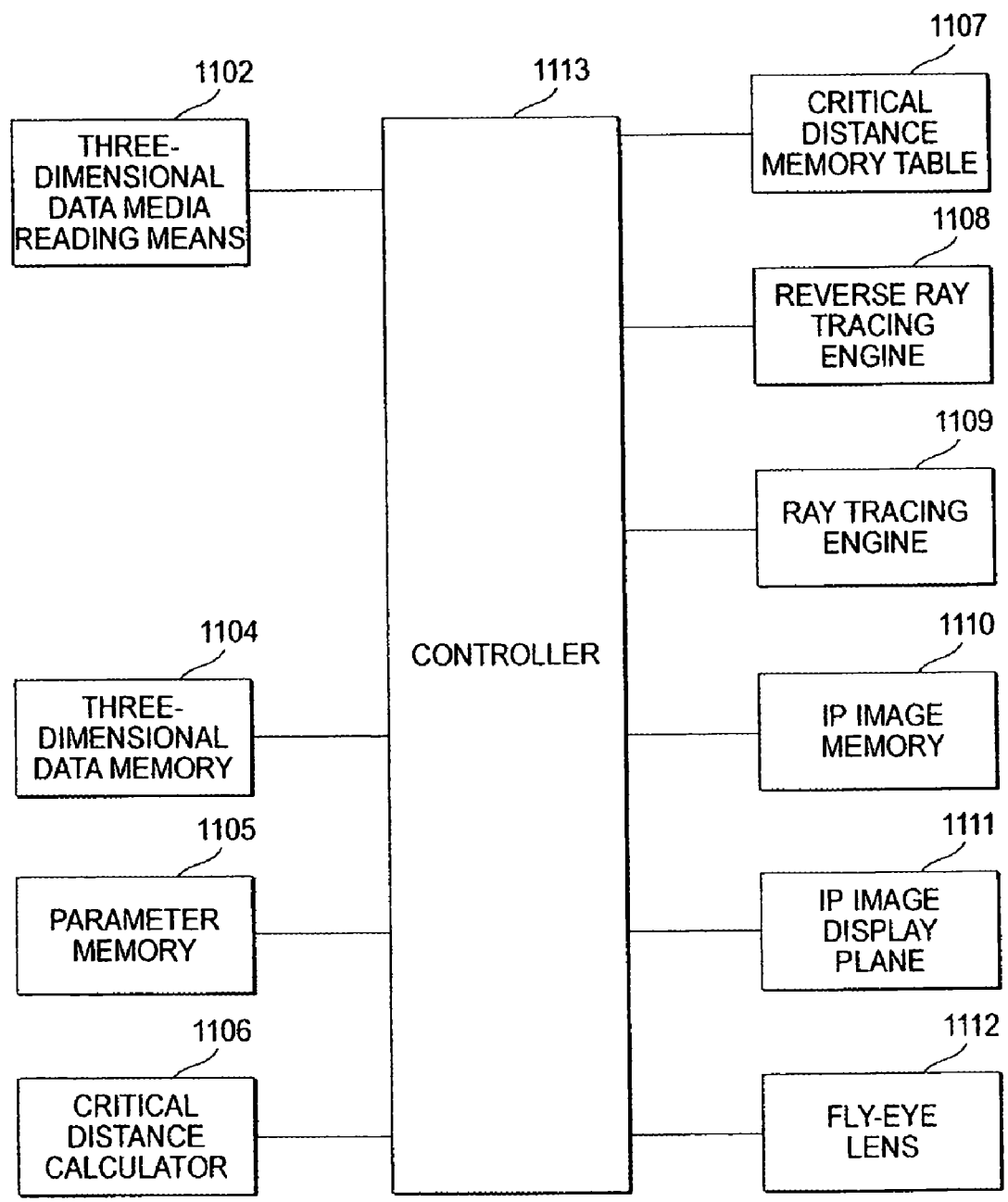
FIG. 20 is a functional block diagram illustrating an IP image forming apparatus according to an eighth embodiment of the present invention.
Figure 21:
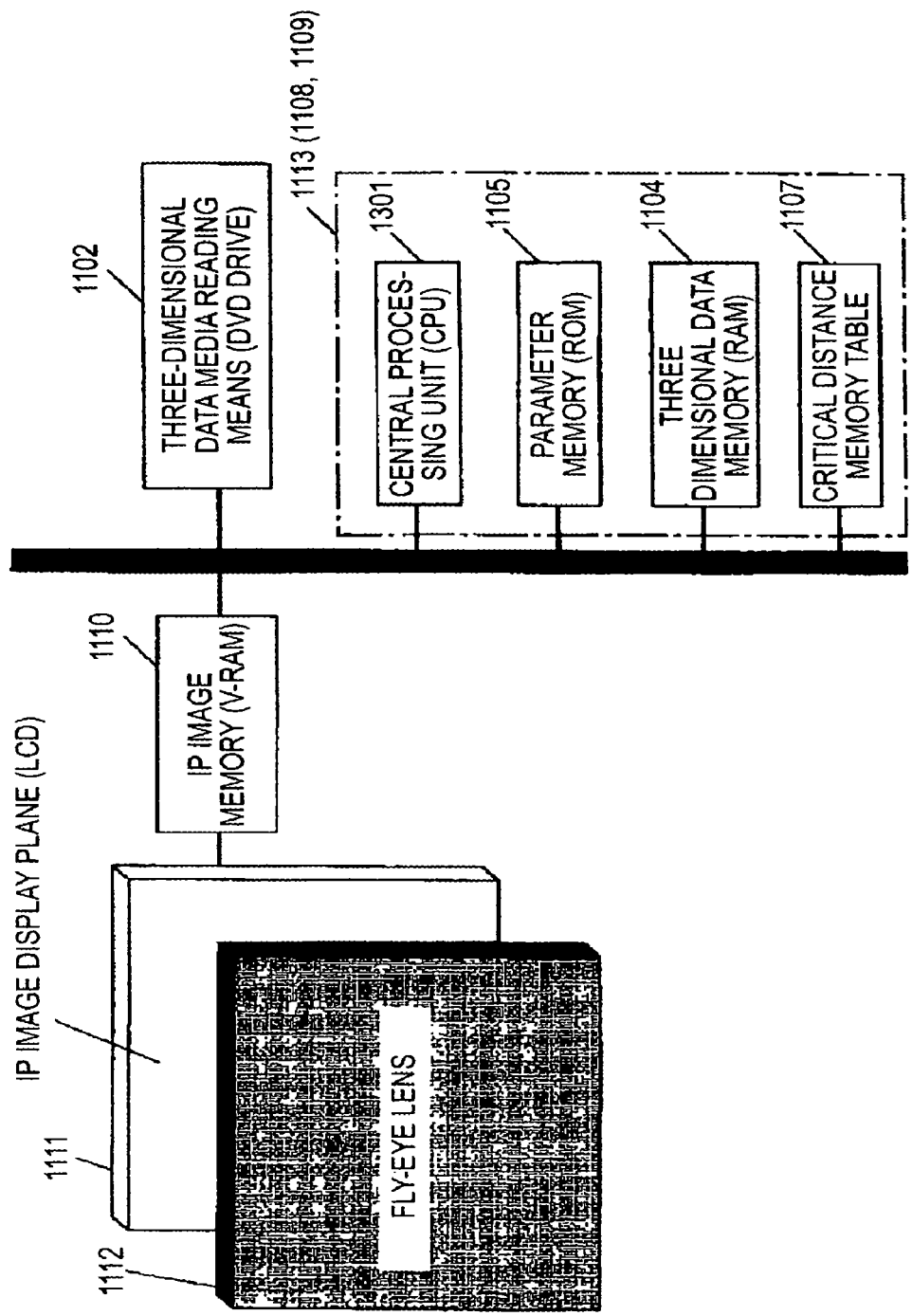
FIG. 21 is a block diagram illustrating the IP image forming apparatus according to the eighth embodiment of the present invention relatively to specific hardware elements.

FIG. 20 is a functional block diagram illustrating an IP image forming apparatus according to an eighth embodiment of the present invention. FIG. 21 is a block diagram illustrating the IP image forming apparatus according to the eighth embodiment of the present invention relatively to specific hardware components. As shown in FIGS. 20 and 21, the IP image forming apparatus according to the eighth embodiment includes three-dimensional media reading means 1102 for reading media in which the X, Y, and Z coordinates and the color information of the voxel cubes are recorded as the three-dimensional data input means. The three-dimensional media reading means 1102 specifically includes a DVD drive as shown in FIG. 21. In addition, the IP image forming apparatus according to the eighth embodiment includes a critical distance memory table 1107 for storing the relation between the critical distance and the X or Y coordinates to correspond to each other. Other elements are similar to those of the IP image forming apparatus according to the seventh embodiment.

Figure 22:
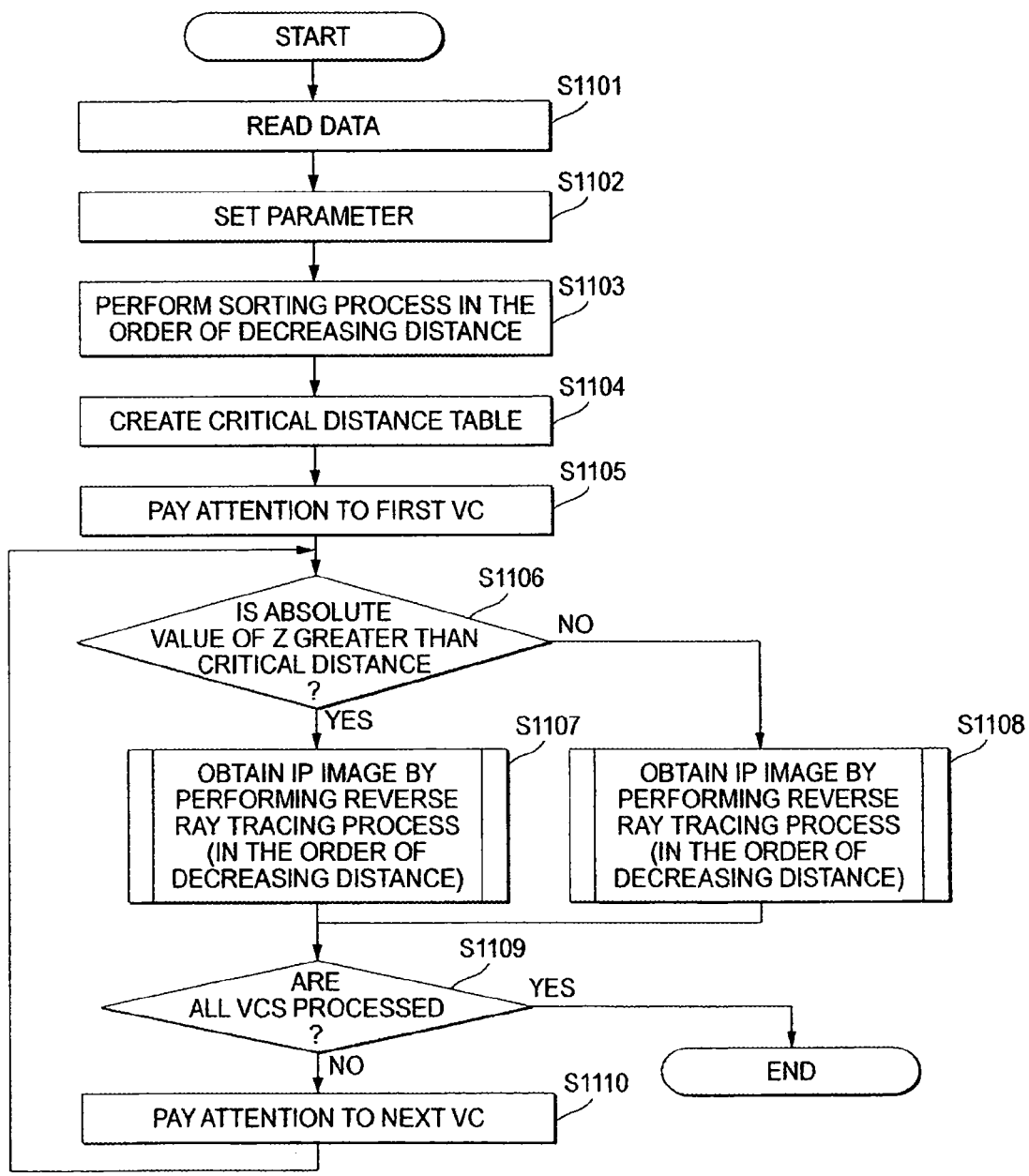
FIG. 22 is a flowchart schematically illustrating entire operations of the IP image forming apparatus according to the eighth embodiment of the present invention.
Figure 23:
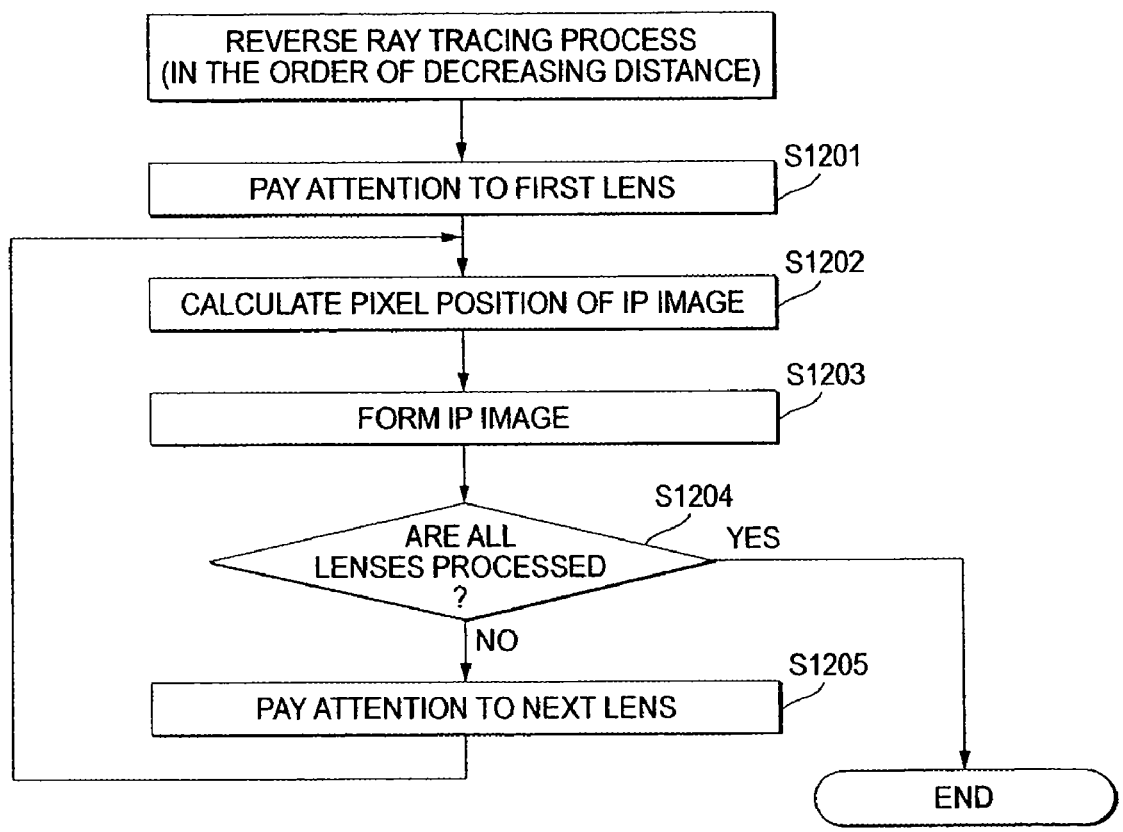
FIG. 23 is a flowchart illustrating an operation of obtaining an IP image by performing a reverse ray tracing process to voxel cubes sorted in the order of decreasing a distance from a viewing point according to the eighth embodiment of the present invention.
Figure 24:
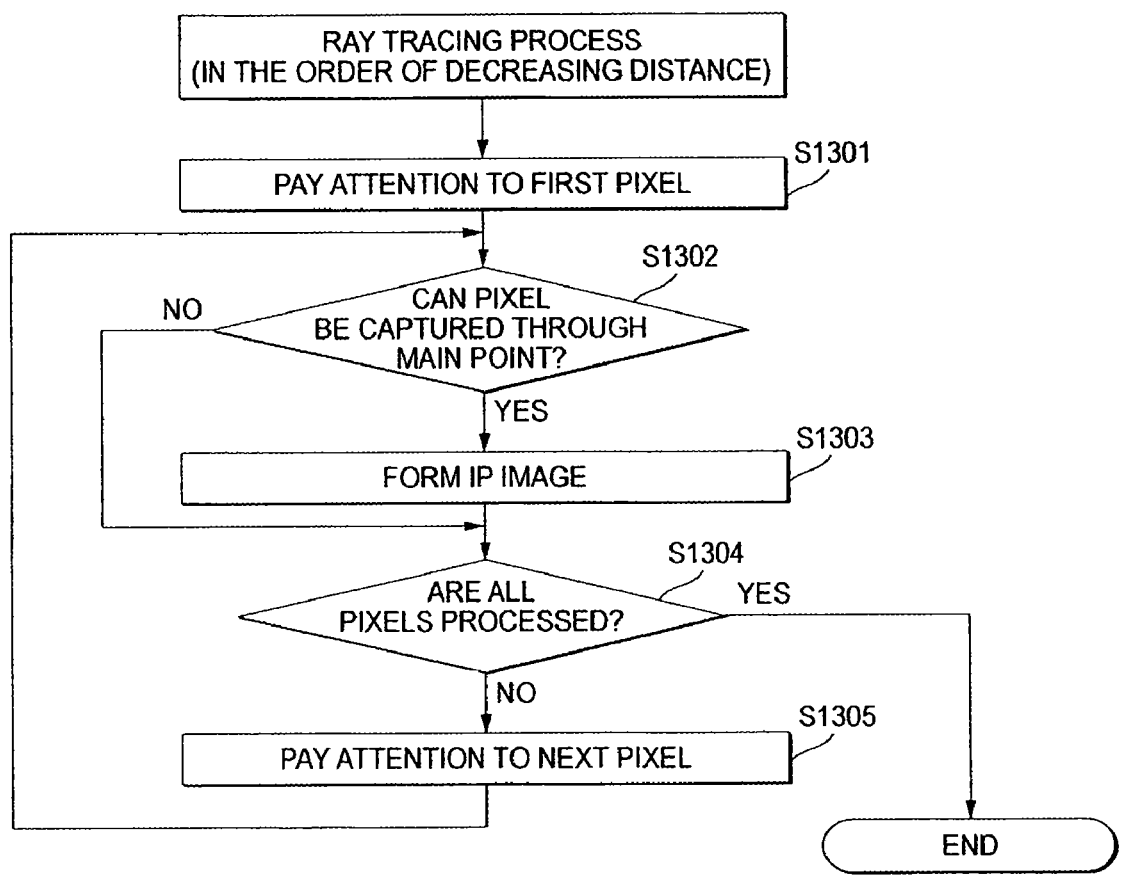
FIG. 24 is a flowchart illustrating an operation of obtaining an IP image by performing a ray tracing process to voxel cubes sorted in the order of decreasing a distance from a viewing point according to the eighth embodiment of the present invention.

Operations of the IP image forming apparatus according to the eighth embodiment will be now described with reference to the flowcharts shown in FIGS. 22 to 24. First, the entire operations are schematically described with reference to the flowchart shown in FIG. 22 and then details of a rendering process are described with reference to FIGS. 23 and 24.

(Step S1101)

The controller 1113 acquires three-dimensional data of an object stored in advance in media by the use of the three-dimensional data media reading means 1102. The acquired data include X, Y, and Z coordinates of voxel cubes into which the object is divided with a predetermined resolution and object colors of the voxel cubes. The controller 1113 receives the three-dimensional data and the resolution of the object and writes the received three-dimensional data and resolution to the three-dimensional data memory 1104.

(Step S1102)

Next, the controller 1113 writes the resolution of the voxel cubes, that is, a "length of a side of a voxel cube (=2Δ)", a "distance between the main point of the fly-eye lens and the IP image display plane 1111 (=s)", a "diameter of the fly-eye lens (=2r)", and a "size of a pixel of the IP image display plane (=ε)" to the parameter memory 1105 with reference to the three-dimensional data memory 1104.

(Step S1103)

The controller 1113 performs a sorting process in the descending order (the order of decreasing a distance from the observer) by using the values of Z coordinates as a sort key with reference to the three-dimensional data memory 1104 and writes again the sorted data to the three-dimensional data memory 1104. Here, the side apart in the viewing line direction from the observer is set to a plus side of the Z axis.

(Step S1104)

The controller 1113 requests the critical distance calculator 1106 to calculate the critical distance. Then, the critical distance calculator 1106 calculates coordinates in which the voxel cubes can exist discretely with reference to the parameter memory 1105, calculates the maximum critical distance corresponding to the X (or Y) coordinates from the above-mentioned expressions, and writes the calculation result to the critical distance memory table 1107.

(Step S1105)

The controller 1113 pays attention to the first voxel cube with reference to the three-dimensional data memory 1104.

(Step S1106)

The controller 1113 checks whether the Z coordinate value is greater than the maximum critical distance on the basis of the X, Y, and Z coordinates of the voxel cube under notice, with reference to the critical distance memory table 1107. When the Z coordinate value is greater than the maximum critical distance, step S1108 is performed and otherwise step S1107 is performed. Here, step S1106 constitutes the check means for checking whether the IP image corresponding to the voxel cube is greater than the pixel size on the IP image display plane with reference to the critical distance memory table 1107.

(Step S1107)

The controller 1113 requests for acquiring the IP image of the voxel cube under notice by the use of the reverse ray tracing process. The result is written to the IP image memory 1110. Details of the reverse ray tracing process are described later. Then, step S1109 is performed.

(Step S1108)

The controller 1113 requests for acquiring the IP image of the voxel cube under notice by the use of the ray tracing process. The result is written to the IP image memory 1110. Details of the ray tracing process are described later.

(Step S1109)

The controller 1113 checks whether all the voxel cubes are processed. When all the voxel cubes are not processed, step S1110 is performed and otherwise the process is ended.

(Step S1110)

The controller 1113 changes the voxel cube under notice to the next voxel cube. Then, step S1106 is performed.

In this way, by displaying the contents written to the IP image memory 1110 on the IP image display plane 1111 and observing the displayed contents through the fly-eye lenses 1113, the same object as the object read by the three-dimensional data media reading means 1102 is obtained as a three-dimensional image.

Next, details of the rendering processes are described with reference to the flowcharts shown in FIGS. 23 and 24. The reverse ray tracing process of step S1107 is first described with reference to the flowchart shown in FIG. 23. Here, the reverse ray tracing engine 1108 receives one voxel cube to be processed from the controller 1113.

(Step S1201)

The reverse ray tracing engine 1108 pays attention to the first lens.

(Step S1202)

The reverse ray tracing engine 1108 calculates a pixel position of the IP image from the positional relation between the lens under notice and the given voxel cube. That is, when a ray is irradiated from the voxel cube under notice to the main point of the lens under notice, it is calculated from the geometric positional relation which position of the IP image display plane the ray reaches (coordinates of a pixel are calculated).

(Step S1203)

The reverse ray tracing engine 1108 writes the color information of the voxel cube to an address corresponding to the pixel position obtained in step S1202, that is, the pixel position obtained from the IP image memory 1110. Here, when the color information is written, the color information of another voxel cube may be written in advance to the pixel position, but the color information can be overwritten to the pixel position. Accordingly, since the color information of the voxel cube existing in front of the viewing point is always overwritten, it is possible to prevent the phenomenon that "a thing which must not be visible is visible" when observing the three-dimensional image.

(Step S1204)

The reverse ray tracing engine 1108 checks whether all the lenses are processed. When all the lenses are not processed, step S1205 is performed and otherwise the procedure is ended.

(Step S1205)

The reverse ray tracing engine 1108 changes the lens under notice to the next lens and then performs step S1202.

In this way, the process of obtaining the IP images of the given voxel cubes is ended.

In the eighth embodiment, the order of changing the lens under notice is not particularly mentioned, but, for example, a method of setting the primary scanning direction from the left-upper portion to the right-lower portion and setting the secondary scanning direction from the left to the right may be used. A method of performing the scanning in a zigzag manner from the upside to the downside or a method of giving a particular order to the respective lenses on the basis of a concept of interleave may also be used. All the methods described above do not depart from the gist of the present invention.

Next, the ray tracing process of step S1108 is described with reference to the flowchart shown in FIG. 24. Here, the ray tracing engine 1109 receives one voxel cube to be processed from the controller 1113.

(Step S1301)

The ray tracing engine 1109 pays attention to the first pixel on the IP image display plane 1111.

(Step S1302)

The ray tracing engine 1109 checks on the basis of the geometrical positional relation whether the voxel cube under notice can be captured by the use of a straight line extending from the coordinate position of the pixel under notice to the main point of the lens, that is, whether the "pixel under notice", the "main point of a lens (a lens right above the pixel under notice", and the "voxel cube under notice" exist in the same line. This method is an "intersection check method" used in the ray tracing process and a variety of methods are suggested. Here, details of the method are not described. When the voxel cube is captured by the use of the line passing through the main point, step S1303 is performed and otherwise step S1304 is performed.

(Step S1303)

The ray tracing engine 1109 writes the color information of the voxel cube under notice to an address corresponding to the pixel under notice in the IP image memory 1110. Here, as described relatively to the reverse ray tracing process, color information may be previously written to the pixel under notice, but by overwriting the color information to the pixel under notice, the color information of the voxel cube close to the viewing point always remains, thereby preventing the phenomenon that "a thing which must not be visible is visible" when reproducing the three-dimensional image.

(Step S1304)

The ray tracing engine 1109 checks whether all the pixels on the IP image display plane 1111 are processed. When all the pixels are not processed, step S1505 is performed and otherwise the procedure is ended.

(Step S1305)

The ray tracing engine 1109 changes the pixel under notice to the next pixel and then performs step S1302.

In the IP image forming method according to the eighth embodiment, by acquiring in advance the Z coordinate value of each voxel cube of which the IP image is equal to the pixel in size every X or Y coordinate and storing the Z coordinate value in the table, the table is referred to when acquiring the IP image. When the Z coordinate value of the voxel cube is apart from the Z coordinate value stored in the table, the IP image is obtained by the use of the reverse ray tracing process and when the Z coordinate value of the voxel cube is close to the Z coordinate value stored in the table, the IP image is obtained by the use of the ray tracing process. Accordingly, it is possible to reduce the operation amount of the ray tracing process as much as possible.

Since the IP images of the voxel cubes of which the Z coordinates are close to the fly-eye lens are obtained by the use of the ray tracing process, the images of the neighboring voxel cubes are formed to be continuous on the IP image display plane. Accordingly, it is possible to prevent the phenomenon that "the color of the three-dimensional image close to the lens is faded" or "the back side is shown."

In the eighth embodiment, the order of changing the pixel under notice is not particularly mentioned, but, for example, a method of setting the primary scanning direction from the left-upper portion to the right-lower portion and setting the secondary scanning direction from the left to the right may be used. A method of processing a pixel right below each lens and then changing the lens under notice may also be used. All the methods described above do not depart from the gist of the present invention.

Ninth Embodiment

Figure 25:
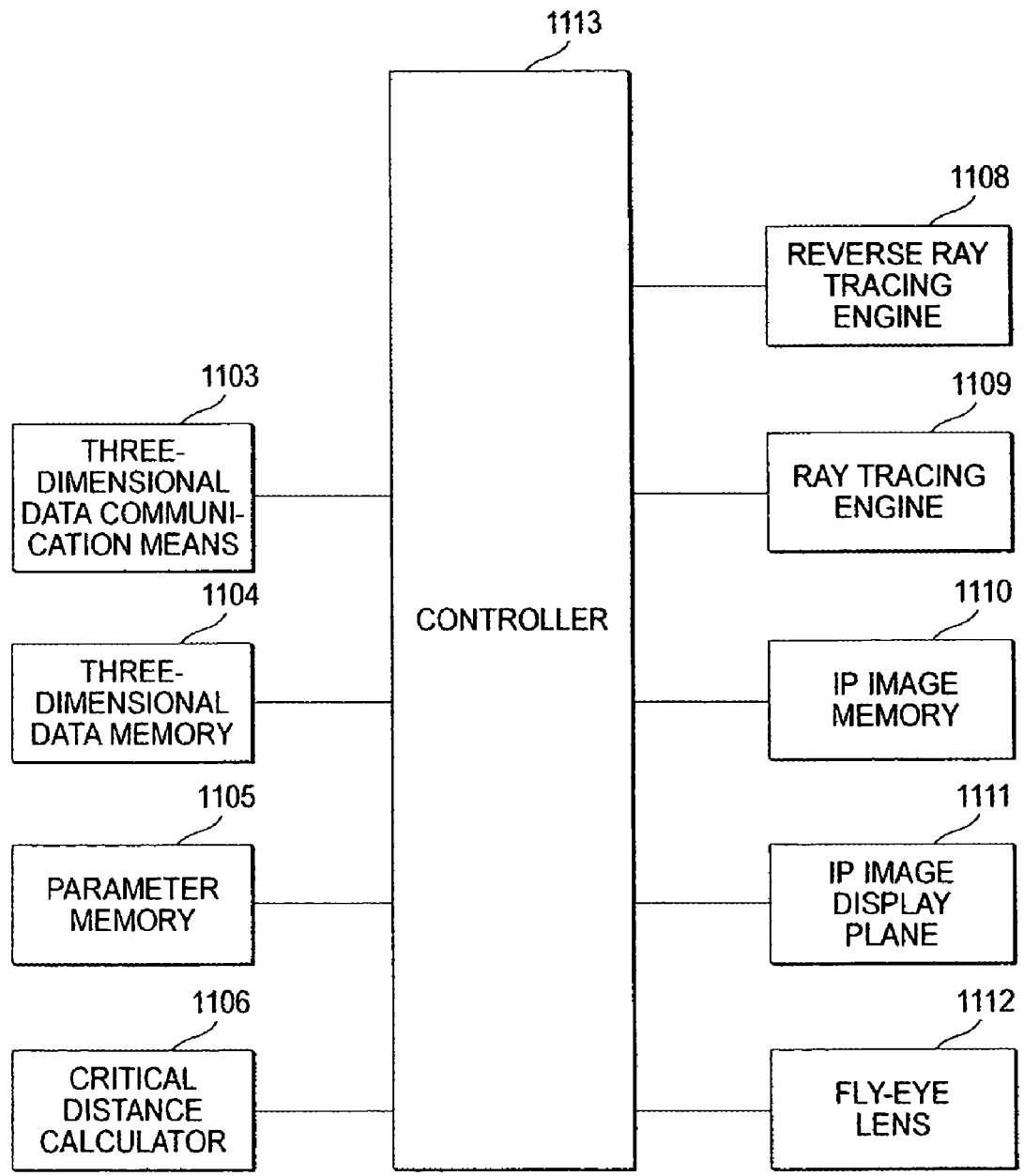
FIG. 25 is a functional block diagram illustrating an IP image forming apparatus according to a ninth embodiment of the present invention.
Figure 26:
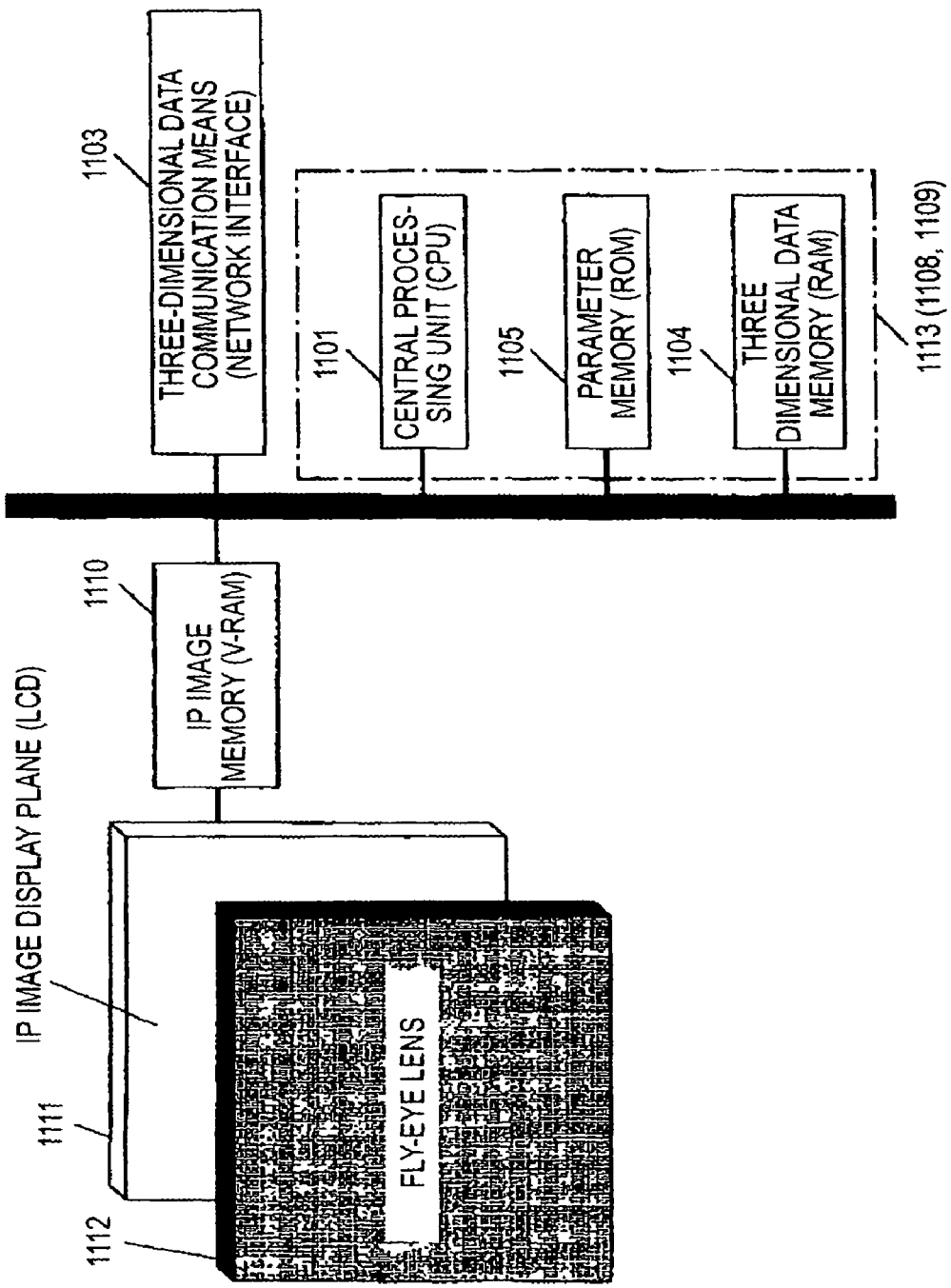
FIG. 26 is a block diagram illustrating the IP image forming apparatus according to the ninth embodiment of the present invention relatively to specific hardware elements.

FIG. 25 is a functional block diagram illustrating an IP image forming apparatus according to a ninth embodiment of the present invention. FIG. 26 is a block diagram illustrating the IP image forming apparatus according to the ninth embodiment of the present invention relatively to specific hardware components. As shown in FIGS. 25 and 26, the IP image forming apparatus according to the ninth embodiment includes three-dimensional data communication means 1103 for exchanging the X, Y, and Z coordinates and the color information of the voxel cubes through communication with a counter party as the three-dimensional data input means. The three-dimensional data communication means 1102 specifically includes a network interface. On the other hand, the critical distance memory table 1107 included in the IP image forming apparatus according to the eighth embodiment is not provided in the ninth embodiment. Other elements are similar to those of the IP image forming apparatus according to the eighth embodiment.

Figure 27:
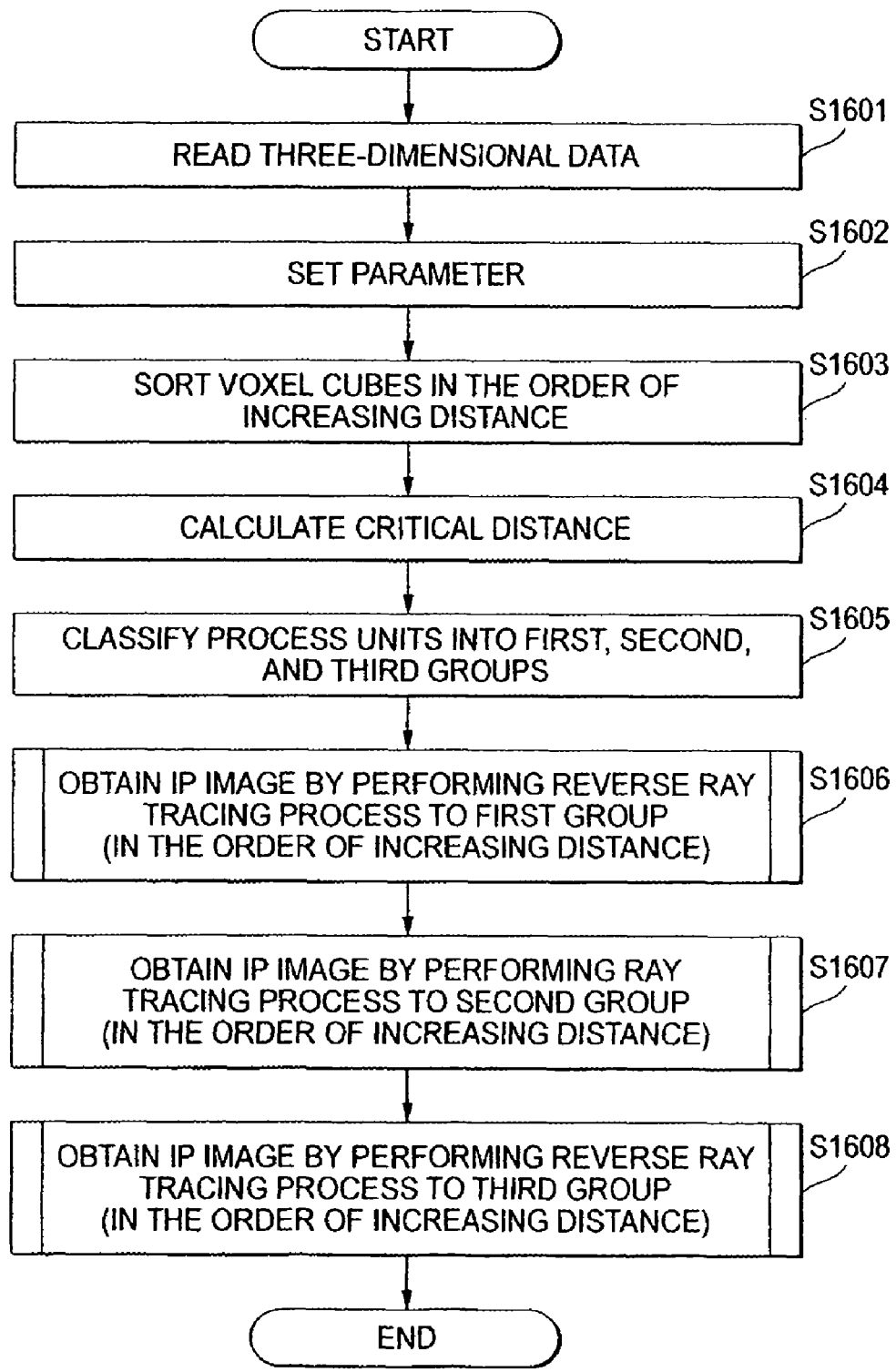
FIG. 27 is a flowchart schematically illustrating entire operations of the IP image forming apparatus according to the ninth embodiment of the present invention.
Figure 28:
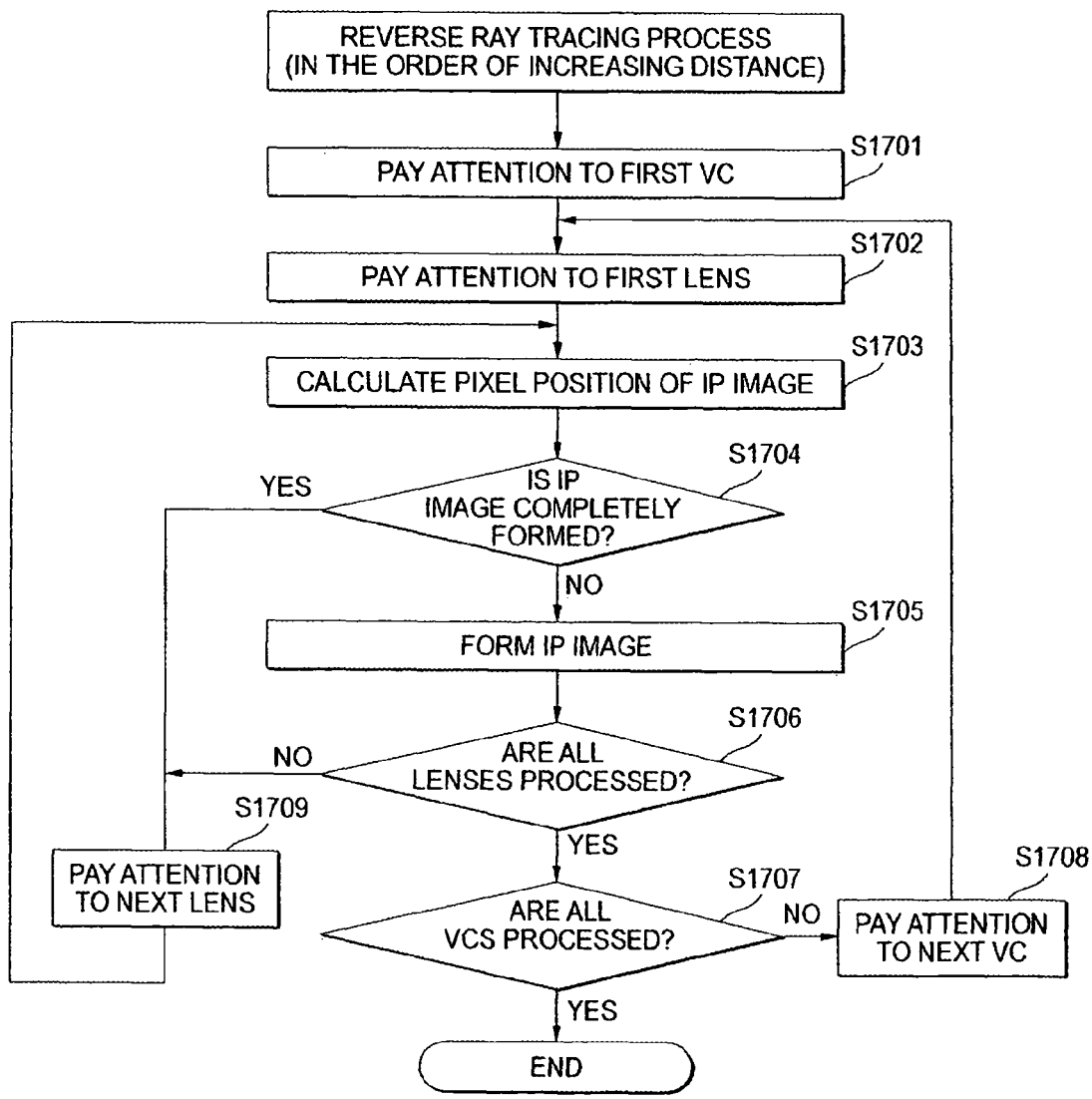
FIG. 28 is a flowchart illustrating an operation of obtaining an IP image by performing a reverse ray tracing process to the voxel cubes sorted in the order of increasing a distance from a viewing point according to the ninth embodiment of the present invention.
Figure 29:
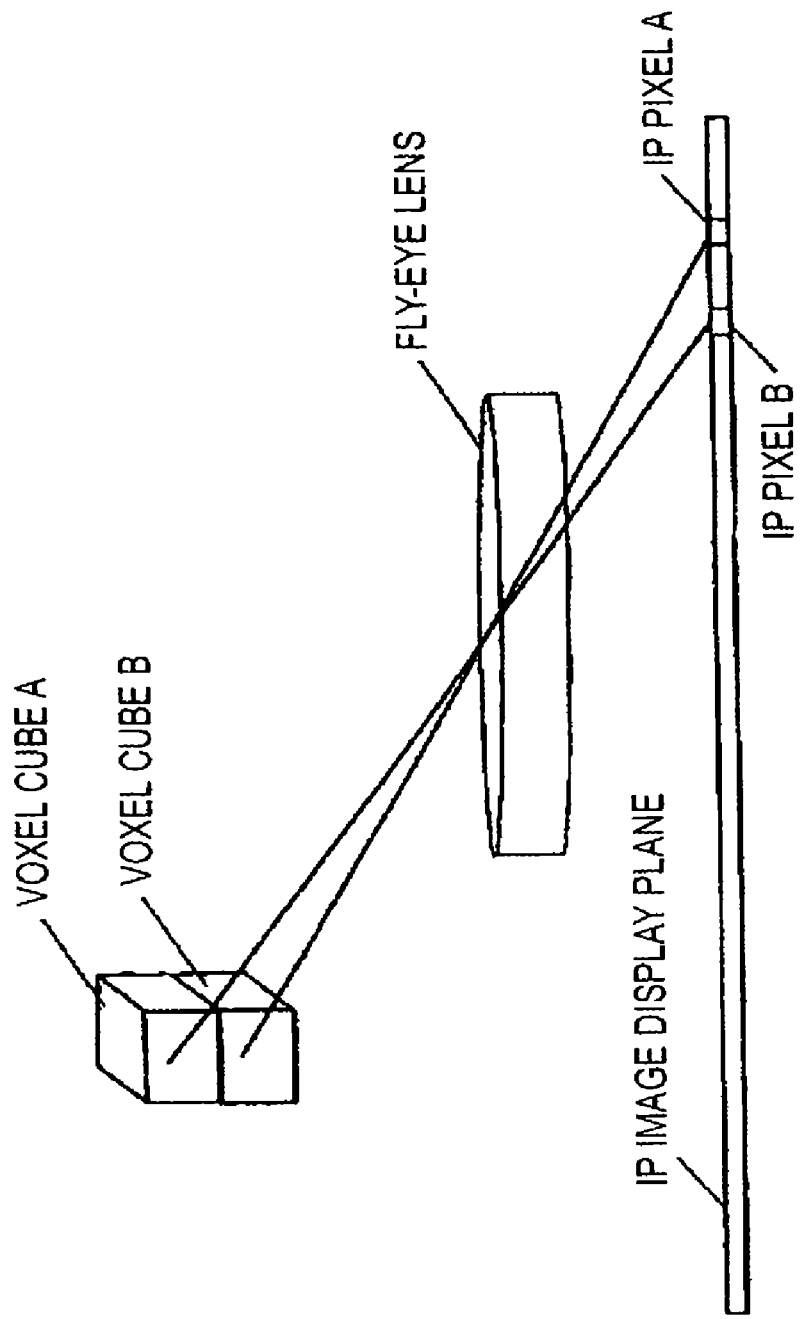
FIG. 29 is a diagram illustrating a positional relation between the voxel cubes and pixels on the IP image display plane.

Operations of the IP image forming apparatus according to the ninth embodiment will be now described with reference to the flowcharts shown in FIGS. 27 and 28. First, the entire operations are schematically described with reference to the flowchart shown in FIG. 27 and then details of a rendering process are described with reference to FIG. 28.

(Step S1601)

The controller 1113 acquires three-dimensional data of an object through the three-dimensional data communication means 1103. The acquired data include X, Y, and Z coordinates of voxel cubes into which the object is divided with a predetermined resolution and object colors of the voxel cubes. The controller 1113 receives the three-dimensional data and the resolution of the object and writes the received three-dimensional data and resolution to the three-dimensional data memory 1104.

(Step S1602)

Next, the controller 1113 writes the resolution of the voxel cube, that is, a "length of a side of a voxel cube (=2Δ)", a predetermined "distance between the main point of the fly-eye lens and the IP image display plane (=s)", a "diameter of the fly-eye lens (=2r)", and a "size of a pixel of the IP image display plane (=ε)" to the parameter memory 1105 with reference to the three-dimensional data memory 1104.

(Step S1603)

The controller 1113 performs a sorting process in the ascending order (the order of increasing a distance from the observer) by using the values of Z coordinates as a sort key with reference to the three-dimensional data memory 1104 and writes again the sorted data to the three-dimensional data memory 1104.

(Step S1604)

The controller 1113 requests the critical distance calculator 1106 to calculate the maximum critical distance. Then, the critical distance calculator 1106 calculates the maximum critical distance from the above-mentioned expression with reference to the parameter memory 1105 and additionally writes the calculated maximum critical distance to the parameter memory 1105.

(Step S1605)

The controller 1113 additionally writes data indicating boundaries between groups to the three-dimensional data memory 1104 in order to divide the data stored in the three-dimensional data memory 1104 into three groups on the basis of the critical distance stored in the parameter memory 1105: a group of voxel cubes (hereinafter, referred to as a first group) in which the absolute value of the Z coordinate value on the front side of the fly-eye lens as seen from the observer is greater than the maximum critical distance; a group of voxel cubes (hereinafter, referred to as a second group) in which the absolute value of the Z coordinate value in the vicinity of the fly-eye lens 1112 is smaller than the maximum critical distance; and a group of voxel cubes (hereinafter, referred to as a third group) in which the Z coordinate value on the back side of the fly-eye lens 1112 is greater than the maximum critical distance. Here, the back side of the fly-eye lens 1112 is plus in the Z coordinate. On the other hand, step S1605 constitutes determination means for determining whether the coordinate value on a normal axis (Z axis) of the voxel cube is greater than the maximum critical distance. In addition, step S1605 constitutes determination means for determining whether the IP image corresponding to the voxel cube is greater than the pixel on the IP image display plane.

(Step S1606)

The controller 1113 requests the reverse ray tracing engine 1108 to perform a rendering process to the voxel cubes belonging to the first group and being stored in the three-dimensional data memory 1104. Details of the rendering process (reverse ray tracing process) will be described later. The rendering result is written to the IP image memory 1110.

(Step S1607)

The controller 1113 requests the ray tracing engine 1109 to perform a rendering process to the voxel cubes belonging to the second group and being stored in the three-dimensional data memory 1104. Details of the rendering process (ray tracing process) will be described later. The rendering result is written to the IP image memory 1110.

(Step S1608)

The controller 1113 requests the reverse ray tracing engine 1108 to perform a rendering process to the voxel cubes belonging to the third group and being stored in the three-dimensional data memory 1104. Details of the rendering process will be described later. The rendering result is written to the IP image memory 1110.

In this way, by displaying contents written to the IP image memory 1110 on the IP image display plane 1111 and observing the displayed image through the fly-eye lens 1112, the same object as the object input through the three-dimensional data communication means 1103 is obtained as a three-dimensional image.

Next, details of the rendering processes are described with reference to the flowchart shown in FIG. 28. The reverse ray tracing process in step S1606 is first described.

(Step S1701)

The reverse ray tracing engine 1108 pays attention to the first voxel cube (VC).

(Step S1702)

The reverse ray tracing engine 1108 pays attention to the first lens.

(Step S1703)

The reverse ray tracing engine 1108 calculates a pixel position of the IP image from the positional relation between the lens and the voxel cube under notice. That is, when a ray is irradiated from the voxel cube under notice to the main point of the lens under notice, it is calculated from the geometric positional relation which position of the IP image display plane the ray reaches (coordinates of a pixel are calculated).

(Step S1704)

The reverse ray tracing engine 1108 checks whether the color information of the voxel cube is written to the address in the IP image memory 1110 corresponding to the position calculated in step S1703. When it is checked that the color information is written already, step S1709 is performed and otherwise step S1705 is performed.

(Step S1705)

The reverse ray tracing engine 1108 writes "the color information of the voxel cube under notice" and data indicating that "the color information is written" to "the address of the IP image memory" corresponding to the pixel position calculated in step S1703. Here, data indicating that "no color information is written" are initially written to the IP image memory. The color information is expressed in 24 bits. The IP image memory 1110 allocates 32 bits to a pixel. The most significant bit indicates "whether the color information is written." The next 24 bits indicate the color information.

(Step S1706)

The reverse ray tracing engine 1108 checks whether all the lenses are processed. When it is checked that all the lenses are processed, step S1707 is performed and otherwise step S1709 is performed.

(Step S1707)

The reverse ray tracing engine 1108 checks whether all the voxel cubes are processed. When all the voxel cubes are not processed, step S1708 is performed and otherwise the procedure is ended.

(Step S1708)

The reverse ray tracing engine 1108 changes the voxel cube under notice to the next voxel cube and then performs step S1702.

(Step S1709)

The reverse ray tracing engine 1108 changes the lens under notice to the next lens and then performs step S1703.

In this way, the process of obtaining the IP images of the given voxel cubes is ended. Here, as the voxel cube is closer to the viewing point, it is earlier processed. The pixels to which the color information is previously written in the IP image memory are skipped. Accordingly, the color information of the voxel cube closer to the viewing point is left, thereby preventing the phenomenon that "a thing which must not be visible is visible."

In the ninth embodiment, the order of changing the lens under notice is not particularly mentioned, but, for example, a method of setting the primary scanning direction from the left-upper portion to the right-lower portion and setting the secondary scanning direction from the left to the right may be used. A method of performing the scanning in a zigzag manner from the upside to the downside or a method of giving a particular order to the respective lenses on the basis of a concept of interleave may also be used. All the methods described above do not depart from the gist of the present invention.

Next, the ray tracing process of step S1607 is similar to the process of step S507 according to the seventh embodiment and thus its description is omitted.

Next, the reverse ray tracing process of step S1608 is similar to the process (step S1606) and thus description thereof is omitted.

As described above, in the IP image forming apparatus according to the ninth embodiment, the voxel cubes are sorted using the Z coordinates as a sort key, are processed in the order of increasing the distance from the observer, and are skipped when the IP image is formed previously. Accordingly, it is possible to prevent the reverse ray tracing process from being performed more than needed. As a result, it is possible to enhance the processing speed.

In the following embodiments, the axis direction perpendicular to the fly-eye lens is defined as the Z axis direction or the viewing-line direction, the side apart from an observer with respect to a predetermined object (for example, the fly-eye lens) is defined as a "back side" or an "opposite side", and the side close to the observer is defined as a "front side." However, the directions in the apparatus are not limited to the above-mentioned directions.

Tenth Embodiment

Figure 30:
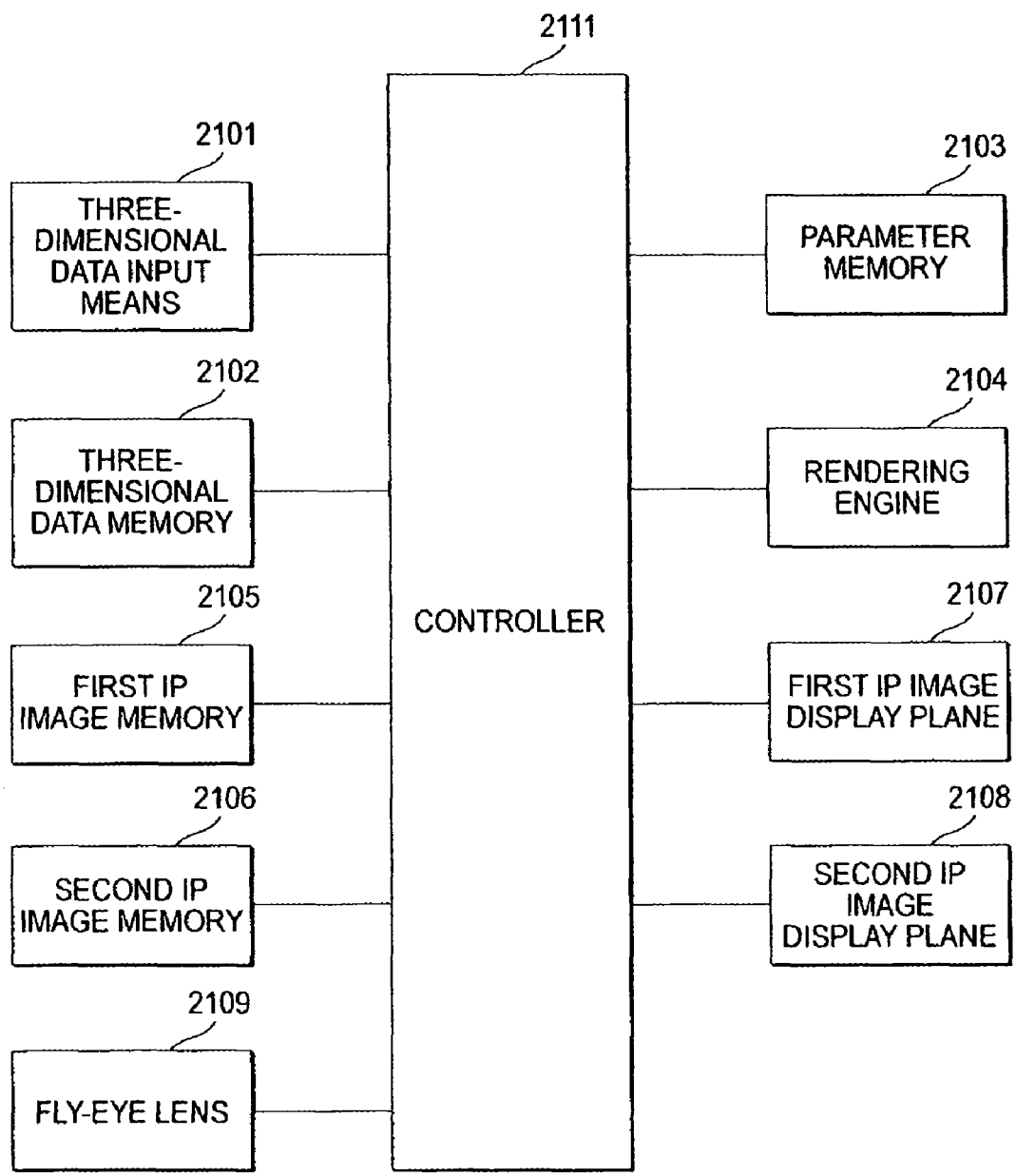
FIG. 30 is a functional block diagram illustrating a three-dimensional image reproducing apparatus according to a tenth embodiment of the present invention.

FIG. 30 is a functional block diagram illustrating a three-dimensional image reproducing apparatus according to a tenth embodiment of the present invention. In FIG. 30, a reference numeral 2101 denotes three-dimensional data input means, a reference numeral 2102 denotes a three-dimensional data memory as the three-dimensional data memory means, a reference numeral 2103 denotes a parameter memory, a reference numeral 2104 denotes a rendering engine, a reference numeral 2105 denotes a first IP image memory as the IP image memory means, a reference numeral 2106 denotes a second IP image memory as the IP image memory means, a reference numeral 2107 denotes a first IP image display plane, a reference numeral 2108 denotes a second IP image display plane, a reference numeral 2109 denotes a fly-eye lens, and a reference numeral 2111 denotes a controller.

The three-dimensional data input means 2101 receives three-dimensional data of voxel cubes, that is, X, Y, and Z coordinates and color information of the voxel cubes, from an external device or storage medium. The three-dimensional data memory 2102 temporarily stores the three-dimensional data, that is, the X, Y, and Z coordinates and the color information of the voxel cubes.

The parameter memory 2103 stores parameters necessary for rendering the three-dimensional data. Examples of the parameters are as follows.

Diameter of the fly-eye lens 2109
  Distance between the main point plane of the fly-eye lens 2109 and the first IP image display plane 2107
  Distance between the main point plane of the fly-eye lens 2109 and the second IP image display plane 2108
  Geometrical arrangement of the fly-eye lens 2109
  Focal length of the fly-eye lens 2109
  Coordinates of the main pint of the fly-eye lens 2109
  Density of a voxel cube (length of a side of the voxel cube)
  Size of a pixel of an IP image (pixel size)
  Arrangement of pixels
  Transmittance of the first IP image display plane 2107

The rendering engine 2104 virtually traces rays passing through the main point of the fly-eye lens 2109 from the pixels constituting the IP image display plane, and checks which voxel cube the rays intersect through calculation. When the rays interest any voxel cube, the rendering engine determines that the pixel on the IP image display plane corresponding to the voxel cube is a "pixel coated with the color of the voxel cube."

The first IP image memory 2105 stores the rendering result to an object located at the back side from the fly-eye lens 2109. On the other hand, the second IP image memory 2106 stores the rendering result to an object located at the front side from the fly-eye lens 2109. The first IP image display plane 2107 displays an image on the basis of the data stored in the first IP image memory 2105. On the other hand, the second IP image display plane 2108 displays an image on the basis of the data stored in the second IP image memory 2106. The controller 2111 controls all the units.

Figure 31:
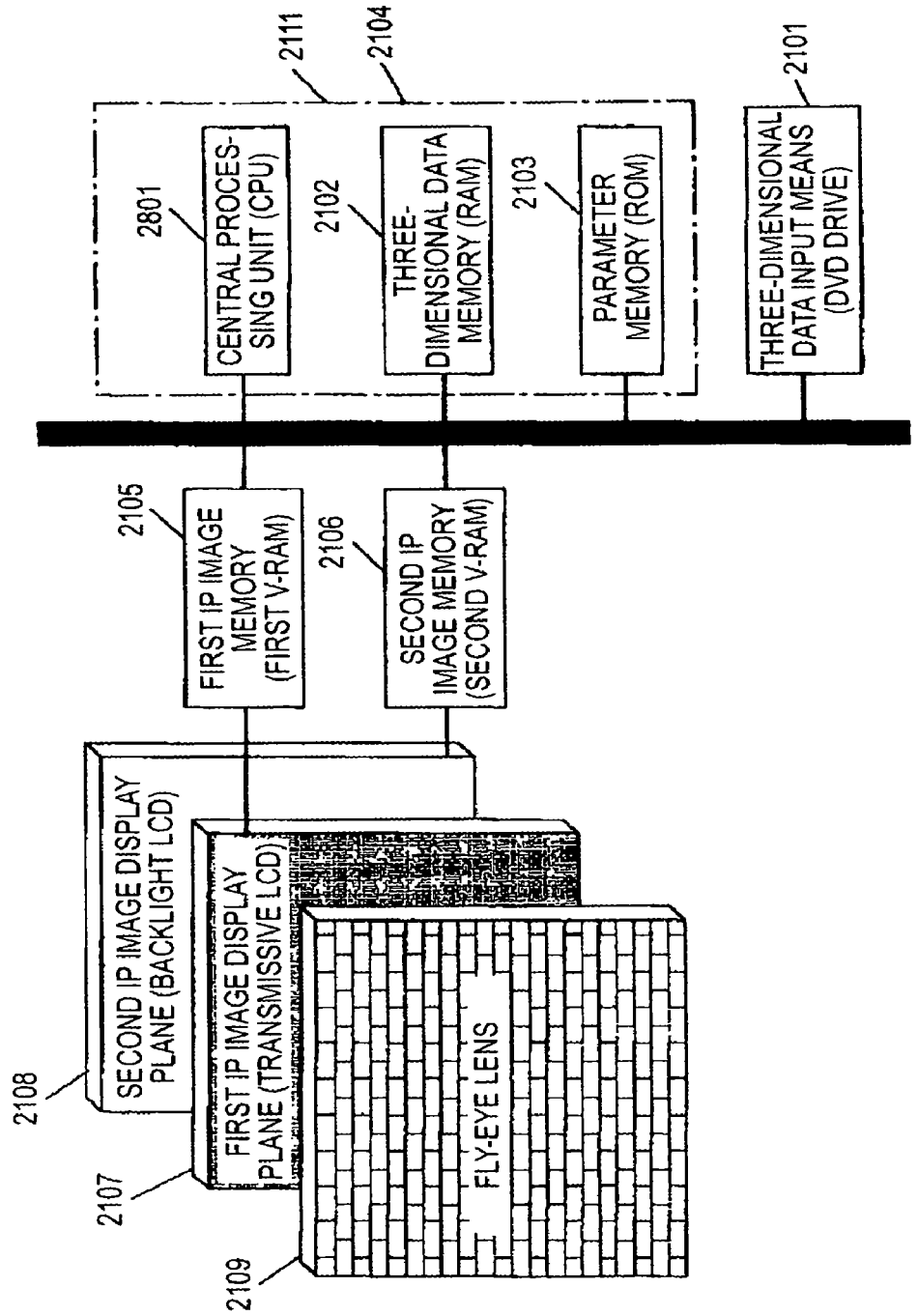
FIG. 31 is a block diagram illustrating the three-dimensional image reproducing apparatus according to the tenth embodiment of the present invention relatively to specific hardware elements.

FIG. 31 is a block diagram illustrating the three-dimensional image reproducing apparatus according to the tenth embodiment of the present invention relatively to specific hardware components. In FIG. 31, the three-dimensional data input means 2101 specifically includes a DVD drive. The three-dimensional data memory 2102 includes RAM. The parameter memory 2103 includes ROM. The rendering engine 2104 and the controller 2111 are constructed so that a central processing unit (CPU) 2801 executes a program stored in the parameter memory (ROM) 2103 while referring to data stored in the parameter memory (ROM) 2103 or referring to or changing data stored in the three-dimensional data memory (RAM) 2102.

The first IP image memory 2105 specifically includes a first V-RAM. The second IP image memory 2106 specifically includes a second V-RAM. The first IP image display plane 2107 specifically includes a transmissive LCD. The second IP image display plane 2108 specifically includes a backlight LCD.

Figure 32:
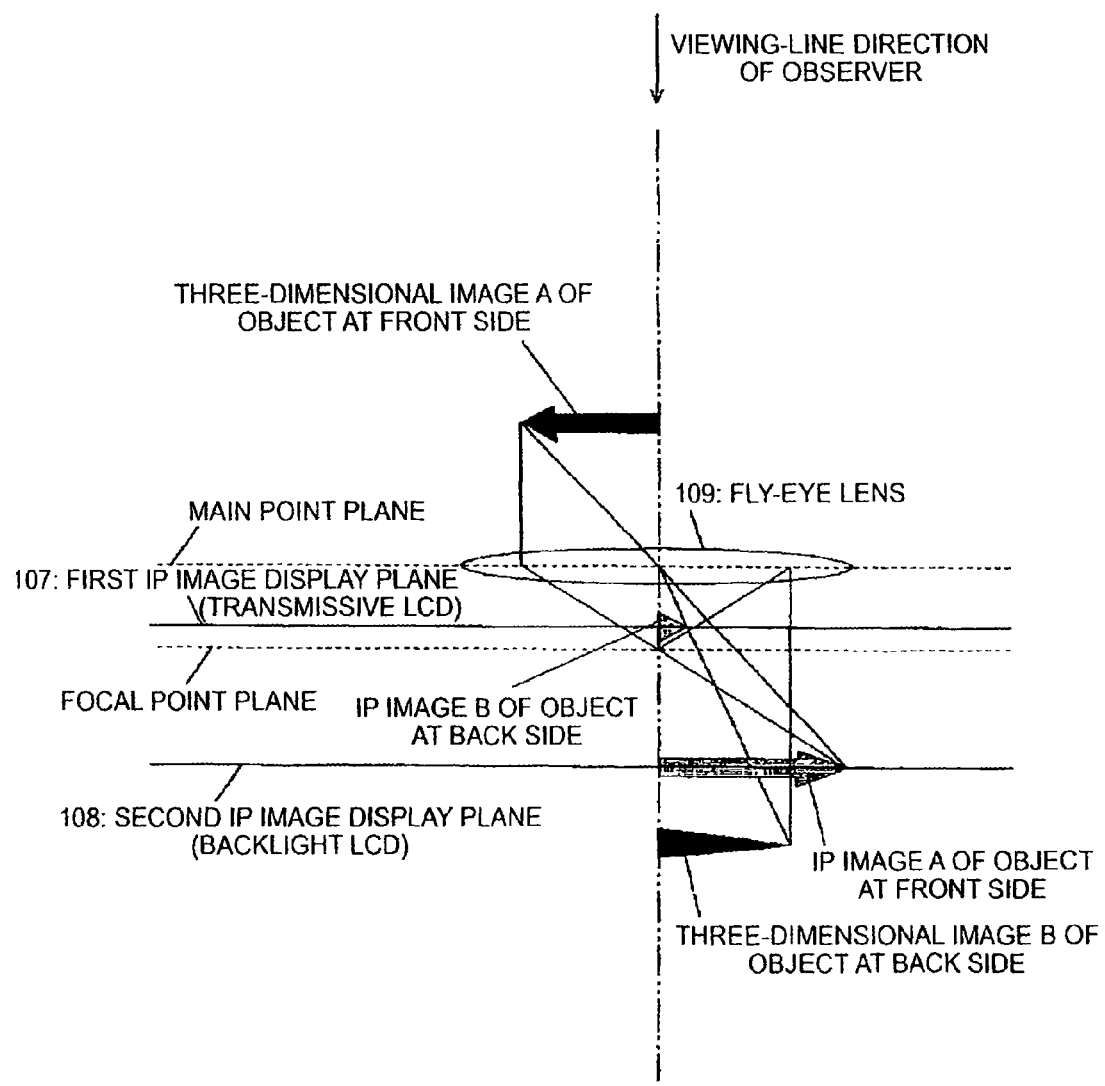
FIG. 32 is a diagram illustrating positional relations among an IP image, an object, and a three-dimensional image when the object is in front of a lens and on the back of the lens according to the tenth embodiment of the present invention.

Here, the fly-eye lens 2109, the first IP image display plane 2107 (transmissive LCD), and the second IP image display plane 2108 (backlight LCD) are geometrically arranged as shown in FIG. 32 illustrating positional relations among an IP image, an object, and a three-dimensional image, relative to the object in the front of a lens and the object on the back of the lens, according to the tenth embodiment of the present invention. That is, the first IP image display plane 2107 is disposed between the fly-eye lens 2109 and the focal point plane of the fly-eye lens 2109 and the second IP image display plane 2108 is disposed at the opposite side of the focal point plane as seen from the fly-eye lens 2109. That is, when the observer side of the fly-eye lens 2109 is defined as a first surface side and the opposite side of the observer of the fly-eye lens 2109 is defined as a second surface side, the first IP image display plane 2107 is disposed between the fly-eye lens 2109 and the focal point plane of the fly-eye lens 2109 at the second surface side of the fly-eye lens 2109. The second IP image display plane 2108 is disposed on the side opposite to the fly-eye lens 2109 with respect to the focal point plane of the fly-eye lens 2109 at the second surface side of the fly-eye lens 2109.

The three-dimensional image reproducing apparatus according to the tenth embodiment can be embodied as a three-dimensional image reproducing program which is driven by a general-purpose computer. Accordingly, it can be embodied with low cost.

Operations of the three-dimensional image display apparatus having the above-mentioned configuration will be now described. First, the entire operations are schematically described with reference to the flowchart shown in FIG. 33 and then details of a rendering process are described with reference to FIGS. 34 and 35.

(Step S1001)
The controller 2111 acquires three-dimensional data of an object through the three-dimensional data input means 2101 from, for example, an external device or a storage medium. The acquired three-dimensional data specifically include X, Y, and Z coordinates of voxel cubes into which the object is virtually divided with a predetermined resolution and object colors of the voxel cubes. The controller 2111 reads the three-dimensional data through the three-dimensional data input means 2101 and writes the read three-dimensional data to the three-dimensional data memory 2102.

(Step S1002)
Thereafter, the controller 2111 reads the three-dimensional data from the three-dimensional data memory 2102, performs a sorting process in the descending order (the order of increasing a distance from the observer) by using the values of Z coordinates as a sort key, and writes again the sorted data to the three-dimensional data memory 2102.

(Step S1003)
Next, the controller 2111 divides the data into a first group A of which the Z coordinate values are plus and a second group B of which the Z coordinate values are minus with reference to the three-dimensional data memory 2102. Here, since the data stored in the three-dimensional data memory 2102 are previously sorted with the Z coordinate values, the controller 2111 additionally writes information indicating the boundary between the first group A and the second group B. In the tenth embodiment, the front side (close to the observer) in the viewing line from the fly-eye lens 2109 is a plus direction of the Z coordinate value, the back side (apart from the observer) in the viewing line from the fly-eye lens 2109 is a minus direction, and the Z coordinate value of the main point plane of the fly-eye lens 2109 is "0."

(Step S1004)
[Rendering Process for Object in Front of Lens]
Next, the controller 2111 requests the rendering engine 2104 to perform the rendering process to the voxel cubes belonging to the first group A stored in the three-dimensional data memory 2102. Details of the rendering process are described later. The rendering result is written to the second IP image memory 2106.

(Step S1005)
[Rendering Process for Object on the Back of Lens]
Next, the controller 2111 requests the rendering engine 2104 to perform the rendering process to the voxel cubes belonging to the second group B stored in the three-dimensional data memory 2102. Details of the rendering process are described later. The rendering result is written to the first IP image memory 2105.

In this way, by displaying contents written to the first IP image memory 2105 and the second IP image memory 2106 on the first IP image display plane 2107 and the second IP image display plane 2108 and observing the displayed image through the fly-eye lens 2109, the same object as the object input through the three-dimensional data input means 2101 is obtained as a three-dimensional image.

Next, details of the rendering process are described with reference to the flowcharts shown in FIGS. 34 and 35. FIG. 34 is a flowchart illustrating an operation of [Rendering Process for Object in front of Lens] which is performed in step S1004 of FIG. 33. in the rendering process for the voxel cubes (group A) located in front of the fly-eye lens 2109, it is necessary to render the voxel cubes with respect to the second IP image display plane 2108 opposite to the main point plane so as to reproduce the three-dimensional image without vertical and lateral inversion.

(Step S1101)

The rendering engine 2104 pays attention to the first pixel on the second IP image display plane 2108. The position of the pixel is determined based on the pixel arrangement stored in the parameter memory 2103. Here, it is assumed that the geometrical position of the second IP image display plane 2108 uniquely corresponds to the address of the second IP image memory 2106.

(Step S1102)

The rendering engine 2104 checks with reference to the second IP image memory 2106 whether the pixel under notice is formed previously. When the pixel under notice is formed previously, step S1110 is performed and otherwise step S1104 is performed.

(Step S1104)

The rendering engine 2104 pays attention to the first voxel cube. Here, the first voxel cube means a voxel cube located at the front end of the voxel cubes belonging to the second group A. That is, the voxel cubes are processed from the front side to the back side.

(Step S1105)

The rendering engine 2104 checks on the basis of the geometrical positional relation whether the voxel cube under notice can be captured by the use of a straight line extending from the coordinate position of the pixel under notice on the second IP image display plane 2108 to the main point of the fly-eye lens 2109, that is, whether the "pixel under notice", the "main point of a fly-eye lens 2109 (a fly-eye lens 2109 right above the pixel under notice)", and the "voxel cube under notice" exist in the same line. The coordinates of the main point is stored in the parameter memory 2103. Of which fly-eye lens 2109 the pixel under notice is associated with the main point can be checked on the basis of the geometrical arrangement of the fly-eye lenses 2109, the arrangement of the pixels, the pixel size, and the coordinates of the main points stored in the parameter memory 2103. This method is an "intersection check method" used in the ray tracing process and a variety of methods are suggested. Here, details of the method are not described. When the voxel cube is captured by the use of the line passing through the main point, step S1107 is performed and otherwise step S1108 is performed.

(Step S1107)

The rendering engine 2104 writes the color information of the voxel cube under notice and data indicating that "the color information is written" to the address corresponding to the pixel under notice in the second IP image memory 2106. In the tenth embodiment, the color information is expressed in 24 bits. The second IP image memory 2106 allocates 32 bits to a pixel. When the color information is written, the color information is subjected to computation so that the first IP image display plane 2107 and the second IP image display plane 2108 exhibit the same colors by considering the transmittance of the first IP image display plane 2107 stored in the parameter memory 2103. Specifically, the R, G, and B values of the color information of the voxel cube are multiplied by the transmittance and then the computation result is written as the color information to the second IP image memory 2106. A method of storing in advance the transmittances of R, G, and B in the parameter memory 2103 and multiplying the R, G, and B values by the transmittances, respectively, or a method of listing the values multiplied by the R, G, and B values in a table may be considered. The methods described above do not depart from the gist of the present invention. The most significant bit indicates whether "the color information is written." The next 24 bits indicate the color information. Data indicating "no color information is written" to all the pixels are initially set in the second IP image memory 2106.

(Step S1108)

The rendering engine 2104 checks whether all the voxel cubes belonging to the first group A are processed. When all the voxel cubes are processed, step S1109 is performed and otherwise step S1111 is performed.

(Step S1109)

The rendering engine 2104 checks whether all the pixels on the second IP image display plane 2108 are processed with reference to the second IP image memory 2106. When all the pixels are not processed, step S1110 is performed and when all the pixels are processed, the procedure is ended.

(Step S1110)

The rendering engine 2104 changes the pixel under notice to the "next" pixel and then performs step S1102.

(Step S1111)

The rendering engine 2104 changes the voxel cube under notice to the "next" voxel cube. Here, the "next" means one next thereto in the sorted order. That is, the voxel cubes are processed from the front side to the back side in the Z direction. Then, step S1105 is performed.

As described above, the voxel cubes of which the Z coordinate values are located at the front side of the fly-eye lens are processed from the front side. At this time, since the pixels to which the color information is previously written are skipped, it is possible to overwrite the color information of the voxel cube located at the back side (that is, voxel cube to be processed subsequently) to the color information of the voxel cube located at the front side in the viewing line and to reduce the trouble of performing the intersection check.

On the other hand, in the tenth embodiment, the order of changing the pixel under notice is not particularly mentioned, but, for example, a method of setting the primary scanning direction from the left-upper portion to the right-lower portion and setting the secondary scanning direction from the left to the right may be used. A method of processing a pixel right below each fly-eye lens 2109 and then changing the fly-eye lens 2109 under notice may also be used. All the methods described above do not depart from the gist of the present invention.

Next, the rendering process for the voxel cubes (group B) on the back of the fly-eye lens 2109 in step S1005 is described with reference to the flowchart shown in FIG. 35. As described above, it is necessary to render the voxel cubes on the back of the fly-eye lens 2109 with respect to the first IP image display plane 2107 in front of the main point plane so as to reproduce the three-dimensional image without vertical and lateral inversion.

(Step S1201)

The rendering engine 2104 pays attention to the first pixel on the first IP image display plane 2107. The position of the pixel is determined based on the pixel arrangement stored in the parameter memory 2103. Here, it is assumed that the geometrical position of the first IP image display plane 2107 uniquely corresponds to the address of the first IP image memory 2105.

(Step S1102)

The rendering engine 2104 checks with reference to the first IP image memory 2105 whether the pixel under notice is formed previously. When the pixel under notice is formed previously, step S1209 is performed and otherwise step S1203 is performed.

(Step S1203)

Figure 36:
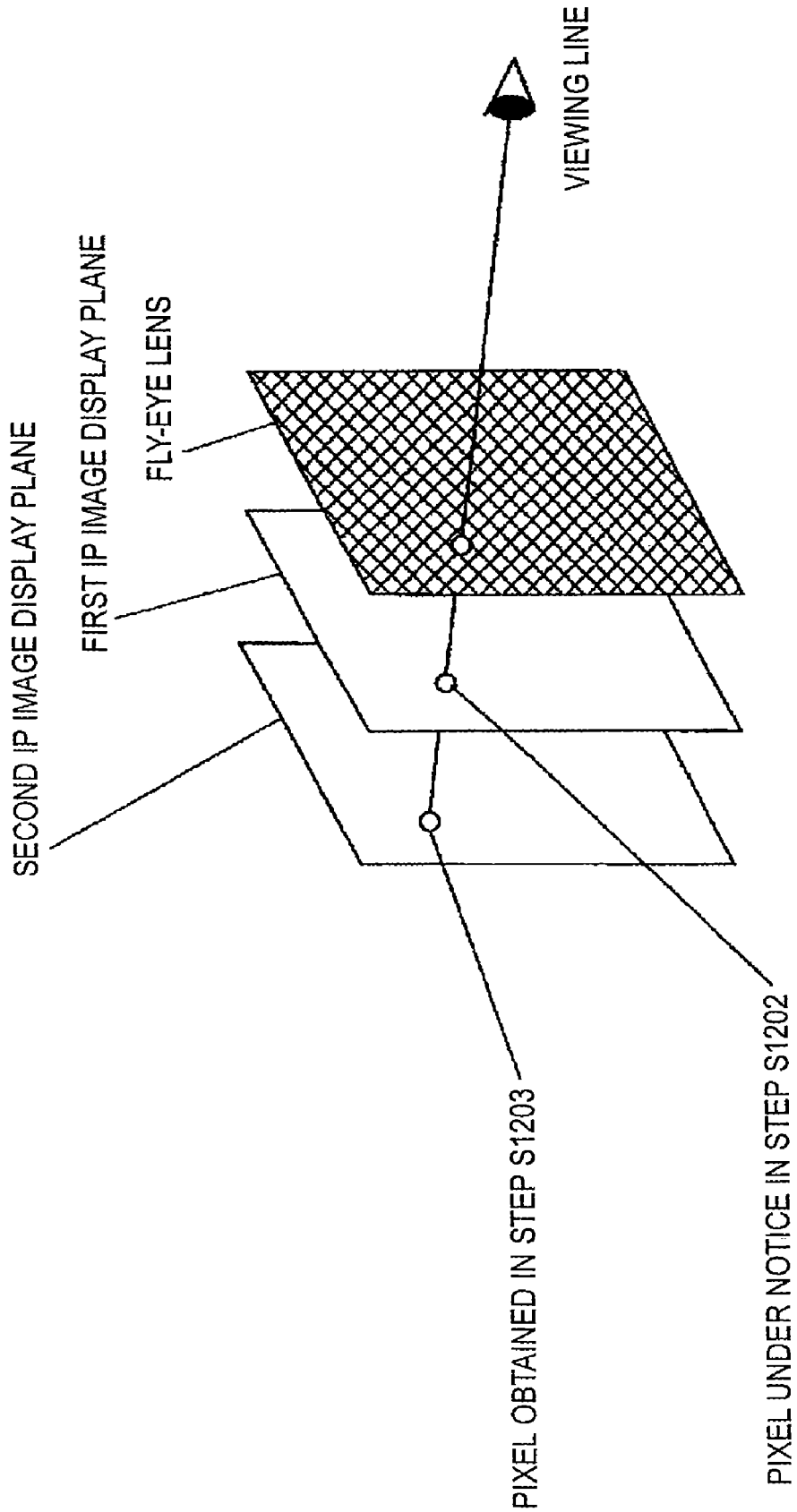
FIG. 36 is a diagram illustrating a positional relation between two IP image display planes and the lens according to the tenth embodiment of the present invention.

The rendering engine 2104 calculates a position where the extension of the straight line connecting the pixel position of the pixel under notice on the first IP image display plane 2107 in step S1202 to the position of the main point of the fly-eye lens 2109 right above the pixel intersects the second IP image display plane 2108 and checks with reference to the second IP image memory 2106 whether the pixel is formed previously at the calculated position. FIG. 36 illustrates a positional relation among the pixel on the first IP image display plane 2107, the pixel on the second IP image display plane 2108, and the fly-eye lens 2109. When the pixel is formed previously, step S2109 is performed and otherwise step S2104 is performed.

(Step S1204)

The rendering engine 2104 pays attention to the first voxel cube. Here, the first voxel cube means a voxel cube located at the front end of the voxel cubes belonging to the second group B. That is, the voxel cubes are processed from the front side to the back side.

(Step S1205)

The rendering engine 2104 checks on the basis of the geometrical positional relation whether the voxel cube under notice can be captured by the use of a straight line extending from the coordinate position of the pixel under notice on the first IP image display plane 2107 to the main point of the fly-eye lens 2109, that is, whether the "pixel under notice", the "main point of a fly-eye lens 2109 (a fly-eye lens 2109 right above the pixel under notice)", and the "voxel cube under notice" exist in the same line. The coordinates of the main point is stored in the parameter memory 2103. Of which fly-eye lens 2109 the pixel under notice is associated with the main point can be checked on the basis of the geometrical arrangement of the fly-eye lenses 2109, the arrangement of the pixels, the pixel size, and the coordinates of the main points stored in the parameter memory 2103. This method is an "intersection check method" used in the ray tracing process and a variety of methods are suggested. Here, details of the method are not described. When the voxel cube is captured by the use of the line passing through the main point, step S1206 is performed and otherwise step S1207 is performed.

(Step S1206)

The rendering engine 2104 writes the color information of the voxel cube under notice and data indicating that "the color information is written" to the address corresponding to the pixel under notice in the first IP image memory 2105. Here, the color information is expressed in 24 bits. The first IP image memory 2105 allocates 32 bits to a pixel. The most significant bit indicates whether "the color information is written." The next 24 bits indicate the color information. Data indicating "no color information is written" to all the pixels are initially set in the first IP image memory 2105.

(Step S1207)

The rendering engine 2104 checks whether all the voxel cubes belonging to group B are processed. When all the voxel cubes are processed, step S1208 is performed and otherwise step S1210 is performed.

(Step S1208)

The rendering engine 2104 checks whether all the pixels on the first IP image display plane 2107 are processed with reference to the first IP image memory 2105. When all the pixels are not processed, step S1209 is performed and otherwise the procedure is ended.

(Step S1209)

The rendering engine 2104 changes the pixel under notice to the next pixel and then performs step S1202.

(Step S1210)

The rendering engine 2104 changes the voxel cube under notice to the next voxel cube. Here, the next means one next thereto in the sorted order. That is, the voxel cubes are processed from the front side to the back side in the Z direction. Then, step S1205 is performed.

In the three-dimensional image reproducing method according to the tenth embodiment, the first IP image display plane 2107 which can make the specified pixel transparent is disposed between the fly-eye lens 2109 and the focal point plane and the second IP image display plane 2108 is disposed at the opposite side of the focal point plane with respect to the fly-eye lens 2109. Accordingly, the object in front of the fly-eye lens 2109 is displayed on the second IP image display plane 2108, the object on the back of the fly-eye lens 2109 is displayed on the first IP image display plane 2107, and the pixel where the straight line connecting the pixel on the second IP image display plane 2108 and the fly-eye lens 2109 intersects the first IP image display plane 2107 is made transparent. As a result, since the object in front of the fly-eye lens 2109 and the object on the back of the fly-eye lens form an image at the same position with the same size as the original object and without vertical and lateral inversion, it is possible to obtain a three-dimensionally reproduced image with a high resolution.

In the three-dimensional image reproducing method according to the tenth embodiment, when an IP image is first formed on the first IP image display plane 2107 and then an IP image is formed on the second IP image display plane 2108, the pixel at the position where the straight line connecting the pixel position in which the IP image is formed to the main point of the fly-eye lens 2109 intersects the first IP image display plane 2107 is made transparent. Accordingly, since the pixel on the second IP image display plane 2108 can be necessarily seen through the fly-eye lens 2109 and the transparent pixel on the first IP image display plane 2107, the pixel on the first IP image display plane 2107 for obtaining the three-dimensional image of the object on the back of the fly-eye lens 2109 does not cover the pixel on the second IP image display plane 2108 for obtaining the three-dimensional image of the object in front of the fly-eye lens 2109, thereby reproducing the three-dimensional image with right arrangement toward the back side of the viewing line.

In addition, in the three-dimensional image reproducing method according to the tenth embodiment, the data obtained by dividing an object into a plurality of voxel cubes are sorted with the Z coordinate values of the voxel cubes in the descending order (here, it is assumed that the Z axis is perpendicular to the fly-eye lens 2109, the origin is set on the main point plane of the fly-eye lens 2109, and the observer side is defined as plus) and the IP images corresponding to the voxel cubes are obtained in that order. When an IP image exists on the first and second IP image display planes 2107 and 2108, the process is omitted. As a result, when the voxel cube at the front side as seen from the observer is first processed and then a plurality of voxel cubes is mapped onto the same pixel position on the first and second IP image display planes 2107 and 2108, data of the front side in the viewing line are always left. Accordingly, it is possible to prevent the phenomenon that the object located at the back side in the viewing line is seen at the front side in the viewing line. In addition, the pixels in which the IP images are previously formed on the first and second IP image display planes 2107 and 2108 can be skipped, it is possible to reduce the operations, thereby enhancing the processing speed.

That is, in the tenth embodiment, when the IP image is formed on the first IP image display plane located at the front side in the viewing line, the IP image formed previously on the second IP image display plane 2108 located at the back side in the viewing line is not covered. Accordingly, when a three-dimensional image is reproduced, the object on the back of the fly-eye lens 2109 does not cover the object in front of the fly-eye lens 2109. In addition, since the three-dimensional image of the object in front of the fly-eye lens 2109 and the three-dimensional image of the object on the back of the fly-eye lens 2109 are formed at the original positions without vertical and lateral inversion, it is possible to obtain a three-dimensional image with a high resolution. Since the pixels on the second IP image display plane 2108 are formed in consideration of the transmittance of the first IP image display plane 2107, the observer recognizes that the color of the first IP image display plane 2107 is equal to the color of the second IP image display plane 2108, thereby obtaining a realistic three-dimensional image.

Here, an object is divided into cubes (voxel cubes) for modeling, but the gist of the present invention is not changed even by the use of spheres or rectangular parallelepipeds.

Eleventh Embodiment

Figure 37:
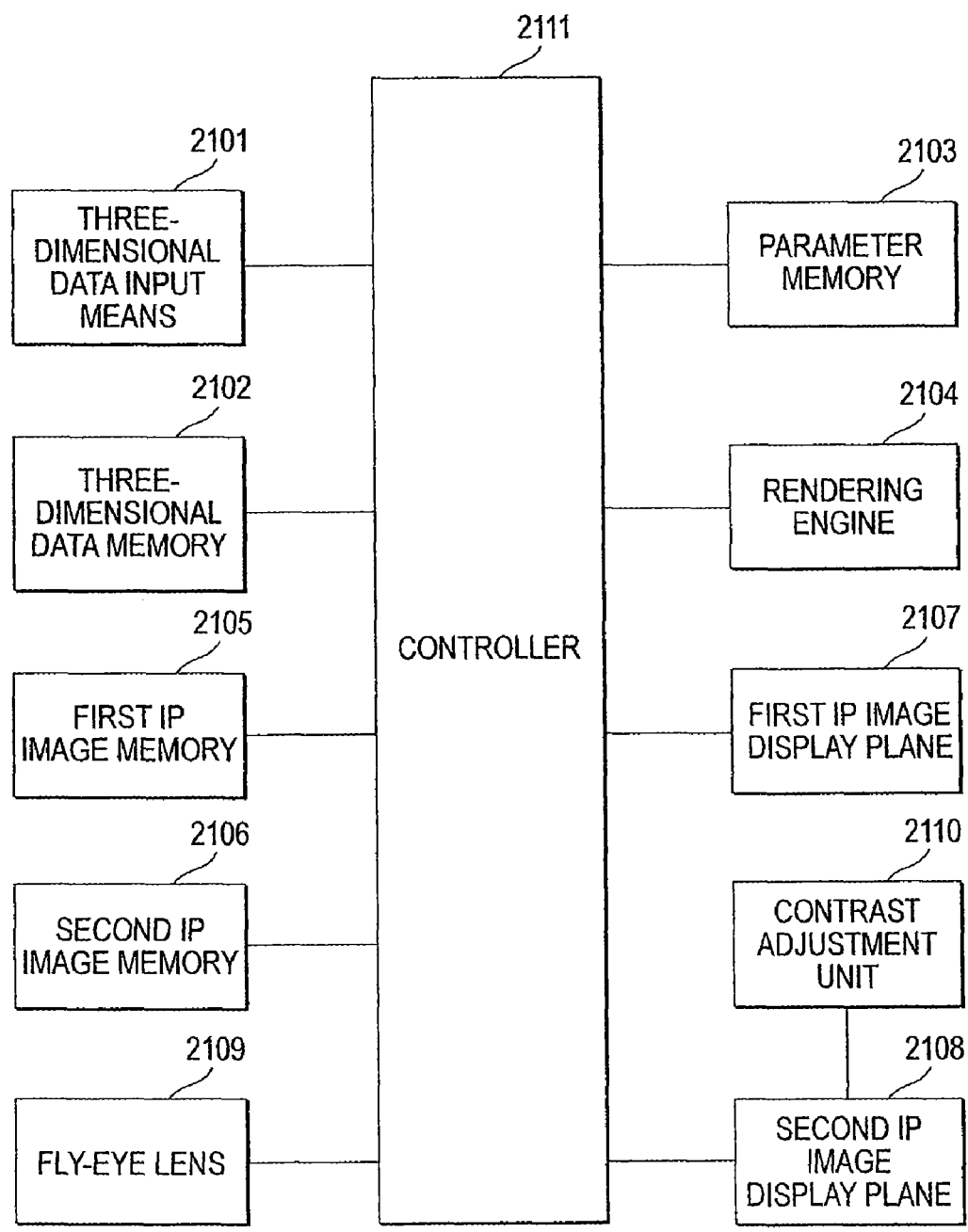
FIG. 37 is a functional block diagram illustrating a three-dimensional image reproducing apparatus according to an eleventh embodiment of the present invention.
Figure 38:
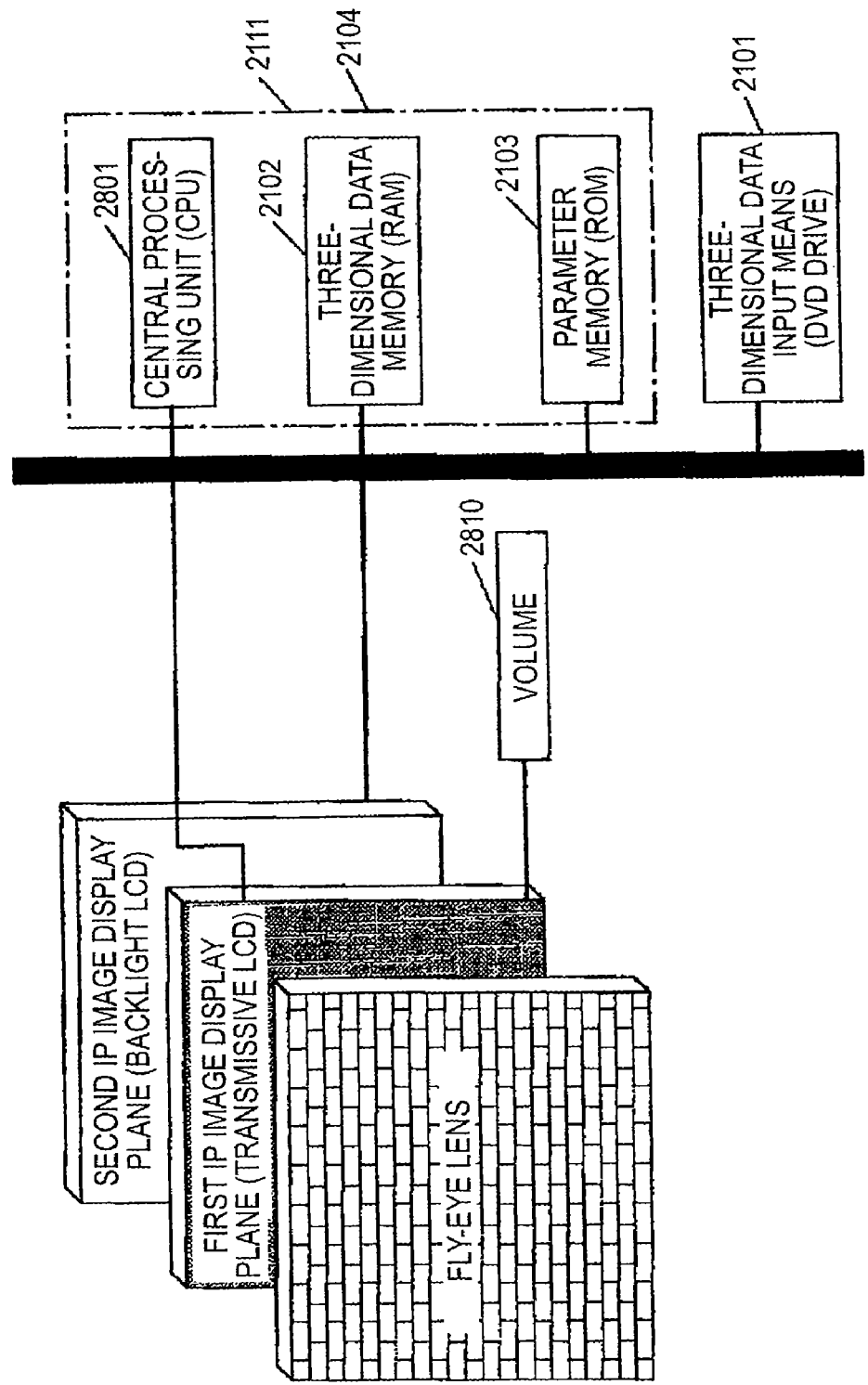
FIG. 38 is a block diagram illustrating the three-dimensional image reproducing apparatus according to the eleventh embodiment of the present invention relatively to specific hardware elements.

FIG. 37 is a functional block diagram illustrating a three-dimensional image reproducing apparatus according to an eleventh embodiment of the present invention. FIG. 38 is a block diagram illustrating the three-dimensional image reproducing apparatus according to the eleventh embodiment of the present invention relatively to specific hardware components. As shown in FIGS. 37 and 38, the three-dimensional image reproducing apparatus according to the eleventh embodiment includes a contrast adjustment unit 2110 for adjusting a contrast provided in the second IP image display plane 2107. Other elements are similar to those of the three-dimensional image reproducing apparatus according to the tenth embodiment.

Figure 39:
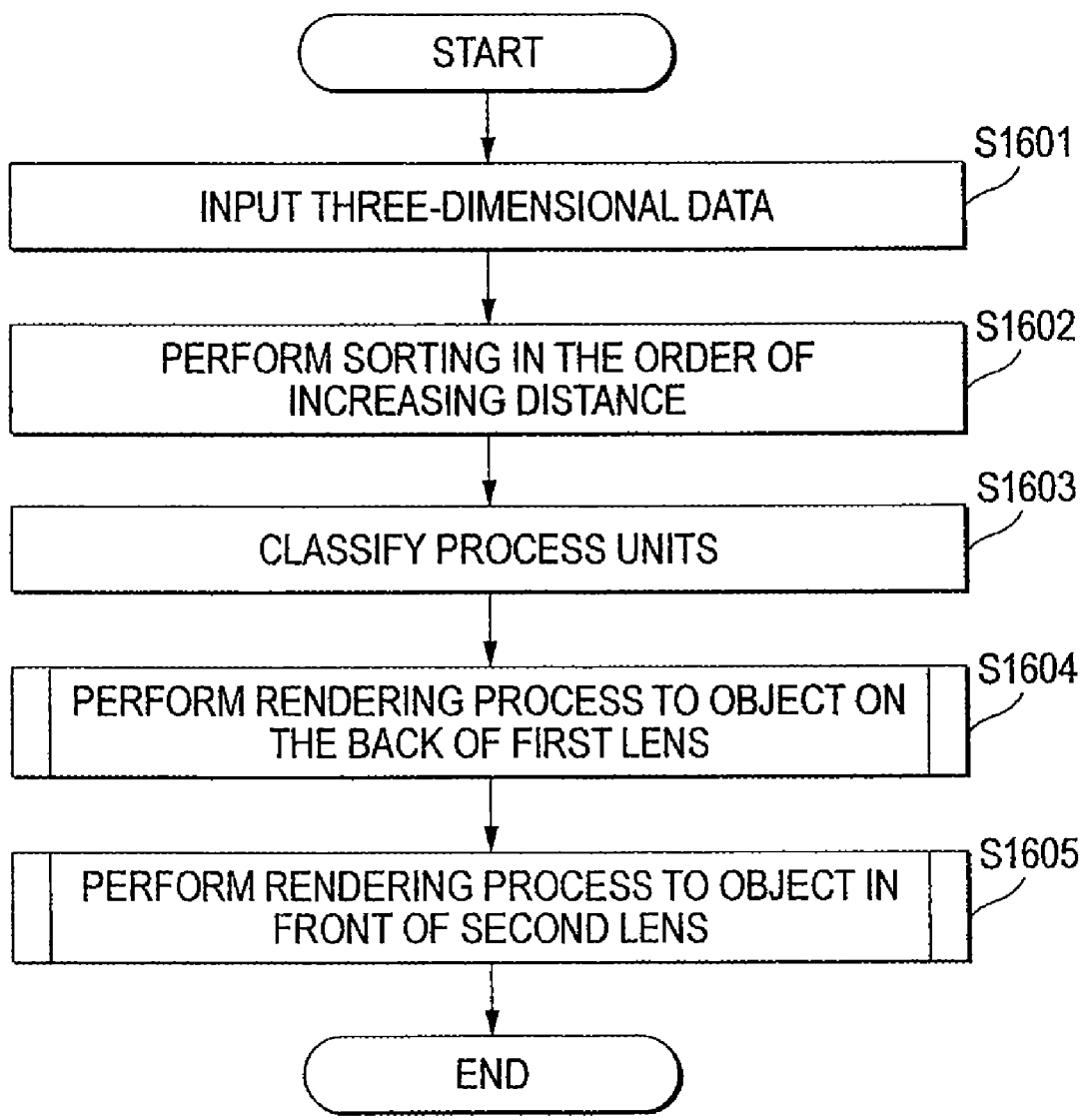
FIG. 39 is a flowchart illustrating a process of rendering the object on the back of the lens in the three-dimensional image reproducing apparatus according to the eleventh embodiment of the present invention.
Figure 40:
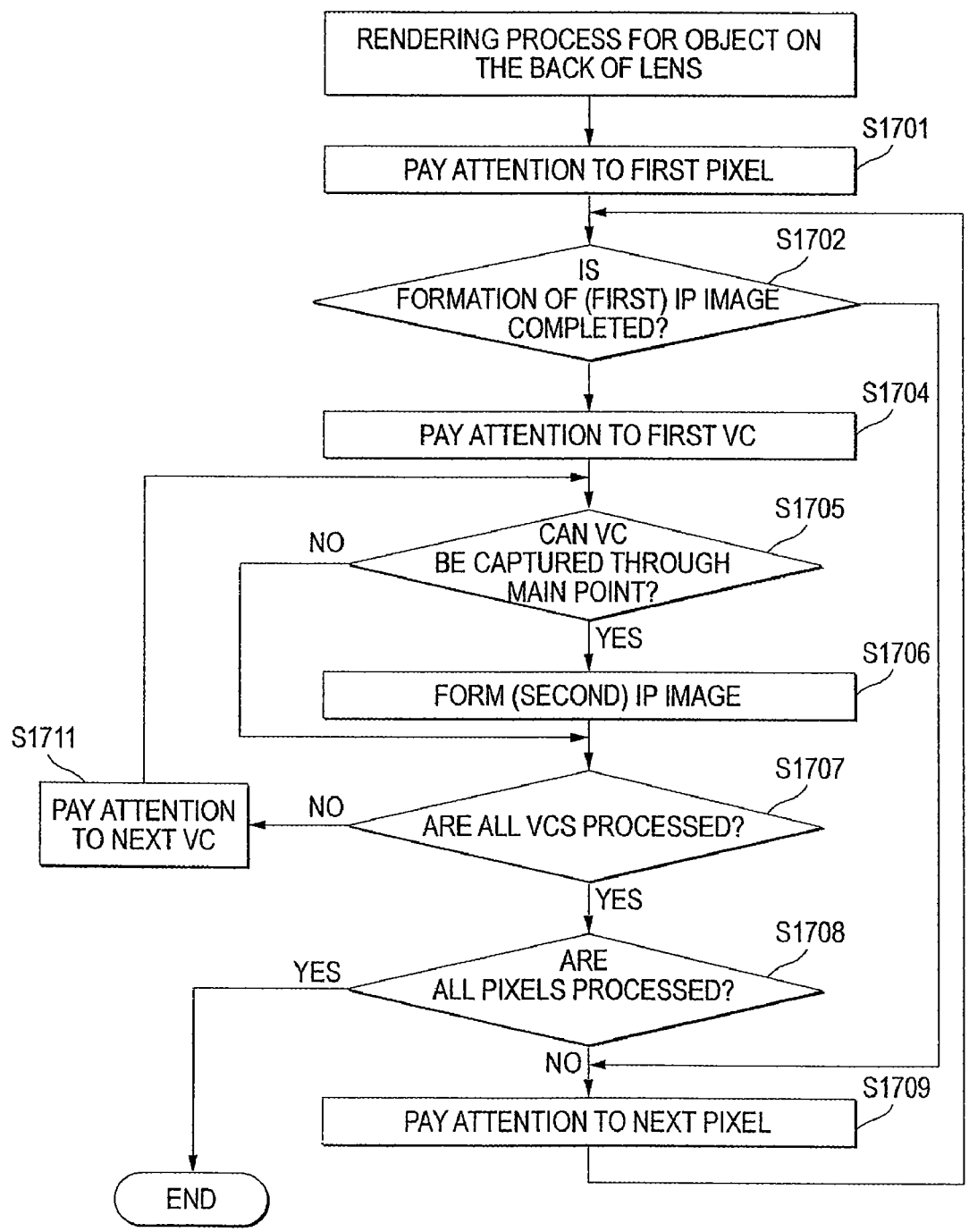
FIG. 40 is a flowchart illustrating a process of rendering the object on the back of the lens in the three-dimensional image reproducing apparatus according to the eleventh embodiment of the present invention.
Figure 41:
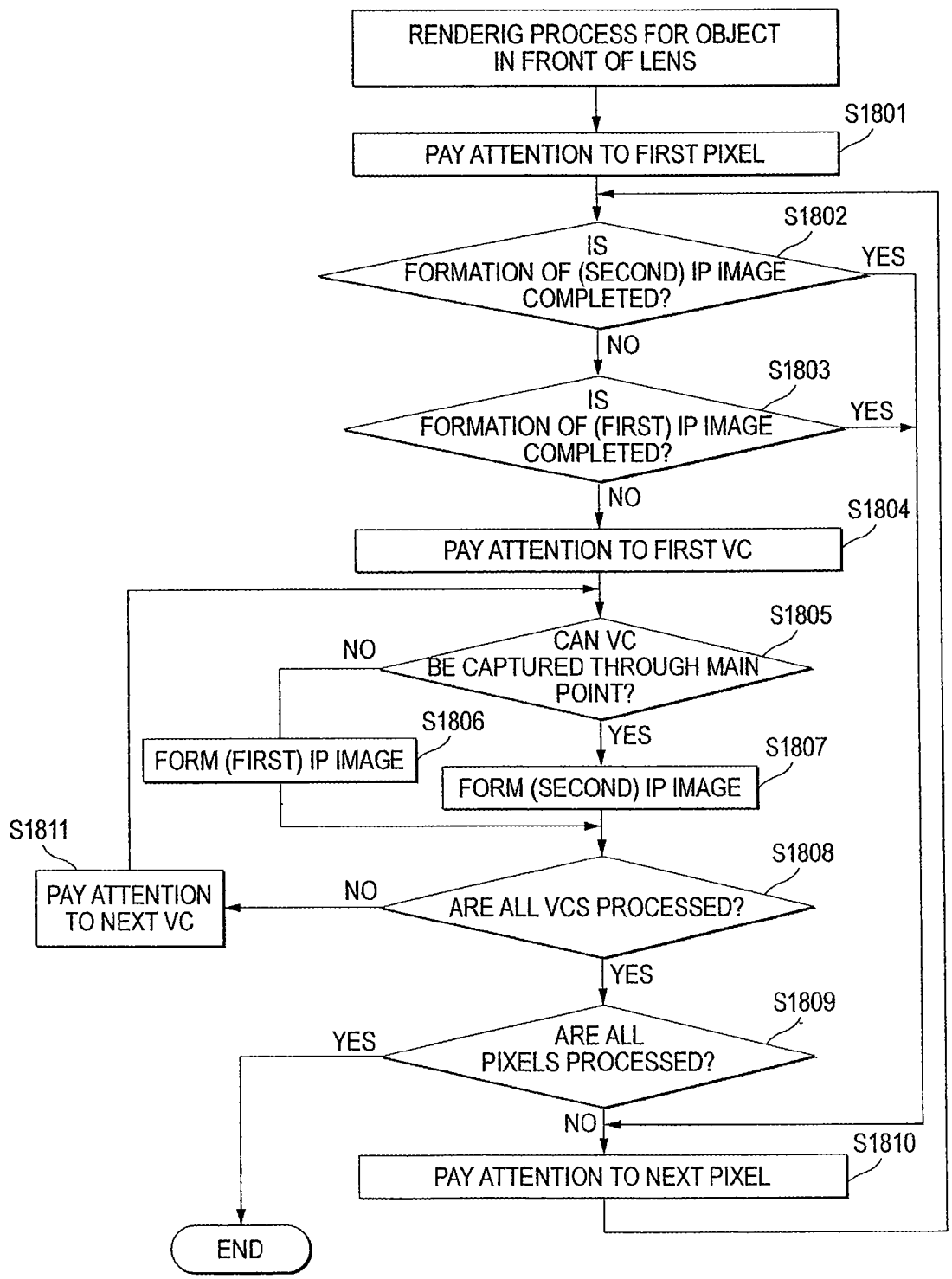
FIG. 41 is a flowchart illustrating a process of rendering the object in front of the lens in the three-dimensional image reproducing apparatus according to the eleventh embodiment of the present invention.

Operations of the three-dimensional image reproducing apparatus according to the eleventh embodiment are described with reference to the flowcharts shown in FIGS. 39 to 41. First, the entire operations are schematically described with reference to the flowchart shown in FIG. 39 and then details of the rendering process are described. In the tenth embodiment, the rendering process is first performed to the object in front of the fly-eye lens 2109 and then the rendering process is performed to the object located at the back side. However, in the eleventh embodiment, the rendering process is first performed to the object located at the back side and then the rendering process is performed to the object located at the front side. In order to clearly understand the structural features of the eleventh embodiment, the blocks carrying out the same operations as those of the tenth embodiment are simply described in brief and difference is concentrically described in detail.

(Steps S1601 to S1603)

Figure 33:
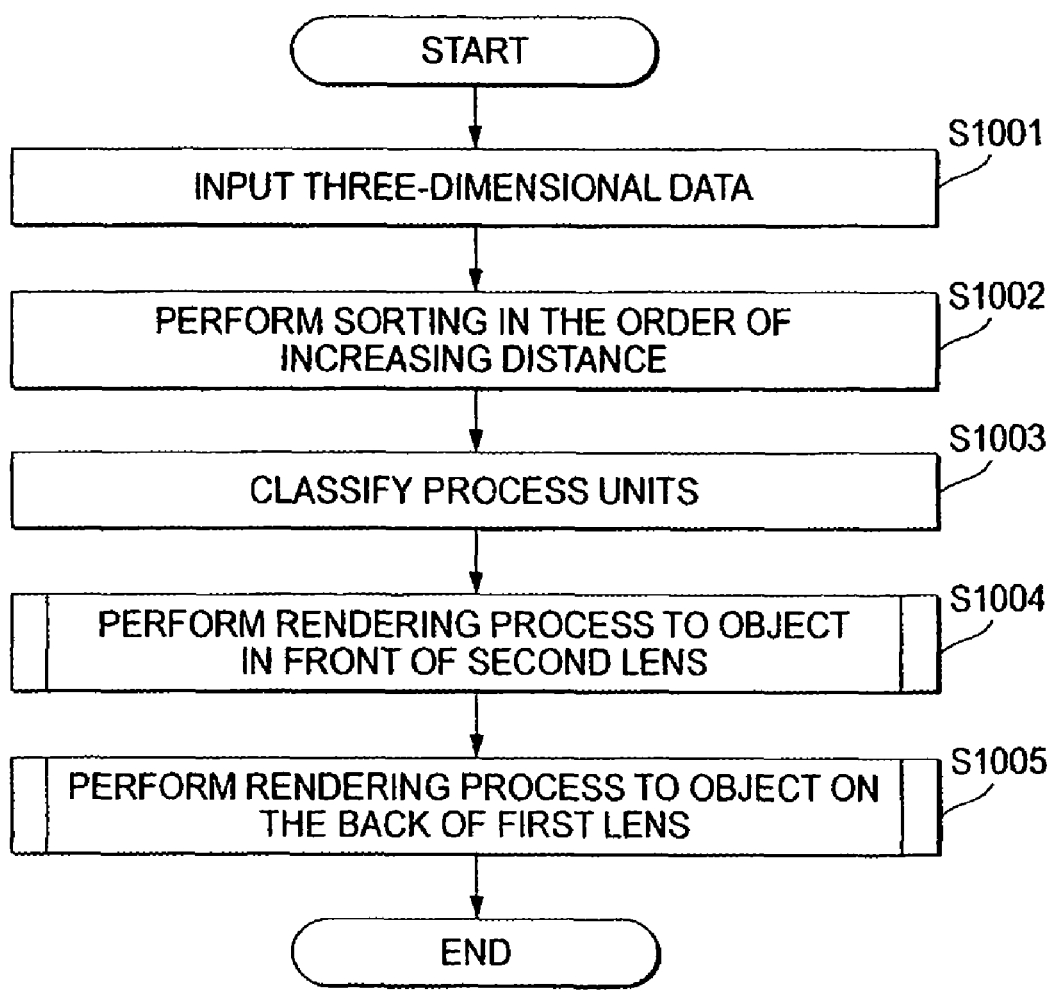
FIG. 33 is a flowchart schematically illustrating entire operations of the three-dimensional image reproducing apparatus according to the tenth embodiment of the present invention.
Figure 34:
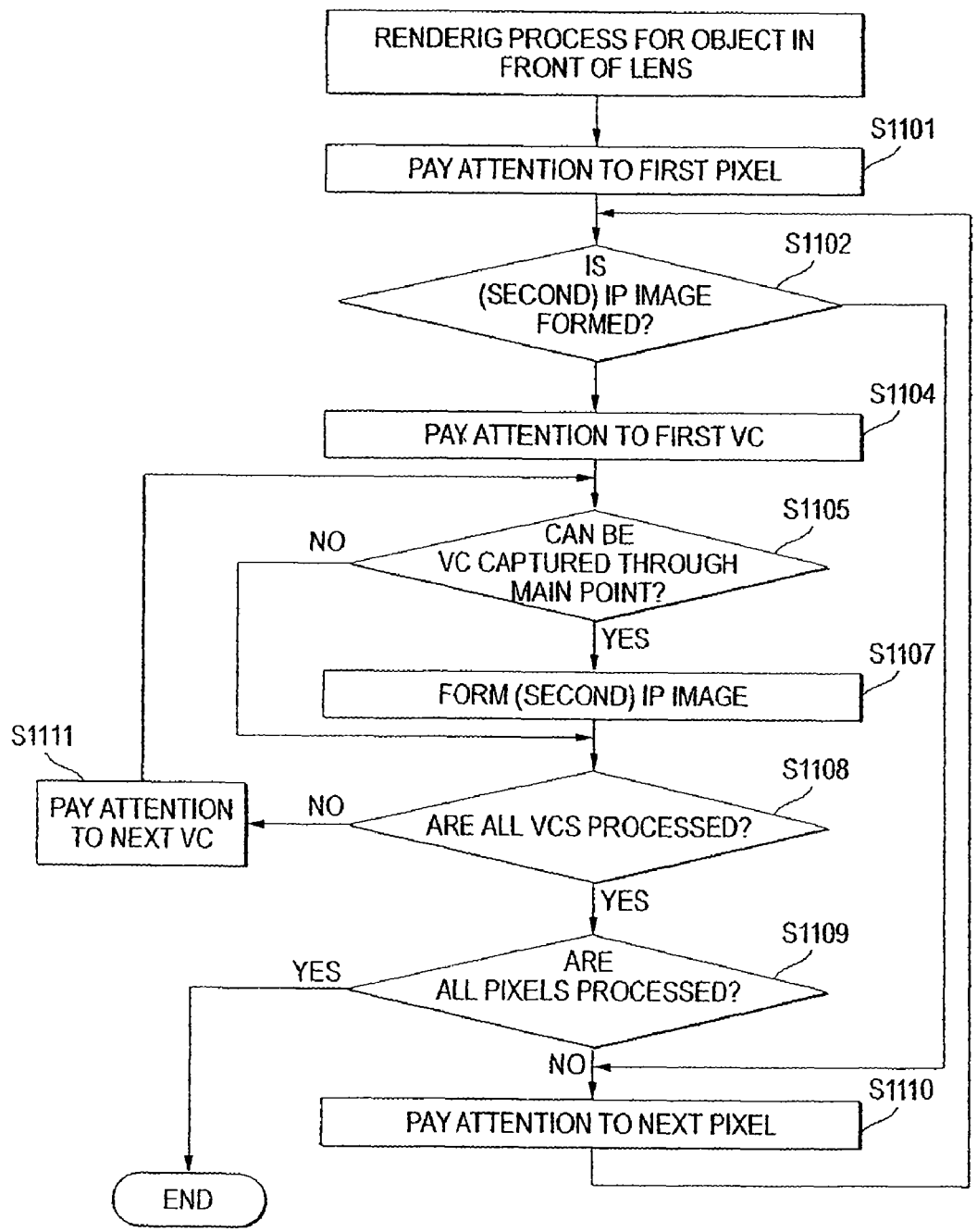
FIG. 34 is a flowchart illustrating a process of rendering the object in front of the lens in the three-dimensional image reproducing apparatus according to the tenth embodiment of the present invention.

The operations of steps S1601 to S1603 according to the eleventh embodiment are similar to the operations of steps S1001 to S1003 according to the tenth embodiment shown in the flowchart of FIG. 33. That is, the three-dimensional data are read and are then rearranged in the descending order using the Z coordinate values as the sort key. Thereafter, the three-dimensional data are classified into a first group A in which the Z coordinate values are plus and a second group B in which the Z coordinate values are minus.

(Step S1604)

Next, the controller 2111 requests the rendering engine 2104 to render the voxel cubes belonging to the first group A stored in the three-dimensional data memory 2102. That is, the rendering process is performed to the object on the back of the fly-eye lens 2109. The rendering result is written to the first IP image memory 2105.

(Step S1605)

Next, in the eleventh embodiment, the controller 2111 requests the rendering engine 2104 to render the voxel cubes belonging to the second group B stored in the three-dimensional data memory 2102. That is, the rendering process is performed to the object in front of the fly-eye lens 2109. The rendering result is written to the second IP image memory 2106.

Next, details of the rendering process are described with reference to the flowcharts shown in FIGS. 40 and 41. FIG. 40 is a flowchart illustrating an operation of [Rendering Process for Object on the back of Lens] which is performed in step S1604 of FIG. 39. This operation is approximately equal to the flowchart according to the tenth embodiment shown in FIG. 35. However, in the eleventh embodiment, since the rendering process is first performed to the object on the back of the lens, such step S1203 of checking whether formation for the pixel is completed is not required.

Similarly to the tenth embodiment, it is necessary to render the voxel cubes on the back of the fly-eye lens 2109 with respect to the first IP image display plane 2107 in front of the main point plane so as to reproduce the three-dimensional image without vertical and lateral inversion.

(Steps S1701 and S1702)

Figure 35:
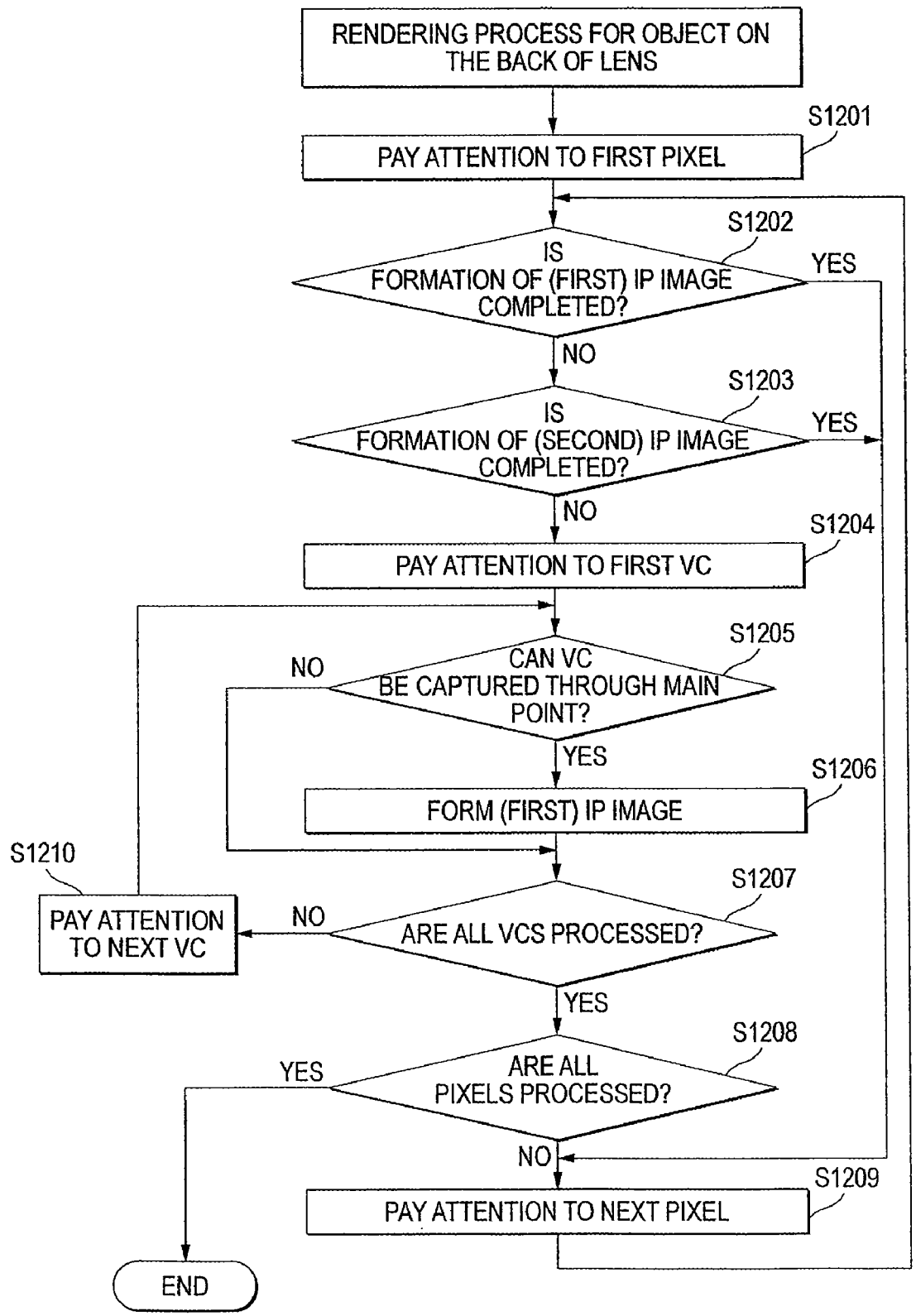
FIG. 35 is a flowchart illustrating a process of rendering the object on the back of the lens in the three-dimensional image reproducing apparatus according to the tenth embodiment of the present invention.

The operations of steps S1701 and S1702 according to the eleventh embodiment are similar to the operations of steps S1201 and S1202 of the flowchart according to the tenth embodiment shown in FIG. 35. That is, the rendering engine 2104 checks with reference to the first IP image memory 2105 whether the formation for the pixel under notice is completed. When it is YES, the rendering engine then pays attention to the next pixel in step S1709 and otherwise step S1704 is performed. In the eleventh embodiment, as described above, since the rendering process is first performed to the object on the back of the lens, such step S1203 of checking whether the formation for the pixel is completed is not required.

(Steps S1704 to S1709)

Next, operations of steps S1704 to S1709 according to the eleventh embodiment are similar to those of steps S1204 to S1209 in the flowchart according to the tenth embodiment shown in FIG. 35.

In the eleventh embodiment, similarly to the tenth embodiment, the voxel cubes of which the Z coordinate values are located at the front side of the fly-eye lens 2109 are processed from the back side. At this time, since the pixels to which the color information is previously written are skipped, it is possible to overwrite the color information of the voxel cube located at the back side (that is, voxel cube to be processed subsequently) to the color information of the voxel cube located at the front side in the viewing line and to reduce the trouble of performing the intersection check.

[Rendering Process for Object in Front of Lens]

Next, the rendering process for the voxel cubes (group A) in front of the fly-eye lens 2109 in step S1605 is described with reference to the flowchart shown in FIG. 41. Similarly to the tenth embodiment, it is necessary to render the voxel cubes in front of the fly-eye lens 2109 with respect to the second IP image display plane 2108 on the back of the main point plane so as to reproduce the three-dimensional image without vertical and lateral inversion.

(Step S1801 and S1802)

The operations of steps S1801 and S1802 according to the eleventh embodiment are similar to the operations of steps S1101 and S1102 of the flowchart according to the tenth embodiment shown in FIG. 34. In the eleventh embodiment, since the rendering process is first performed to the object on the back of the fly-eye lens 2109, step S1803 is added in comparison with the flowchart shown in FIG. 34.

(Step S1803)

Figure 42:
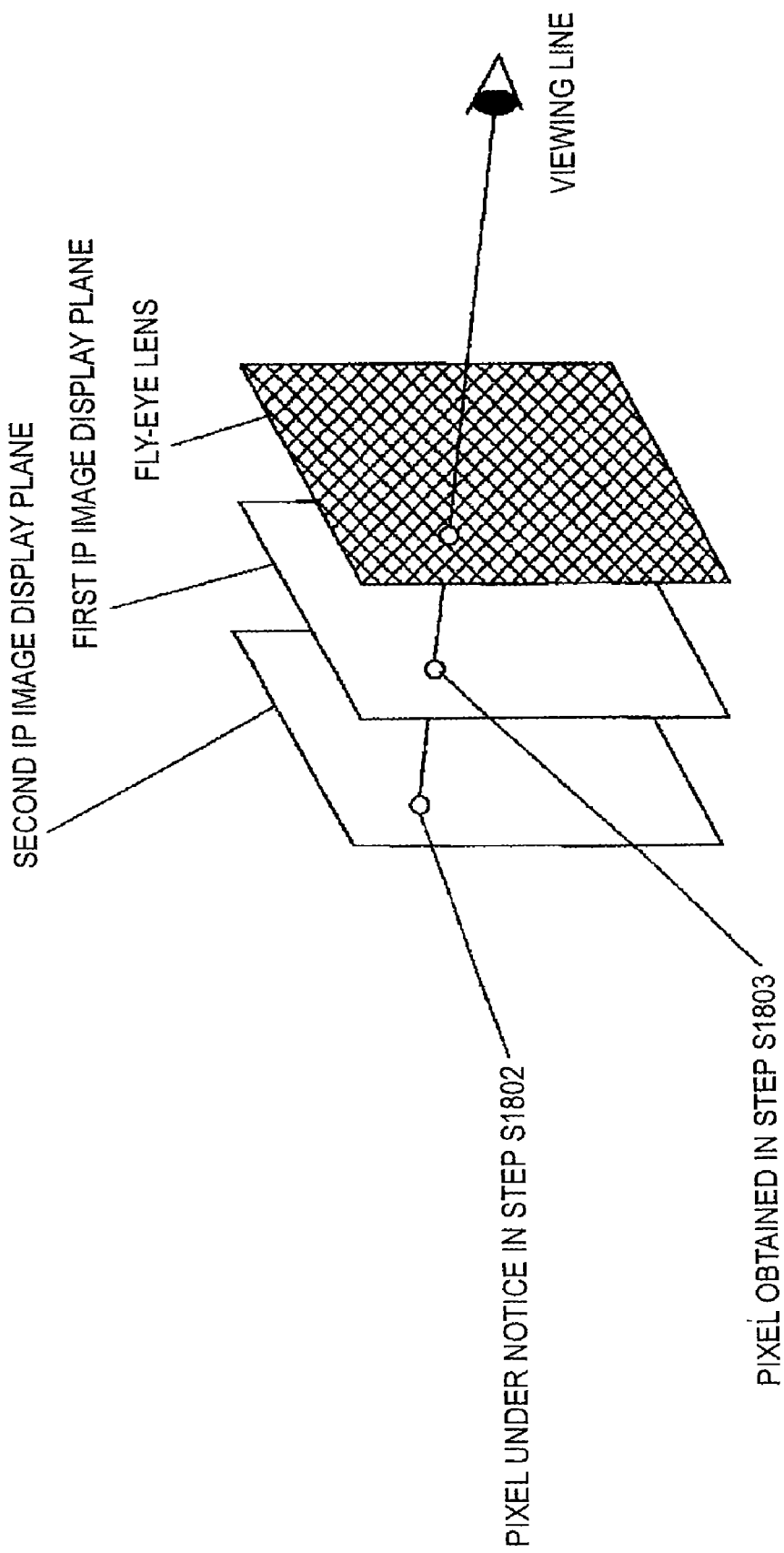
FIG. 42 is a diagram illustrating a positional relation between two IP image display planes and the lens according to the eleventh embodiment of the present invention.
Figure 43:
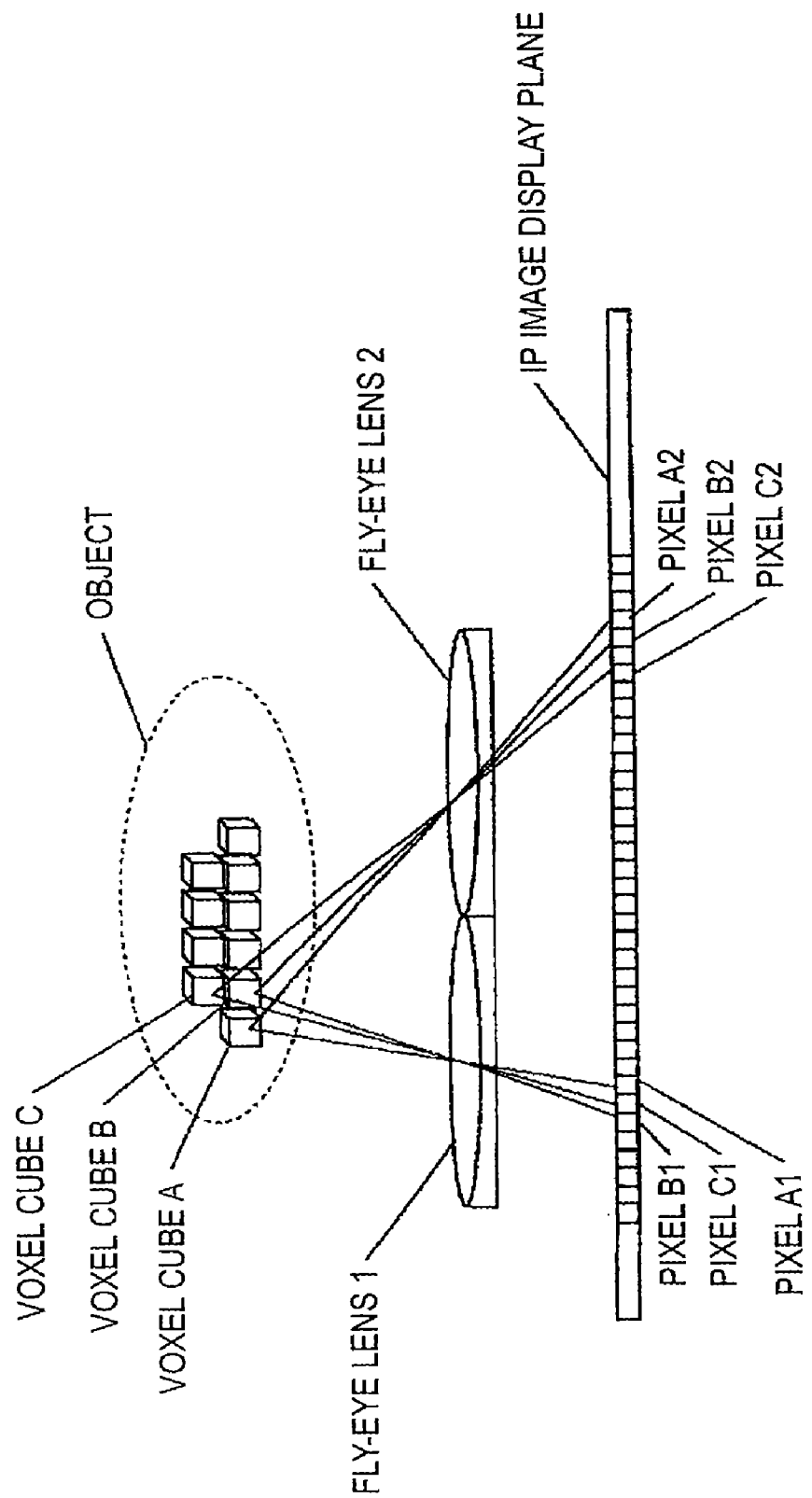
FIG. 43 is a diagram illustrating a positional relation between the voxel cubes and pixels on the IP image display plane.
Figure 44:
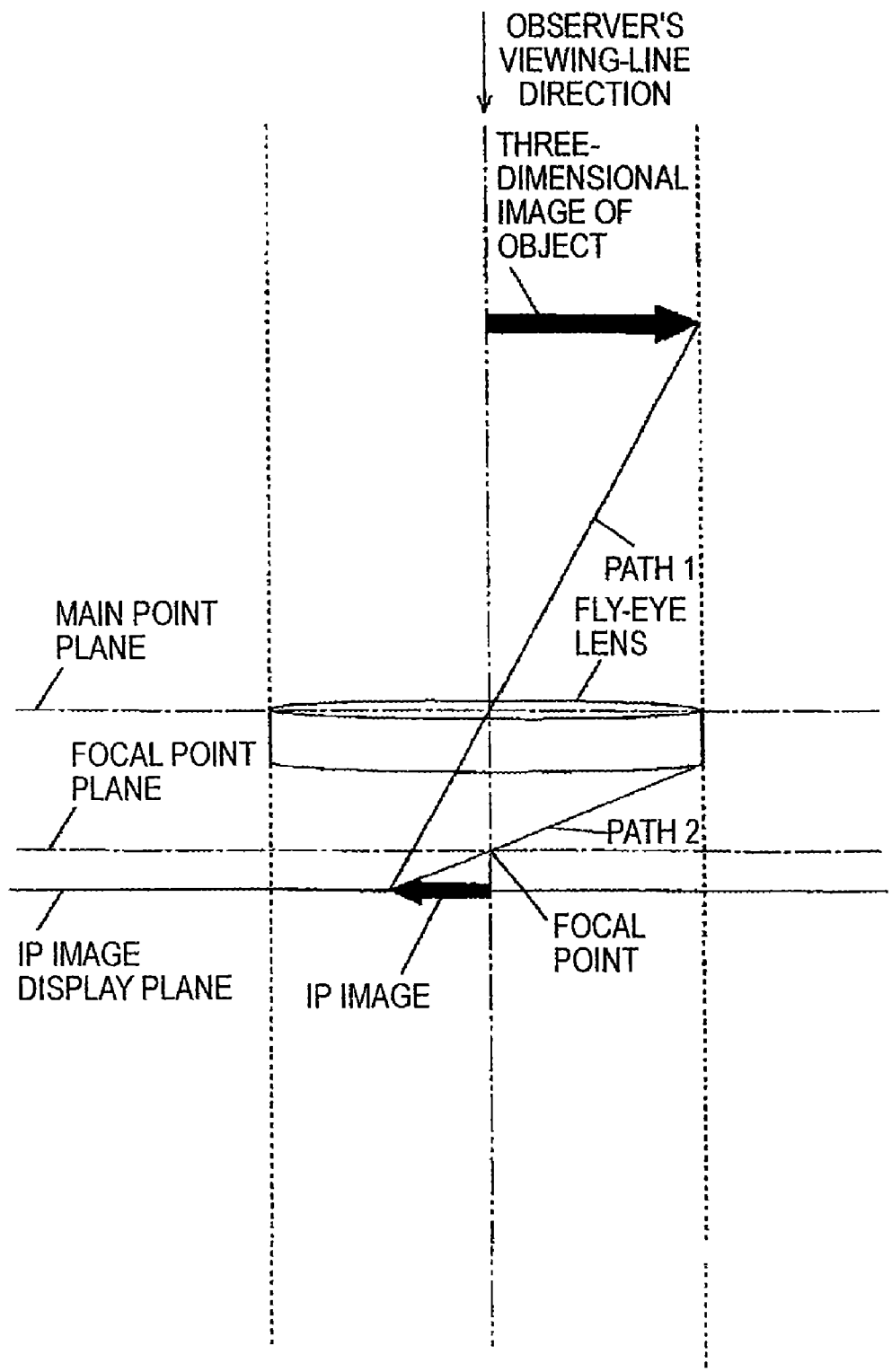
FIG. 44 is a diagram illustrating a positional relation between an IP image of an object in front of the lens and a three-dimensional image of the object.
Figure 45:
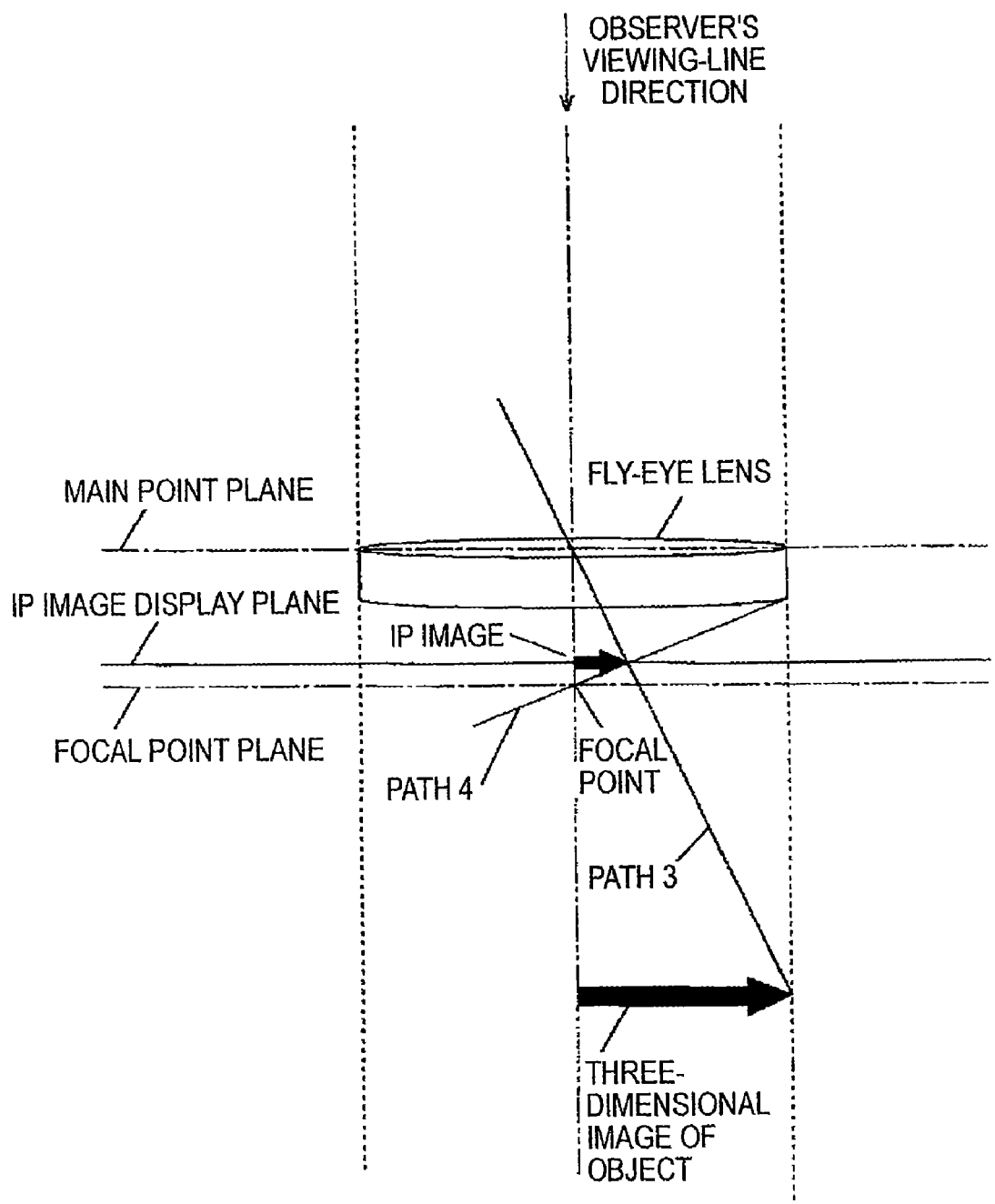
FIG. 45 is a diagram illustrating a positional relation between an IP image of an object on the back of the lens and a three-dimensional image of the object.
Figure 46:
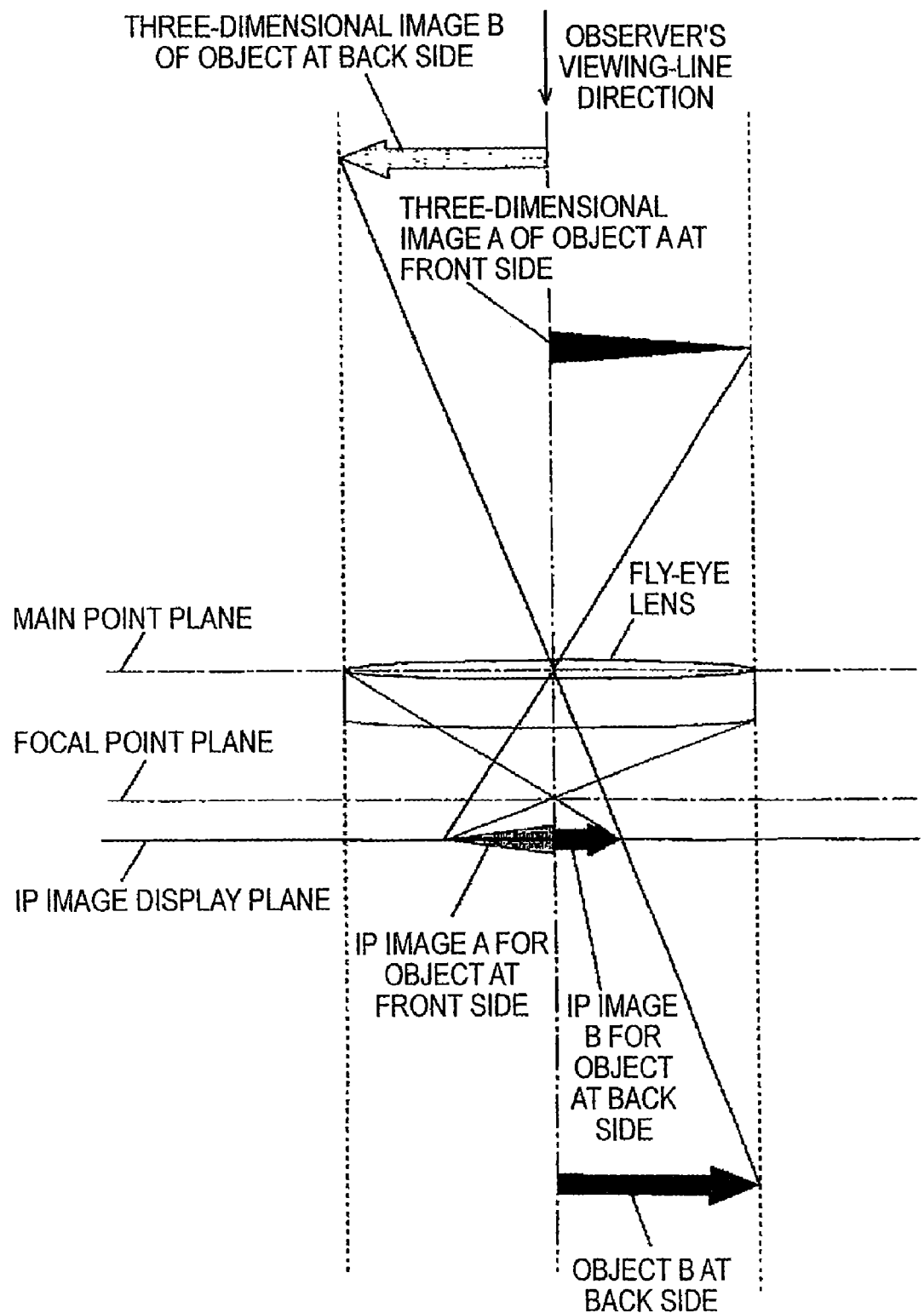
FIG. 46 is a diagram illustrating a positional relation between IP images and three-dimensional images when only one sheet of IP image display plane exists.
Figure 47:
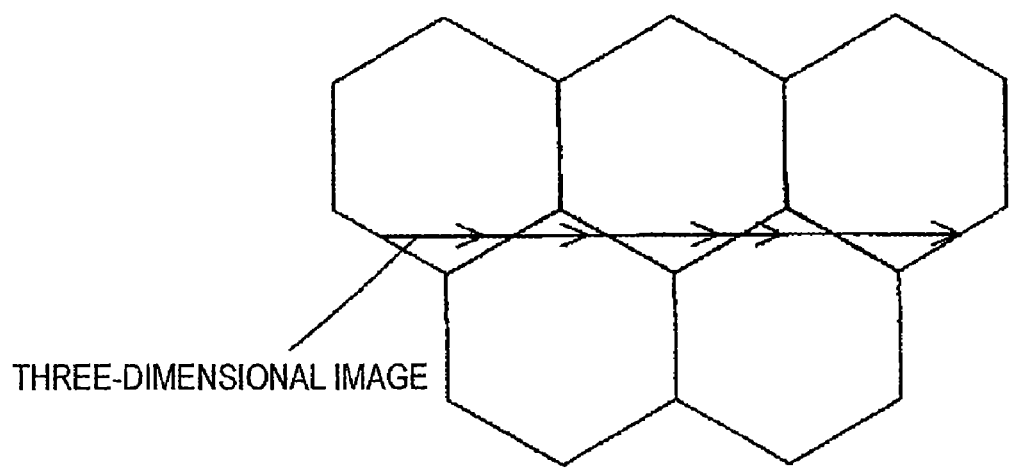
FIG. 47 is an enlarged diagram illustrating an IP image of an object in front of a lens as seen through the lens.
Figure 48:
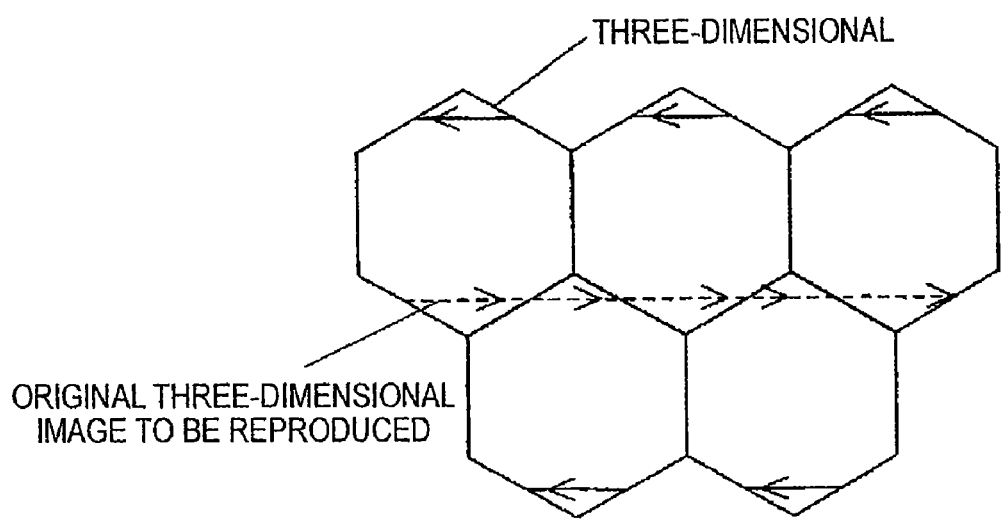
FIG. 48 is an enlarged diagram illustrating an IP image of an object on the back of the lens as seen through the lens.

The rendering engine 2104 calculates the position where the straight line connecting the position of the pixel under notice in step S1802 on the second IP image display plane 2108 to the position of the main point of the fly-eye lens 2109 right above the pixel intersects the first IP image display plane 2107, and then checks with reference to the first IP image memory 2105 corresponding to the position when the formation for the corresponding pixel is completed. FIG. 42 illustrates a positional relation among the pixel on the first IP image display plane 2107, the pixel on the second IP image display plane 2108, and the fly-eye lens 2109. When it is YES, step S1810 is performed and otherwise step S1804 is performed.

(Step S1804)

Next, the rendering engine 2104 pays attention to the first voxel cube. Here, the first voxel cube means a voxel cube located at the head among the voxel cubes belonging to the second group B. That is, the voxel cubes are processed from the front side to the back side.

(Step S1805)

Similarly to the first embodiment, the rendering engine 2104 checks on the basis of the geometrical positional relation whether the voxel cube under notice can be captured by the use of a straight line extending from the coordinate position of the pixel under notice on the second IP image display plane 2108 to the main point of the fly-eye lens 2109, that is, whether the "pixel under notice", the "main point of a fly-eye lens 2109 (a fly-eye lens 2109 right above the pixel under notice)", and the "voxel cube under notice" exist in the same line. The coordinates of the main point is stored in the parameter memory 2103. Of which fly-eye lens 2109 the pixel under notice is associated with the main point can be checked on the basis of the geometrical arrangement of the fly-eye lenses 2109, the arrangement of the pixels, the pixel size, and the coordinates of the main points stored in the parameter memory 2103. This method is an "intersection check method" used in the ray tracing process and a variety of methods are suggested. Here, details of the method are not described. When the voxel cube is captured by the use of the line passing through the main point, step S1807 is performed and otherwise step S1806 is performed.

(Step S1806)

The rendering engine 2104 writes the data indicating "transparent", that is, R=0, G=0, and B=0, to the address in the first IP image memory 2105 corresponding to the pixel position calculated in step S1803. The most significant bit indicates "whether the color information is written." The next 24 bits indicate the color information. Data indicating "no color information is written" to all the pixels are initially set in the first IP image memory 2105.

(Step S1807)

The rendering engine 2104 writes the color information of the voxel cube under notice and data indicating that "the color information is written" to the address corresponding to the pixel under notice in the second IP image memory 2106. Here, the color information is expressed in 24 bits. The second IP image memory 2106 allocates 32 bits to a pixel. The most significant bit indicates whether "the color information is written." The next 24 bits indicate the color information. Data indicating "no color information is written" to all the pixels are initially set in the second IP image memory 2106.

(Steps S1808 to S1811)

The operations of steps S1808 to S1811 according to the eleventh embodiment are similar to the operations of steps S1108 to S1111 of the flowchart according to the tenth embodiment shown in FIG. 34.

In the IP image forming method according to the eleventh embodiment, when an IP image is first formed on the first IP image display plane 2107 and then an IP image is formed on the second IP image display plane 2108, the pixel on the first IP image display plane at the position where the straight line connecting the pixel position in which the IP image is formed to the main point of the fly-eye lens 2109 intersects the first IP image display plane 2107 is made transparent. Accordingly, since the pixel on the second IP image display plane 2108 can be necessarily seen through the fly-eye lens 2109 and the transparent pixel on the first IP image display plane 2107, the pixel on the first IP image display plane 2107 for obtaining the three-dimensional image of the object on the back of the fly-eye lens 2109 does not cover the pixel on the second IP image display plane 2108 for obtaining the three-dimensional image of the object in front of the fly-eye lens 2109, thereby reproducing the three-dimensional image with right arrangement toward the back side of the viewing line.

In the IP image forming method according to the eleventh embodiment, the degree of fadeness in color of the second IP image display plane 2108 as seen through the transparent pixel on the first IP image display plane 2107 is numerically expressed in consideration of the degree of transparence of the first IP image display plane 2107, and the color displayed on the first IP image display plane 2107 is faded. Accordingly, the color of the first IP image display plane 2107 and the color of the second IP image display plane 2108 exhibit the same tone. As a result, since the object in front of the fly-eye lens 2109 and the object on the back of the fly-eye lens are reproduced in the same dynamic range of color, it is possible to obtain a three-dimensional image without discomfort.

In the three-dimensional image reproducing apparatus according to the eleventh embodiment, the contrast adjustment unit 2110 is provided in the second IP image display plane 2108. Accordingly, since the dynamic range of color when viewing the second IP image display plane 2108 through the transparent portion of the first IP image display plane 2107 and the dynamic range of color of the first IP image display plane 2107 can be adjusted, it is possible to reproduce a three-dimensional image without discomfort.

That is, in the eleventh embodiment, when the IP image formed on the first IP image display plane 2107 located at the front side in the viewing line hinders the formation of the IP image on the second IP image display plane 2108 located at the back side in the viewing line, it is possible to prevent the hindrance by replacing it with a transparent pixel. Accordingly, when a three-dimensional image is reproduced, the object on the back of the fly-eye lens 2109 does not cover the object in front of the fly-eye lens 2109. In addition, since the three-dimensional image of the object in front of the fly-eye lens 2109 and the three-dimensional image of the object on the back of the fly-eye lens 2109 are not inverted vertically and laterally, it is possible to obtain a three-dimensional image with a high resolution. In addition, by adjusting the contrast adjustment unit in consideration of the transmittance of the first IP image display plane 2107, the observer recognizes that the color of the first IP image display plane 2107 is equal to the color of the second IP image display plane 2108, thereby obtaining a realistic three-dimensional image.

In the eleventh embodiment, when the color information is written to the position where the straight line connecting a pixel on the second IP image display plane 2108 to the main point of the fly-eye lens 2109 intersects the first IP image display plane 2107, the pixel on the first IP image display plane 2107 is made transparent and then the color information is written to the pixel on the second IP image display plane 2108. However, it does not depart from the gist of the present invention even if the processing order is inverted.

What is claimed is:

1. A projection-type three-dimensional image display apparatus comprising:
   projection means for projecting a plurality of element images containing parallax information to a two-dimensional plane;
   a screen of which light transmittance can be electrically controlled and on which a projection image including the plurality of element images projected by the projection means is formed; and
   image forming means for forming a three-dimensional image having a vertical parallax and a horizontal parallax in a space in front of the screen from the projection image.

2. The projection-type three-dimensional image display apparatus according to claim 1, wherein transmissive liquid crystal is used as the projection means.

3. The projection-type three-dimensional image display apparatus according to claim 1, wherein reflective liquid crystal is used as the projection means.

4. The projection-type three-dimensional image display apparatus according to claim 2, wherein a digital mirror device is used as the projection means.

5. The projection-type three-dimensional image display apparatus according to claim 1, wherein an organic EL element array is used as the projection means.

6. The projection-type three-dimensional image display apparatus according to claim 1, wherein a spatial light modulator is used as the projection means.

7. The projection-type three-dimensional image display apparatus according to claim 1, wherein a light emitting diode is used as a light source of the projection means.

8. The projection-type three-dimensional image display apparatus according to claim 6, wherein a white LED is used as a light source of the projection means.

9. The projection-type three-dimensional image display apparatus according to claim 1, wherein an organic electroluminescence device is used as a light source of the projection means.

10. The projection-type three-dimensional image display apparatus according to claim 7, wherein the projection means includes means for changing a projection direction of the plurality of element images having the parallax information.

11. The projection-type three-dimensional image display apparatus according to claim 1, wherein a liquid crystal screen is used as the screen.

12. The projection-type three-dimensional image display apparatus according to claim 7, wherein light transmittance of the screen is changed depending upon brightness of an external environment.

13. The projection-type three-dimensional image display apparatus according to claim 1, wherein contrast of the element images having the parallax information is adjusted by controlling the light transmittance of the screen into the maximum transmission status when the element images having the parallax information are not projected and by varying the light transmittance of the screen in accordance with brightness of an external environment when the element images having the parallax information are projected.

14. The projection-type three-dimensional image display apparatus according to claim 1, wherein a hologram lens array is used as the image forming means.

15. A projection-type three-dimensional image display apparatus comprising a projection unit for projecting a plurality of element images having parallax information to a two-dimensional plane, a screen capable of electrically controlling light transmittance on which a projection image including the plurality of element images projected by the projection unit is formed, and a lens for forming a three-dimensional image in a space in front of the screen from the element images projected by the projection unit,
   wherein the lens diffracts the element images to form the three-dimensional image by the use of a diffraction effect when the element images are emitted from a display unit.

* * * * *